US012380517B2

(12) United States Patent
Sinha et al.

(10) Patent No.: US 12,380,517 B2
(45) Date of Patent: Aug. 5, 2025

(54) BUILDING SYSTEM WITH A RECOMMENDATION INTERFACE

(71) Applicant: Tyco Fire & Security GmbH, Neuhausen am Rheinfall (CH)

(72) Inventors: Vineet Binodshanker Sinha, Brookfield, WI (US); Corey A. Poquette, Milwaukee, WI (US); Rachel D. M. Ellerman, Shorewood, WI (US); Rajesh Nayak, Vidyaratna Nagar Manipal (IN); Alan S. Schwegler, Shorewood, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/404,799

(22) Filed: Aug. 17, 2021

(65) Prior Publication Data

US 2022/0067851 A1 Mar. 3, 2022

Related U.S. Application Data

(63) Continuation-in-part of application No. 17/354,583, filed on Jun. 22, 2021, now abandoned, and a (Continued)

(30) Foreign Application Priority Data

Aug. 18, 2020 (IN) ............................ 202021035549
Jan. 29, 2021 (IN) ............................ 202121004000

(51) Int. Cl.
*G06Q 50/06* (2024.01)
*G05B 13/02* (2006.01)

(Continued)

(52) U.S. Cl.
CPC .......... *G06Q 50/06* (2013.01); *G05B 13/028* (2013.01); *G05B 15/02* (2013.01); *G06F 3/04815* (2013.01); *G06F 3/0482* (2013.01)

(58) Field of Classification Search
None
See application file for complete search history.

(56) References Cited

U.S. PATENT DOCUMENTS 4,660,386 A 4/1987 Hansen et al.
8,706,515 B2 4/2014 Cobbs et al.

(Continued)

FOREIGN PATENT DOCUMENTS

CN 108171421 A 6/2018
EP 3 547 233 A1 10/2019

(Continued)

OTHER PUBLICATIONS

Juan, Yi-Kai, Peng Gao, and Jie Wang. "A hybrid decision support system for sustainable office building renovation and energy performance improvement." 2010. Energy and buildings 42.3: 290-297. (Year: 2010).*

(Continued)

*Primary Examiner* — Sara Grace Brown
(74) *Attorney, Agent, or Firm* — Foley & Lardner LLP

(57) ABSTRACT

A building system including one or more memory devices that store instructions thereon, that, when executed by one or more processors, generate a user interface including user interface elements, wherein a first user interface element of user interface elements is associated with a first category and includes one or more first recommendations that are associated with the first category and one or more first selection fields allowing a user to select recommendations for implementation from among the one or more first recommendations and a second user interface element of the user (Continued)

interface elements is associated with a second category and includes one or more second recommendations that are associated with the second category.

18 Claims, 80 Drawing Sheets

Related U.S. Application Data continuation-in-part of application No. 17/354,565, filed on Jun. 22, 2021, now abandoned.

(60) Provisional application No. 63/113,019, filed on Nov. 12, 2020.

(51) Int. Cl.
*G05B 15/02* (2006.01)
*G06F 3/04815* (2022.01)
*G06F 3/0482* (2013.01)

(56) References Cited

U.S. PATENT DOCUMENTS 8,706,537 B1 4/2014 Young et al.
8,812,971 B2 * 8/2014 Benedek ............... G06F 1/3203 715/781
10,031,494 B2 7/2018 Holaso
10,318,895 B1 6/2019 Norwood et al.
10,718,632 B1 * 7/2020 Platt ...................... H04L 67/125
10,796,554 B2 10/2020 Vincent et al.
10,832,564 B2 11/2020 Subramanian et al.
11,056,242 B1 7/2021 Jain et al.
11,176,016 B1 11/2021 Pandit et al.
11,249,730 B2 * 2/2022 Bodin .................... G06N 20/00
11,323,765 B1 5/2022 Obaidi
11,449,084 B1 9/2022 Taylor et al.
11,531,936 B2 * 12/2022 Hoff ....................... G01R 21/02
11,598,544 B1 3/2023 Schubert et al.
11,635,737 B1 4/2023 Warren et al.
11,668,481 B2 6/2023 Granger et al.
11,894,145 B2 2/2024 Palanivel et al.
11,898,419 B2 2/2024 Gao
2003/0217323 A1 11/2003 Guterman et al.
2005/0137929 A1 6/2005 Frazier et al.
2007/0260410 A1 11/2007 Raymond
2009/0107159 A1 4/2009 Mann et al.
2010/0286937 A1 11/2010 Hedley et al.
2011/0061015 A1 3/2011 Drees et al.
2011/0087988 A1 4/2011 Ray et al.
2012/0221165 A1 8/2012 Ooba et al.
2012/0259583 A1 10/2012 Noboa et al.
2013/0060385 A1 3/2013 Leen et al.
2013/0086010 A1 4/2013 Wenzel et al.
2013/0090769 A1 4/2013 Mckie et al.
2013/0154839 A1 6/2013 Barton
2013/0338629 A1 * 12/2013 Agrawal .............. A61B 5/4839 600/365
2014/0032506 A1 1/2014 Hoey et al.
2014/0046682 A1 2/2014 Soto et al.
2014/0214187 A1 7/2014 Redenbo et al.
2014/0222665 A1 8/2014 Kamel et al.
2014/0245071 A1 8/2014 Drees et al.
2015/0015412 A1 1/2015 Abbassian et al.
2015/0026268 A1 1/2015 Hui et al.
2015/0061859 A1 3/2015 Matsuoka et al.
2015/0066578 A1 3/2015 Manocchia et al.
2015/0077737 A1 3/2015 Belinsky et al.
2015/0127174 A1 * 5/2015 Quam ................. H04L 12/2825 700/275
2015/0178865 A1 * 6/2015 Anderson ............ G06Q 50/163 705/7.25
2015/0370927 A1 * 12/2015 Flaherty ................... F24F 11/58 703/1
2015/0371347 A1 12/2015 Hayward
2016/0210569 A1 7/2016 Enck
2016/0239766 A1 8/2016 Cameron
2016/0274551 A1 9/2016 Mishra et al.
2016/0321587 A1 11/2016 Gitt et al.
2016/0335731 A1 11/2016 Hall
2016/0352508 A1 12/2016 Guillen-Hernandez et al.
2017/0004414 A1 1/2017 Flores et al.
2017/0052536 A1 * 2/2017 Warner ............ G06Q 10/06312
2017/0076263 A1 3/2017 Bentz et al.
2017/0124842 A1 5/2017 Sinha et al.
2017/0169380 A1 6/2017 Maroli et al.
2017/0212482 A1 7/2017 Boettcher et al.
2017/0213303 A1 7/2017 Papadopoulos et al.
2017/0242940 A1 * 8/2017 Yu ...................... G06Q 10/0637
2017/0249417 A1 8/2017 Gosieski et al.
2017/0316319 A1 11/2017 Livingston et al.
2018/0102954 A1 4/2018 Schubert et al.
2018/0179888 A1 6/2018 Switzer et al.
2018/0211168 A1 7/2018 Khurshudov
2018/0296192 A1 10/2018 Sakai
2019/0025776 A1 1/2019 Bhattacharya et al.
2019/0058985 A1 2/2019 Karp et al.
2019/0138512 A1 5/2019 Pourmohammad et al.
2019/0138964 A1 5/2019 Morita et al.
2019/0174207 A1 6/2019 Cella et al.
2019/0212712 A1 7/2019 Wenzel et al.
2019/0264936 A1 8/2019 Bailey et al.
2019/0318553 A1 10/2019 Pati et al.
2020/0057827 A1 2/2020 Eckenrode et al.
2020/0103871 A1 4/2020 Laycock et al.
2020/0162280 A1 5/2020 Drees et al.
2020/0162354 A1 5/2020 Drees et al.
2020/0184792 A1 6/2020 Pourmohammad et al.
2020/0200416 A1 6/2020 Granger et al.
2020/0226525 A1 7/2020 Bhattacharya et al.
2020/0227172 A1 7/2020 Perkins et al.
2020/0285226 A1 9/2020 Chatterjee et al.
2020/0286025 A1 9/2020 Ramchandran
2020/0296153 A1 * 9/2020 Sundar M ............... H04L 67/10
2020/0309400 A1 10/2020 Vettigli et al.
2020/0320454 A1 * 10/2020 Almashor .............. G06Q 10/04
2020/0408566 A1 * 12/2020 Kang ..................... G16Y 20/30
2021/0097842 A1 4/2021 Paton et al.
2021/0118556 A1 4/2021 Caffarel et al.
2021/0125129 A1 * 4/2021 Vega ................ G06Q 10/06315
2021/0172632 A1 6/2021 Saunders et al.
2021/0200170 A1 7/2021 Ploegert et al.
2021/0217532 A1 7/2021 Heimerl
2021/0225528 A1 * 7/2021 Viengkham ............ G16Y 40/10
2021/0225529 A1 7/2021 Viengkham et al.
2021/0279804 A1 9/2021 Shakfeh
2021/0310070 A1 10/2021 Dillon et al.
2021/0312789 A1 10/2021 Linn
2021/0313075 A1 10/2021 Mc Namara et al.
2021/0334422 A1 * 10/2021 El-Diraby ............... G06F 30/12
2021/0334538 A1 * 10/2021 Marotta ................. G06V 20/20
2021/0342961 A1 11/2021 Winter et al.
2021/0350276 A1 * 11/2021 Ashlock ................ G06N 5/025
2021/0374296 A1 12/2021 Minnier
2021/0374297 A1 12/2021 Mcdade
2021/0398690 A1 * 12/2021 Gibson .................. G16H 40/20
2022/0058173 A1 2/2022 O'Farrell et al.
2022/0058545 A1 2/2022 Warake et al.
2022/0067851 A1 3/2022 Sinha et al.
2022/0102007 A1 3/2022 Palanivel et al.
2022/0108262 A1 4/2022 Cella et al.
2022/0113924 A1 4/2022 Meruva et al.
2022/0137580 A1 5/2022 Burroughs et al.
2022/0203287 A1 6/2022 Wenger et al.
2022/0203288 A1 6/2022 Wenger et al.
2022/0205962 A1 6/2022 Vanderkoy
2022/0207215 A1 6/2022 Liu et al.
2022/0221184 A1 7/2022 Gupta et al.
2022/0228756 A1 7/2022 Gupta et al.
2022/0254483 A1 8/2022 Boisvert et al.
2022/0277851 A1 9/2022 Wellig
2022/0282886 A1 9/2022 Hriljac et al.
2022/0293261 A1 9/2022 Mcbrady et al.

(56) References Cited

U.S. PATENT DOCUMENTS

| | | | |
|---|---|---|---|
| 2022/0305438 | A1 | 9/2022 | Wenger et al. |
| 2022/0305881 | A1 | 9/2022 | Neu et al. |
| 2022/0342403 | A1 | 10/2022 | Sinha et al. |
| 2022/0399105 | A1 | 12/2022 | Block et al. |
| 2022/0404056 | A1 | 12/2022 | Bloemer et al. |
| 2023/0004916 | A1 | 1/2023 | Lo et al. |
| 2023/0039468 | A1 | 2/2023 | Winter et al. |
| 2023/0085641 | A1 | 3/2023 | Jones et al. |
| 2023/0152763 | A1 | 5/2023 | Davis et al. |
| 2024/0135294 | A1 | 4/2024 | Warake et al. |

FOREIGN PATENT DOCUMENTS

| | | | |
|---|---|---|---|
| WO | WO-2013/043863 | A1 | 3/2013 |
| WO | WO-2019/017555 | A1 | 1/2019 |
| WO | WO-2020/264095 | A1 | 12/2020 |
| WO | WO-2021/099637 | A1 | 5/2021 |

OTHER PUBLICATIONS

Wei, Peter, et al. "A deep-reinforcement-learning-Based recommender system for occupant-driven energy optimization in commercial buildings." Feb. 18, 2020. IEEE Internet of Things Journal: 6402-6413. (Year: 2020).*

Petri, Ioan, et al. "Optimizing energy efficiency in operating built environment assets through building information modeling: A case study." Energies 10.8 (2017): 1167. (Year: 2017).*

Al-Haidary, Haidar E. Bim for Energy Modelling of Green Buildings. Diss. 2018. (Year: 2018).*

Ashrae Epidemic Task Force, "Core Recommendations for Reducing Airborne Infectious Aerosol Exposure," Jan. 6, 2021, 1 Page.

Ashrae, "Ashrae Resources Available to Address COVID-19 Concerns: ASHRAE Resources Provide Proactive Guidance in Addressing the Spread of COVID-19 in Buildings," URL: https://www.ashrae.org/about/news/2020/ashrae-resources-available-to-address-covid-19-concerns, Feb. 27, 2020, 7 Pages.

Autocase, "Business case and sustainability metrics for your building project: Sign up for Autocase's Free Insights today and get started!" URL: https://autocase.com/software/, Retrieved from Internet Dec. 10, 2021, 14 Pages.

Byrom et al., "Indoor Air Quality, Data Insights Take Center Stage," HPAC Engineering, Jul./Aug. 2021, 1 Page.

Carrier, "WebCTRL Automated Logic's WebCTRL? Building Automation/Intelligent Building Management System," URL: https://www.carrier.com/commercial/en/in/products/commercial-products/controls/webctrl/, Retrieved from Internet Dec. 10, 2021, 2 Pages.

Delos Living, "Delos Labs: Science is our DNA," URL: https://delos.com/research/delos-labs/, Retrieved from Internet Dec. 10, 2021, 5 Pages.

FITWEL—Center for Active Design, "Certification: How does the Fitwel Process Work" URL: https://www.fitwel.org/certification/, Retrieved from Internet Dec. 10, 2021, 4 Pages.

Honeywell International, "Healthy Buildings contribute to a healthy organization," URL: https://buildings.honeywell.com/us/en/solutions/healthy-buildings, Retrieved from Internet Dec. 10, 2021, 5 Pages.

Honeywell International, "Software for Digital Transformation: The Intelligent Operations you didn't know existed—and you didn't know you needed. This is Honeywell Forge." URL: https://www.honeywellforge.ai/us/en?utm_source=google&utm_medium=paid-search&utm_campaign=honeywell-forge-brand&gclid=EAIaIQobChMIyuyl9ObX9AIVwZmGCh1ycgLKEAAYASAAEglzbfD_BWE, Retrieved from Internet Dec. 10, 2021, 8 Pages.

International Search Report and Written Opinion for PCT Appl. Ser. No. PCT/US2021/046348 dated Nov. 4, 2021 (16 pages).

International Well Building Institute, "Meet WELL v2," URL: https://www.wellcertified.com/certification/v2/, Retrieved from Internet Dec. 9, 2021, 7 pages.

International Well Building Institute, "Well Building Standard," URL: https://standard.wellcertified.com/well, Retrieved from Internet Dec. 10, 2021, 5 Pages.

Processmap, "Comprehensive Solutions for Global Enterprises," URL: https://www.processmap.com/enterprise/, Retrieved form Internet Dec. 10, 2021, 7 Pages.

U.S. Green Building Council, "LEED Certification for New Buildings," URL: https://www.usgbc.org/leed/rating-systems/new-buildings, Retrieved from Internet Dec. 9, 2021, 6 pages.

World Clean Building Council, "What is green building?" URL: https://www.worldgbc.org/what-green-building, Retrieved from Internet Dec. 10, 2021, 3 pages.

Merriam-Webster, "algorithm," Dictionary Entry Pulled from https://www.merriam-webster.com, Mar. 10, 2023 (1 page).

Alvarado et al., "A Methodology to Monitor Airborne PM10 Dust Particles Using a Small Unmanned Aerial Vehicle," Sensors, 2017, vol. 17 (25 pages).

Newsham et al., "Effect of green building certification on organizational productivity metrics," Building Research & Information, 2018, vol. 46, No. 7 (pp. 755-766).

Ding et al., "An approach integrating geographic information system and building information modelling to assess the building health of commercial buildings," Journal of Cleaner Production, Feb. 12, 2020 (18 pages).

Ekici et al., "Performative computational architecture using swarm and evolutionary optimisation: A review," Building and Environment, 2019, 147 (pp. 356-371).

Hopfe, C.J., "Uncertainty and sensitivity analysis in building performance simulation for decision support and design optimization," Phd Thesis 1 (Research TU/e I Graduation TU/e), Built Environment, Eindhoven University of Technology, 2009 (230 pages).

Kim et al., "An integrated psychological response score of the occupants based on their activities and the indoor environmental quality condition changes," Building and Environment, 2017, 123 (pp. 66-77).

Kolokotsa et al., "Decision support methodologies on the energy efficiency and energy management in buildings," Advances in Building Energy Research, 2009, vol. 3, (pp. 121-146).

Qolomany et al., "Leveraging Machine Learning and Big Data for Smart Buildings: A Comprehensive Survey," IEEE Access, 2019 (pp. 90316-90356).

Abraham, Y.S., "Integrating occupant values and preferences with building systems in conditioned environments," Dissertation, Pennsylvania State University, Graduate School of the College of Engineering, 2018 (235 pages).

Asdrubali et al. "A comparison between environmental sustainability rating systems LEED and ITACA for residential buildings," Building and Environment 86, 2015 (pp. 98-108).

* cited by examiner

1900

Occupant Health And Wellness Parameters 404

Air Quality Parameters 602

| Category | Parameter | Sub parameter | Criteria | Allocated Score (AS) | Total Instances (TI) | Deviation Instances (DI) | Score Calculation |
|---|---|---|---|---|---|---|---|
| Essential | Indoor Air Quality | Carbon Dioxide | Zone CO2 >(+/-**X**%) of SP for more than **Y** min | 05 | Total Occ Time / Z | No. of Instances | Score = AS* ( (TI– DI)/TI) |
| Essential | Indoor Air Quality | Carbon Monoxide | Zone CO >(+/-**X**%) of SP for more than **Y** min | 01 | Total Occ Time / Z | No. of Instances | Score = AS* ( (TI– DI)/TI) |
| Essential | Indoor Air Quality | Duct Static Pressure | Duct Static Press < (+/-**X**%) of SP for more than **Y** min | 01 | No. of Days | No. of Days | Score = AS* ( (TI– DI)/TI) |
| Essential | Indoor Air Quality | Air Velocity | Air Velocity < (+/- **X**%) of SP for more than **Y** min | 01 | Total Occ Time / Z | No. of Instances | Score = AS* ( (TI– DI)/TI) |
| Essential | Indoor Air Quality | Air Replacement | Night purge mode to replace air | 01 | NA | NA | Score = AS if system in place for use case |
| Enhance | Indoor Air Quality | TVOC | Zone TVOC >(+/-**X**%) of SP for more than **Y** min | 01 | Total Occ Time / Z | No. of Instances | Score = AS* ( (TI– DI)/TI) |
| Enhance | Indoor Air Quality | Particulate Matters | PM >(+/-**X**%) of SP for more than **Y** min | 01 | Total Occ Time / Z | No. of Instances | Score = AS* ( (TI– DI)/TI) |
| Optimum | Indoor Air Quality | Particulate Matters | Activate filtering when OA or RA PM is more than limit | 01 | NA | NA | Score = AS if system in place for use case |
| Optimum | Indoor Air Quality | Air Replacement | Provision to raise complain about smell within space | 01 | NA | NA | Score = AS if system in place for use case |
| Optimum | Indoor Air Quality | Air Replacement | Provision to raise request replace occupied area air | 01 | NA | NA | Score = AS if system in place for use case |

Occupant Health And Wellness Parameters 404

Thermal Comfort Parameters 616

| Category | Parameter | Sub parameter | Criteria | Allocated Score (AS) | Total Instances (TI) | Deviation Instances (DI) | Score Calculation |
|---|---|---|---|---|---|---|---|
| Essential | Thermal Comfort | Dry Bulb Temp | Zone Temp > (+/- X%) of SP for more than Y min | 10 | Total Occ Time / Z | No. of Instances | Score = AS* ( (TI – DI)/TI) |
| Essential | Thermal Comfort | Dry Bulb Temp | HVAC On/Off control based on Occupancy in space | 02 | NA | NA | Score = AS if system in place for use case |
| Essential | Thermal Comfort | Personalized Control | Desk Temp >(+/- X%) of SP for more than Y min | 05 | Total Occ Time / Z | No. of Instances | Score = AS* ( (TI – DI)/TI) |
| Enhance | Thermal Comfort | Optimum Start | Zone Temp >(+/- X%) of SP after Y Occu. min | 02 | No. of Days | No. of Days | Score = AS* ( (TI – DI)/TI) |
| Optimum | Thermal Comfort | Dry Bulb Temp | AI based occupant set point adjustment | 01 | NA | NA | Score = AS if system in place for use case |
| Optimum | Thermal Comfort | Dry Bulb Temp | Auto zone SP adjustment based on OA temp | 02 | NA | NA | Score = AS if system in place for use case |
| Optimum | Thermal Comfort | Humidity Control | Zone RH >+/- X%) of SP for more than Y min | 02 | Total Occ Time / Z | No. of Instances | Score = AS* ( (TI – DI)/TI) |

Occupant Health And Wellness Parameters 404

Light Parameters 614

| Category | Parameter | Sub parameter | Criteria | Allocated Score (AS) | Total Instances (TI) | Deviation Instances (DI) | Score Calculation |
|---|---|---|---|---|---|---|---|
| Essential | Indoor Light | Desk Light Control | Light on/off control based on occupancy in space | 02 | NA | NA | Score = AS if system in place for use case |
| Essential | Indoor Light | Desk Light Control | Provision to control desk light | 02 | NA | NA | Score = AS if system in place for use case |
| Enhance | Indoor Light | Meeting Room | Provision for Mood Light control | 01 | NA | NA | Score = AS if system in place for use case |
| Enhance | Indoor Light | Desk Light Control | Desk light intensity control based on outdoor light | 01 | NA | NA | Score = AS if system in place for use case |
| Enhance | Indoor Light | Desk Light Control | Provision to control desk light intensity | 01 | NA | NA | Score = AS if system in place for use case |
| Optimum | Outdoor Light | Outdoor Conditions | Notify occupant when outside conditions are optimum | 01 | NA | NA | Score = AS if system in place for use case |
| Optimum | Indoor Light | Desk Light Control | Provision to control desk light color | 01 | NA | NA | Score = AS if system in place for use case |

Occupant Health And Wellness Parameters

Light Sunshade Parameters

| Category | Parameter | Sub parameter | Criteria | Allocated Score (AS) | Total Instances (TI) | Deviation Instances (DI) | Score Calculation |
|---|---|---|---|---|---|---|---|
| Essential | Sunshade | Sunshade control | Automatic Sunshade Control based on sun position | 01 | No. of instances | No. of Instances | Score = AS* ( (TI−DI)/TI) |
| Essential | Sunshade | Sunshade Control | Provision to control sunshade for occupant | 02 | NA | NA | Score = AS if system in place for use case |
| Optimum | Sunshade | Sunshade Control | Sunshade opening alert when outside conditions are optimum | 01 | NA | NA | Score = AS if system in place for use case |

Occupant Health And Wellness Parameters 404

Occupancy Parameters 626

| Category | Parameter | Sub parameter | Criteria | Allocated Score (AS) | Total Instances (TI) | Deviation Instances (DI) | Score Calculation |
|---|---|---|---|---|---|---|---|
| Essential | Zone Occupancy | No. of Occupant | No. of occupant < limit for more than 15 min | 02 | NA | NA | Score = AS* ( (TI – DI)/TI) |
| Essential | Cafeteria Occupancy | No. of Occupant | Alert when cafeteria occupancy is less than limit | 02 | NA | NA | Score = AS if system in place for use case |

404 Occupant Health And Wellness Parameters

620 Seating Parameters

| Category | Parameter | Sub parameter | Criteria | Allocated Score (AS) | Total Instances (TI) | Deviation Instances (DI) | Score Calculation |
|---|---|---|---|---|---|---|---|
| Essential | Indoor Light | Hot Desking | Provision to book standing desk | 01 | NA | NA | Score = AS if system in place for use case |
| Essential | Indoor Light | Hot Desking | Provision to check standing desk sanitization status * | 02 | NA | NA | Score = AS if system in place for use case |
| Essential | Indoor Light | Hot Desking | Provision to request standing desk sanitization | 01 | NA | NA | Score = AS if system in place for use case |
| Enhance | Indoor Light | Hot Desking | Provision to book seat with view | 01 | NA | NA | Score = AS if system in place for use case |
| Enhance | Indoor Light | Seating | Flexible desk arrangement to collaborate effectively | 01 | NA | NA | Score = AS if system in place for use case |
| Optimum | Outdoor Light | Seating | Provision to adjust posture and height of desk | 01 | NA | NA | Score = AS if system in place for use case |
| Optimum | Indoor Light | Seating | AI based auto posture and height adjustment | 01 | NA | NA | Score = AS if system in place for use case |

Occupant Health And Wellness Parameters 404

Sound Parameters 618

| Category | Parameter | Sub parameter | Criteria | Allocated Score (AS) | Total Instances (TI) | Deviation Instances (DI) | Score Calculation |
|---|---|---|---|---|---|---|---|
| Essential | Sound | Noise Level | Noise level should be less than threshold limit all day | 02 | No. of Instances | No. of Instances | Score = AS if system in place for use case |
| Essential | Sound | Noise Level | Provision to raise complain if occupied space in noisy * | 03 | NA | NA | Score = AS if system in place for use case |
| Enhance | Sound | Music | Provision to play music in gym during work - out if alone | 01 | NA | NA | Score = AS if system in place for use case |
| Enhance | Sound | Music | Automatically play music in cafeteria during lunch | 01 | NA | NA | Score = AS if system in place for use case |

Occupant Health And Wellness Parameters 404

Sanitization Parameters 642

| Category | Parameter | Sub parameter | Criteria | Allocated Score (AS) | Total Instances (TI) | Deviation Instances (DI) | Score Calculation |
|---|---|---|---|---|---|---|---|
| Essential | Sanitization | Sanitization | Common Space Sanitization Schedule | 01 | NA | NA | Score = AS if system in place for use case |
| Essential | Sanitization | Sanitization | Common Space Sanitization Status | 03 | NA | NA | Score = AS if system in place for use case |
| Essential | Sanitization | Sanitization | Common Space Sanitization request * | 02 | NA | NA | Score = AS if system in place for use case |

Occupant Health And Wellness Parameters 404

Food Parameters 634

| Category | Parameter | Sub parameter | Criteria | Allocated Score (AS) | Total Instances (TI) | Deviation Instances (DI) | Score Calculation |
|---|---|---|---|---|---|---|---|
| Essential | Food | Food Ordering | Cafeteria Food menu along with nutrition | 02 | NA | NA | Score = AS if system in place for use case |
| Essential | Food | Nourishment | Provide Nutrition Education via Occupant app | 02 | NA | NA | Score = AS if system in place for use case |
| Enhance | Food | Food Ordering | Provision to order food from occupant app | 01 | NA | NA | Score = AS if system in place for use case |
| Enhance | Food | Fruit Basket | Fruit Basket arrival notification to occupant | 01 | NA | NA | Score = AS if system in place for use case |
| Enhance | Food | Food Break | Customized lunch and coffee break alerts to occupant | 01 | NA | NA | Score = AS if system in place for use case |
| Optimum | Food | Eating Area | Navigation to nearest indoor and outdoor eating area | 01 | NA | NA | Score = AS if system in place for use case |
| Optimum | Food | Food | Navigation to nearest farmers' market | 01 | NA | NA | Score = AS if system in place for use case |

Occupant Health And Wellness Parameters 404

Fitness Parameters 636

| Category | Parameter | Sub parameter | Criteria | Allocated Score (AS) | Total Instances (TI) | Deviation Instances (DI) | Score Calculation |
|---|---|---|---|---|---|---|---|
| Essential | Fitness | Fitness program | Alerts and notifications of fitness program by organization | 01 | NA | NA | Score = AS if system in place for use case |
| Essential | Fitness | Fitness awareness | Promote Physical Activity | 03 | NA | NA | Score = AS if system in place for use case |
| Enhance | Fitness | Movement | Customized no movement reminder for occupant | 02 | NA | NA | Score = AS if system in place for use case |
| Enhance | Fitness | Gym occupancy status | Customized reminder when gym is unoccupied | 01 | NA | NA | Score = AS if system in place for use case |
| Enhance | Fitness | Bicycle stand booking | Provision to book bicycle stand in advance | 01 | NA | NA | Score = AS if system in place for use case |

Occupant Health And Wellness Parameters 404

Handwashing Parameters 638

| Category | Parameter | Sub parameter | Criteria | Allocated Score (AS) | Total Instances (TI) | Deviation Instances (DI) | Score Calculation |
|---|---|---|---|---|---|---|---|
| Essential | Hand Washing | Hand Washing | Hand washing reminder when occupant enter in office | 03 | NA | NA | Score = AS if system in place for use case |
| Essential | Hand Washing | Hand Washing | Proper hand washing guide in occupant app | 01 | NA | NA | Score = AS if system in place for use case |
| Essential | Hand Washing | Hand Washing | Hand wash alert when in contact with COVID-19 person | 02 | NA | NA | Score = AS if system in place for use case |
| Enhance | Hand Washing | Soap Dispenser | Raise a request to refill soap dispenser | 01 | NA | NA | Score = AS if system in place for use case |
| Enhance | Hand Washing | Touchless | Touchless handwashing | 01 | NA | NA | Score = AS if system in place for use case |
| Optimum | Hand washing | Hand Washing | Average time spent for handwashing less than X sec. | 01 | NA | NA | Score = AS if system in place for use case |

Occupant Health And Wellness Parameters 404

Water Quality Parameters 632

| Category | Parameter | Sub parameter | Criteria | Allocated Score (AS) | Total Instances (TI) | Deviation Instances (DI) | Score Calculation |
|---|---|---|---|---|---|---|---|
| Essential | Water Quality | Contaminent Level | Contaminent level is below threshold limit | 05 | No. of instances | No. of Instances | Score = AS* ( (TI−DI)/TI) |
| Essential | Water Consumption | Awareness | Alerts and notification for spread awareness | 01 | NA | NA | Score = AS if system in place for use case |
| Essential | Water Quality | Hot Water Quality | Provision to raise temperature of Hot Water to kill Ameba | 02 | NA | NA | Score = AS if system in place for use case |
| Enhance | Water Quality | Water refilling Station | Navigation to nearest hot/cold water refilling source | 01 | NA | NA | Score = AS if system in place for use case |
| Enhance | Water Quality | Water refilling Station | Provision to raise request to refill water refilling station | 01 | NA | NA | Score = AS if system in place for use case |
| Enhance | Water Quality | Water Quality | Provision to raise complain about water quality | 01 | NA | NA | Score = AS if system in place for use case |
| Optimum | Water Quality | Dehydration alert | AI based reminder for occupant to drink water | 01 | NA | NA | Score = AS if system in place for use case |

Occupant Health And Wellness Parameters 404

Pest Control Parameters 634

| Category | Parameter | Sub parameter | Criteria | Allocated Score (AS) | Total Instances (TI) | Deviation Instances (DI) | Score Calculation |
|---|---|---|---|---|---|---|---|
| Essential | Pest Control | Pest Control | Pest control schedule of occupied space alert | 01 | NA | NA | Score = AS if system in place for use case |
| Essential | Pest Control | Pest Control | Pest control status of occupied space | 01 | NA | NA | Score = AS if system in place for use case |
| Essential | Pest Control | Pest Control | No entry alert during pest control cool down period | 02 | NA | NA | Score = AS if system in place for use case |

Occupant Health And Wellness Parameters 404

Emergency Parameters 628

| Category | Parameter | Sub parameter | Criteria | Allocated Score (AS) | Total Instances (TI) | Deviation Instances (DI) | Score Calculation |
|---|---|---|---|---|---|---|---|
| Essential | Emergency | SOS | SOS button in occupant app case of emergency | 01 | NA | NA | Score = AS if system in place for use case |
| Essential | Emergency | SOS | Alert & Location sharing with immediate family | 01 | NA | NA | Score = AS if system in place for use case |
| Essential | Emergency | SOS | SOS alert when inorganic gas level is dangerous | 01 | NA | NA | Score = AS if system in place for use case |
| Enhance | Emergency | SOS | SOS alert on Occupant in case of nearby bush fire | 01 | NA | NA | Score = AS if system in place for use case |

Occupant Health And Wellness Parameters 404

Accessibility Parameters 630

| Category | Parameter | Sub parameter | Criteria | Allocated Score (AS) | Total Instances (TI) | Deviation Instances (DI) | Score Calculation |
|---|---|---|---|---|---|---|---|
| Essential | Emergency | Outdoor access | Navigation to nearest garden | 02 | NA | NA | Score = AS if system in place for use case |
| Essential | Emergency | Indoor Navigation | Navigation to nearest green space | 01 | NA | NA | Score = AS if system in place for use case |
| Essential | Emergency | Indoor Navigation | Meeting Room Navigation | 01 | NA | NA | Score = AS if system in place for use case |
| Enhance | Emergency | Indoor Navigation | Indoor Navigation to find employee | 01 | NA | NA | Score = AS if system in place for use case |

Occupant Health And Wellness Parameters 404

Mind Parameters 622

| Category | Parameter | Sub parameter | Criteria | Allocated Score (AS) | Total Instances (TI) | Deviation Instances (DI) | Score Calculation |
|---|---|---|---|---|---|---|---|
| Essential | Mind | Mental Health | Mental Health awareness | 02 | NA | NA | Score = AS if system in place for use case |
| Essential | Mind | Mental Health | Access to organization Mental Health Education program | 01 | NA | NA | Score = AS if system in place for use case |
| Essential | Mind | Suicide Prevention | Access to suicide prevention resources | 01 | NA | NA | Score = AS if system in place for use case |
| Enhance | Mind | Stress | Access to organization Stress Management Programs | 01 | NA | NA | Score = AS if system in place for use case |

Occupant Health And Wellness Parameters 404

Social Parameters 624

| Category | Parameter | Sub parameter | Criteria | Allocated Score (AS) | Total Instances (TI) | Deviation Instances (DI) | Score Calculation |
|---|---|---|---|---|---|---|---|
| Essential | Social | Social | Alerts and notification of organization social events | 01 | NA | NA | Score = AS if system in place for use case |
| Essential | Social | Social | Colleague birthday reminder | 01 | NA | NA | Score = AS if system in place for use case |
| Essential | Social | Social | Nearby Social events | 01 | NA | NA | Score = AS if system in place for use case |

Occupant Health And Wellness Parameters

Physical User Health Parameters

| Category | Parameter | Sub parameter | Criteria | Allocated Score (AS) | Total Instances (TI) | Deviation Instances (DI) | Score Calculation |
|---|---|---|---|---|---|---|---|
| Essential | Eyes | Eyes Relaxation | Customized alerts to occupant to look away from screen | 01 | NA | NA | SS = AS if customized alerts to occupant to look away from screen |
| Essential | Disease Control | Social Distancing | Provision alert occupant when someone is less than 3 feet distance | 02 | NA | NA | SS = AS if provision alert occupant when someone is less than 3 feet distance |
| Enhance | Disease Control | Medical Leave | Provision to update sick leave in occupant app | 01 | NA | NA | SS = AS if provision to update sick leave in occupant app |
| Enhance | Disease Control | Contact Tracing | Provision for contact tracing | 01 | NA | NA | SS = AS if provision for contact tracing |
| Enhance | Disease Control | Air Replacement | Provision for air replacement request in case nearby employee infected by Viral disease | 01 | NA | NA | SS = AS if provision for air replacement request in case nearby employee infected by Viral disease |
| Optimum | Health | Health Data | Alerts and Notification to occupant when irregularity in health data | 01 | NA | NA | SS = AS if Alerts and Notification to occupant when irregularity in health data |

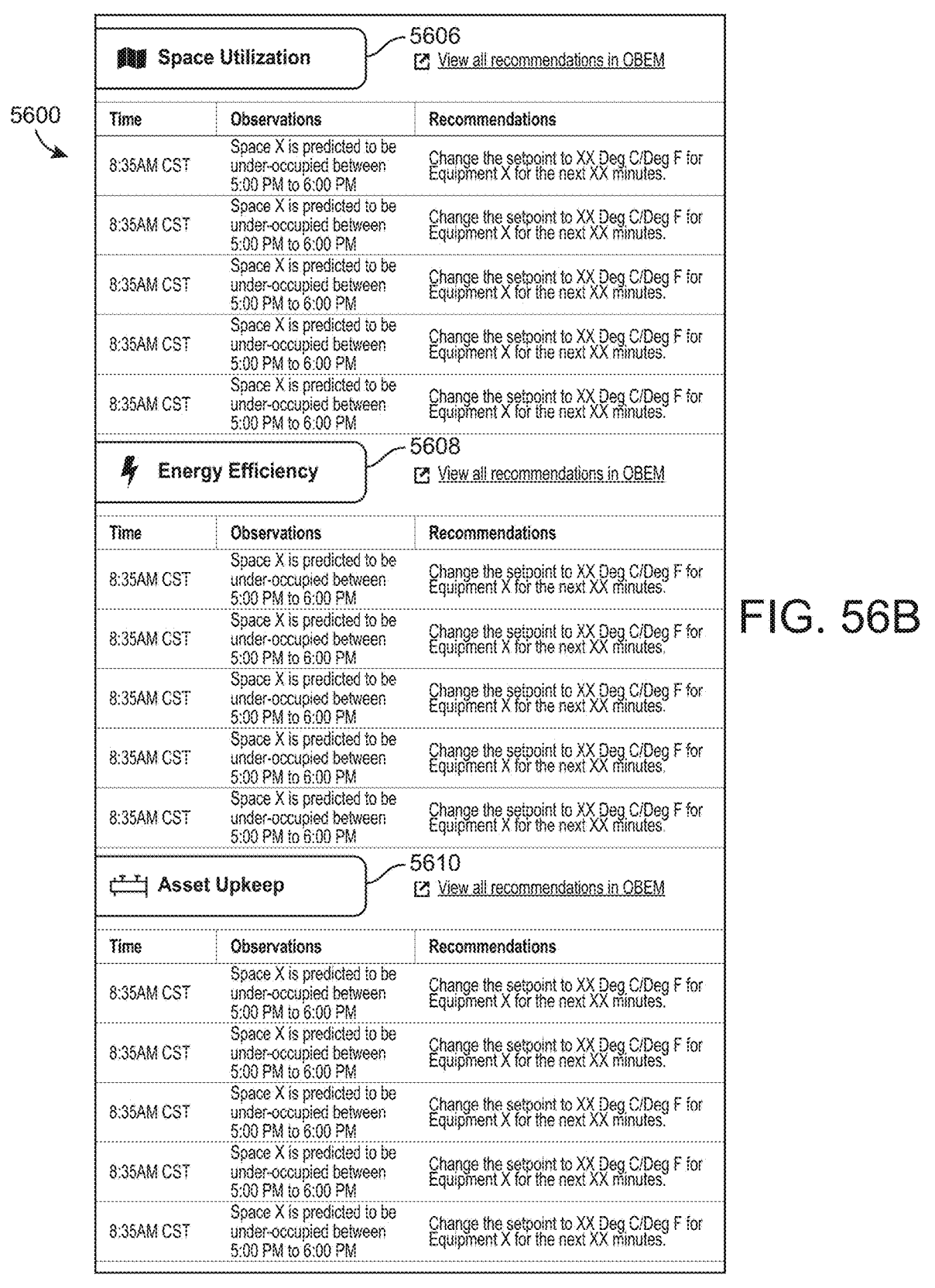

Space Utilization

5606
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

Energy Efficiency

5608
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

Asset Upkeep

5610
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

FIG. 56B

BUILDING SYSTEM WITH A RECOMMENDATION INTERFACE

CROSS-REFERENCE TO RELATED PATENT APPLICATION

This application claims the benefit of and priority to Indian Provisional Application No. 202021035549 filed Aug. 18, 2020. This application is also a continuation-in-part of U.S. application Ser. No. 17/354,583 filed Jun. 22, 2021 which claims the benefit of, and priority to, Indian Provisional Patent Application No. 202021035549 filed Aug. 18, 2020, U.S. Provisional Application No. 63/113,019 filed Nov. 12, 2020, and Indian Provisional Patent Application No. 202121004000 filed Jan. 29, 2021. This application is also a continuation-in-part of U.S. application Ser. No. 17/354,565 filed Jun. 22, 2021 which claims the benefit of, and priority to, Indian Provisional Patent Application No. 202021035549 filed Aug. 18, 2020, U.S. Provisional Application No. 63/113,019 filed Nov. 12, 2020, and Indian Provisional Patent Application No. 202121004000 filed Jan. 29, 2021. The entirety of each of these patent applications is incorporated by reference herein.

BACKGROUND

The present application relates to a building system for managing operation of building equipment of a building. The present application relates more particularly to user interfaces of the building system that allows a user to control and/or operate the building equipment. The user interfaces can be generated and/or managed by the building system. The user interfaces can provide a method for reviewing performance of the building and/or operating building equipment. However, in a building, there may be so many equipment settings or other operational decisions that need to be made, it may be difficult and time consuming for a user to control the operation of a building efficiently and/or appropriately.

SUMMARY

One implementation of the present disclosure is a building system including one or more memory devices that store instructions thereon, that, when executed by one or more processors, cause the one or more processors to receive recommendations from a recommendation engine, the recommendations generated based on building data of building equipment of a building and indicating one or more control updates to change performance of the building equipment. The instructions cause the one or more processors to generate a user interface including user interface elements, wherein a first user interface element of user interface elements is associated with a first category and includes one or more first recommendations of the recommendations that are associated with the first category and one or more first selection fields allowing a user to select recommendations for implementation from among the one or more first recommendations and a second user interface element of the user interface elements is associated with a second category and includes one or more second recommendations of the recommendations that are associated with the second category and one or more second selection fields allowing the user to select recommendations for implementation from among the one or more second recommendations. The instructions cause the one or more processors to receive an indication to accept one recommendation via at least one of the user interface elements and responsive to receiving the indication to accept the one recommendation, automatically taking an action to implement the one recommendation.

In some embodiments, the first category and the second category are at least one of one or more space categories indicating health levels of spaces of the building, one or more planet health categories relating to an effect of the building on environmental pollution, or one or more people categories relating to at least one of physical or mental health of occupants of the building.

In some embodiments, the instructions cause the one or more processors to generate a graphical building interface including a three dimensional graphical representation of the building and display the graphical building interface on a display device of a user device, display a first space of the building in the three dimensional graphical representation of the building, display a first set of recommendations in the graphical building interface associated with the first space in response to the first space of the building being displayed in the three dimensional graphical representation of the building, receive a user input from the user device navigating in the three dimensional graphical representation of the building from the first space to a second space of the building, and display a second set of recommendations in the user interface associated with the second space in response to navigating in the three dimensional graphical representation of the building from the first space to the second space.

In some embodiments, the instructions cause the one or more processors to generate a trend interface indicating one or more trends of scores of at least one of the first category or the second category over time. In some embodiments, the trend interface indicates times that particular recommendations of the recommendations where implemented.

In some embodiments, the instructions cause the one or more processors to receive a target energy bill amount from the user via a user device and generate the recommendations that, when implemented, cause the building equipment to consume an amount of energy that meets the target energy bill amount.

In some embodiments, the instructions cause the one or more processors to receive a selection of the one recommendation, receive a comment from the user via a user device, and display the comment in the user interface in association with the one recommendation.

In some embodiments, the instructions cause the one or more processors to receive a selection of the one recommendation, wherein the one recommendation is of a particular type, receive approval to automatically implement particular recommendations of the particular type from the user via a user device, and responsive to receiving the approval to automatically implement the particular recommendations, automatically take actions to implement the particular recommendations.

In some embodiments, the one or more first recommendations include a first recommendations. In some embodiments, the first user interface element includes a list including indications of the first recommendations and the one or more first selection fields allowing the user to accept or decline each of the recommendations.

In some embodiments, the list further includes observations based on the building data that indicates a situation or event triggering a recommendation of the first recommendations to be generated and indications of the one or more control updates that change performance of the building equipment.

In some embodiments, the instructions cause the one or more processors to implement the recommendation engine, wherein the recommendation engine is configured to receive the indication to accept the one recommendation and receive a second indication declining a second recommendation of the recommendations and generate one or more recommendations based on the indication to accept the one recommendation and the second indication declining the second recommendation.

In some embodiments, the recommendation engine is configured to train one or more machine learning models based on the indication to accept the one recommendation and the indication declining the second recommendation and generate the one or more recommendations based on the one or more machine learning models.

Another implementation of the present disclosure is a method including receiving, by a processing circuit, recommendations from a recommendation engine, the recommendations generated based on building data of building equipment of a building and indicating one or more control updates to change performance of the building equipment. The method includes generating, by the processing circuit, a user interface including user interface elements, wherein a first user interface element of the user interface elements is associated with a first category and includes one or more first recommendations of the recommendations that are associated with the first category and one or more first selection fields allowing a user to select recommendations for implementation from among the one or more first recommendations and a second user interface element of the user interface elements is associated with a second category and includes one or more second recommendations of the recommendations that are associated with the second category and one or more second selection fields allowing the user to select recommendations for implementation from among the one or more second recommendations. The method includes receiving, by the processing circuit, an indication to accept one recommendation via at least one of the user interface elements and responsive to receiving the indication to accept the one recommendation, automatically taking an action, by the processing circuit, to implement the one recommendation.

In some embodiments, the first category and the second category are at least one of one or more space categories indicating health levels of spaces of the building, one or more planet health categories relating to an effect of the building on environmental pollution, or one or more people categories relating to at least one of physical or mental health of occupants of the building.

In some embodiments, the method includes generating, by the processing circuit, a graphical building interface including a three dimensional graphical representation of the building and display the graphical building interface on a display device of a user device, displaying, by the processing circuit, a first space of the building in the three dimensional graphical representation of the building, displaying, by the processing circuit, a first set of recommendations in the graphical building interface associated with the first space in response to the first space of the building being displayed in the three dimensional graphical representation of the building, receiving, by the processing circuit, a user input from the user device navigating in the three dimensional graphical representation of the building from the first space to a second space of the building, and displaying, by the processing circuit, a second set of recommendations in the user interface associated with the second space in response to navigating in the three dimensional graphical representation of the building from the first space to the second space.

In some embodiments, the method includes generating, by the processing circuit, a trend interface indicating one or more trends of scores of at least one of the first category or the second category over time. In some embodiments, the trend interface indicates times that particular recommendations of the recommendations where implemented.

In some embodiments, the method includes receiving, by the processing circuit, a target energy bill amount from the user via a user device and generating, by the processing circuit, the recommendations that, when implemented, cause the building equipment to consume an amount of energy that meets the target energy bill amount.

In some embodiments, the method includes receiving, by the processing circuit, a selection of the one recommendation, receiving, by the processing circuit, a comment from the user via a user device, and displaying, by the processing circuit, the comment in the user interface in association with the one recommendation.

In some embodiments, the method includes receiving, by the processing circuit, a selection of the one recommendation, wherein the one recommendation is of a particular type, receiving, by the processing circuit, approval to automatically implement particular recommendations of the particular type from the user via a user device, and responsive to receiving the approval to automatically implement the particular recommendations, automatically take actions to implement the particular recommendations.

Another implementation of the present application is a building system including one or more memory devices that store instructions and one or more processors, wherein the one or more processors execute the instructions, causing the one or more processors to receive recommendations from a recommendation engine, the recommendations generated based on building data of building equipment of a building and indicating one or more control updates to change performance of the building equipment. The instructions cause the one or more processors to generate a user interface including user interface elements, wherein a first user interface element of the user interface elements is associated with a first category and includes one or more first recommendations of the recommendations that are associated with the first category and one or more first selection fields allowing a user to select recommendations for implementation from among the one or more first recommendations; and a second user interface element of the user interface elements is associated with a second category and includes one or more second recommendations of the recommendations that are associated with the second category and one or more second selection fields allowing the user to select recommendations for implementation from among the one or more second recommendations. The instructions cause the one or more processors to receive an indication to accept one recommendation via at least one of the user interface elements and responsive to receiving the indication to accept the one recommendation, automatically taking an action to implement the one recommendation.

In some embodiments, the first category and the second category are at least one of one or more space categories indicating health levels of spaces of the building, one or more planet health categories relating to an effect of the building on environmental pollution, or one or more people categories relating to at least one of physical or mental health of occupants of the building.

One implementation of the present disclosure is a building system of a building including one or more storage devices storing instructions thereon that, when executed by one or more processors, cause the one or more processors to receive building data from one or more building systems of the building and generate, based on the building data, an overall building score of the building based on one or more space parameters indicating health levels of spaces of the building, one or more planet health parameters indicating effect of operations performed by the one or more building systems of the building on environmental pollution, and one or more people parameters indicating at least one of physical or mental health of occupants of the building caused by the operation of the one or more building systems. The instructions cause the one or more processors to implement one or more updates to the one or more building systems of the building, the one or more updates updating operation of the building to improve at least one of the one or more space parameters, the one or more planet health parameters, or the one or more people parameters causing the overall building score to improve.

In some embodiments, the one or more updates include at least one of an update to an operating setting of the one or more building systems controlling an environmental condition of the building, a work order to perform maintenance on the one or more building systems, and an update to add a new system or service to the one or more building systems.

In some implementations, the one or more space parameters of the building indicating health levels of the spaces of the building include at least one of process health parameters indicating health of processes performed within the spaces of the building, system health parameters indicating the health of the one or more building systems, and safety and security health parameters indicating health of safety and security systems of the one or more building systems.

In some embodiments, the instructions cause the one or more processors to determine occupancy levels of spaces of the building at times and generate a user interface including one or more elements indicating the occupancy levels of the spaces and one or more elements indicating occupancy level trends based on the occupancy levels of the spaces of the building at the times.

In some embodiments, the instructions cause the one or more processors to determine, based on the building data, indoor air quality of indoor air of the building and infectious disease risk indicating a risk level of occupants of the building contracting an infectious disease and cause the user interface to include an indication of the indoor air quality and the infectious disease risk.

In some embodiments, the instructions cause the one or more processors to determine, based on the building data, one or more space health scores for the one or more space parameters of the building, determine, based on the building data, one or more planet health scores for the one or more planet health parameters of the building, and determine, based on the building data, one or more people health scores for the one or more people parameters of the building.

In some embodiments, the instructions cause the one or more processors to generate, based on the building data, the overall building score of the building based on the one or more space health scores, the one or more planet health scores, and the one or more people health scores and cause the one or more processors to generate a user interface including an overall building score element include an indication of the overall building score.

In some embodiments, the user interface includes one or more space health score elements including one or more indications of the one or more space health scores, indications of alerts associated with the one or more space health scores, and indications of one or more recommendations to perform actions to improve the one or more space health scores.

In some embodiments, the user interface includes one or more planet health score elements including one or more indications of the one or more planet health scores, indications of alerts associated with the one or more planet health scores, and indications of one or more recommendations to perform actions to improve the one or more space planet scores.

In some embodiments, the user interface includes one or more people health score elements including one or more indications of the one or more people health scores, indications of alerts associated with the one or more people health scores, and indications of one or more recommendations to perform actions to improve the one or more people health scores.

Another implementation of the present disclosure is a method including receiving, by a processing circuit, building data from one or more building systems of a building and generating, by the processing circuit, based on the building data, an overall building score of the building based on one or more space parameters indicating health levels of spaces of the building, one or more planet health parameters indicating effect of operations performed by the one or more building systems of the building on environmental pollution, and one or more people parameters indicating at least one of physical or mental health of occupants of the building caused by the operation of the one or more building systems. The method further includes implementing, by the processing circuit, one or more updates to the one or more building systems of the building, the one or more updates updating operation of the building to improve at least one of the one or more space parameters, the one or more planet health parameters, or the one or more people parameters causing the overall building score to improve.

In some embodiments, the one or more updates include at least one of an update to an operating setting of the one or more building systems controlling an environmental condition of the building, a work order to perform maintenance on the one or more building systems, and an update to add a new system or service to the one or more building systems.

In some embodiments, the one or more space parameters of the building indicating health levels of the spaces of the building include at least one of process health parameters indicating health of processes performed within the spaces of the building, system health parameters indicating the health of the one or more building systems, and safety and security health parameters indicating health of safety and security systems of the one or more building systems.

In some embodiments, the method further includes determining, by the processing circuit, based on the building data, one or more space health scores for the one or more space parameters of the building, determining, by the processing circuit, based on the building data, one or more planet health scores for the one or more planet health parameters of the building, and determining, by the processing circuit, based on the building data, one or more people health scores for the one or more people parameters of the building.

In some embodiments, the method further includes generating, by the processing circuit, based on the building data, the overall building score of the building based on the one or more space health scores, the one or more planet health scores, and the one or more people health scores and generating, by the processing circuit, a user interface including an overall building score element including an indication of the overall building score.

In some embodiments, the user interface includes one or more space health score elements including one or more indications of the one or more space health scores, indications of alerts associated with the one or more space health scores, and indications of one or more recommendations to perform actions to improve the one or more space health scores.

In some embodiments, the user interface includes one or more planet health score elements including one or more indications of the one or more planet health scores, indications of alerts associated with the one or more planet health scores, and indications of one or more recommendations to perform actions to improve the one or more planet health scores.

In some embodiments, the user interface includes one or more people health score elements including one or more indications of the one or more people health scores, indications of alerts associated with the one or more people health scores, and indications of one or more recommendations to perform actions to improve the one or more people health scores.

Another implementation of the present disclosure is a building health analysis system of a building including one or more storage devices storing instructions thereon and one or more processors configured to execute the instructions causing the one or more processors to receive building data from one or more building systems of the building. The instructions cause the one or more processors to generate, based on the building data, an overall building score of the building based on one or more space parameters indicating health levels of spaces of the building, one or more planet health parameters indicating effect of operations performed by the one or more building systems of the building on environmental pollution, and one or more people parameters indicating at least one of physical or mental health of occupants of the building caused by the operation of the one or more building systems. The instructions cause the one or more processors to implement one or more updates to the one or more building systems of the building, the one or more updates updating operation of the building to improve at least one of the one or more space parameters, the one or more planet health parameters, or the one or more people parameters causing the overall building score to improve.

In some embodiments, the one or more space parameters of the building indicating health levels of the spaces of the building include at least one of process health parameters indicating health of processes performed within the spaces of the building, system health parameters indicating the health of the one or more building systems, and safety and security health parameters indicating health of safety and security systems of the one or more building systems.

One implementation of the present disclosure is a building system of a building including one or more storage devices storing instructions thereon that, when executed by one or more processors, cause the one or more processors to receive building data from one or more building systems of the building and cause a display device of a user device of a user to display, based on the building data, one or more building scores of the building based on at least one of one or more space parameters indicating health levels of spaces of the building, one or more planet health parameters relating to an effect of the building on environmental pollution, or one or more people parameters relating to at least one of physical or mental health of occupants of the building. The instructions cause the one or more processors to generate one or more recommendations for improving the one or more building scores, the one or more recommendations including a prediction of an increase to a level of the one or more building scores or a decrease to the level of the one or more building scores, cause the display device of the user device of the user to display the one or more recommendations and receive, via the display device, a selection of one recommendation of the one or more recommendations via the display device from the user, and operate the one or more building systems based on one or more operating settings of the one recommendation.

In some embodiments, the instructions cause the one or more processors to receive second building data resulting from operation of the one or more building systems based on the one or more operating settings of the one recommendation, generate one or more second building scores with the second building data based on the at least one of one or more space parameters indicating the health levels of spaces of the building, the one or more planet health parameters relating to the effect of the building on environmental pollution, or the one or more people parameters relating to the at least one of physical or mental health of occupants of the building, and cause the display device to display the one or more second building scores.

In some embodiments, the instructions cause the one or more processors to determine one or more monthly financial costs resulting from energy consumption resulting from operating the one or more building systems based on the one or more recommendations and cause the display device to display the one or more monthly financial costs.

In some embodiments, the instructions cause the one or more processors to generate a user interface including the one or more recommendations, one or more monthly financial costs resulting from energy consumption resulting from the one or more recommendations, and particular operating settings for the one or more recommendations and a current operating state of the building, a current monthly financial cost, and one or more current operating settings. In some embodiments, the instructions cause the one or more processors to cause the display device to display the user interface.

In some embodiments, the one or more recommendations include a first recommendation and a second recommendation. In some embodiments, the first recommendation includes one or more first proposed settings for the one or more operating settings. In some embodiments, the second recommendation includes one or more second proposed settings for the one or more operating settings.

In some embodiments, the instructions cause the one or more processors to generate a people health score with the building data based on the one or more people parameters relating to the at least one of physical or mental health of occupants of the building and generate a space health score with the building data based on the one or more space parameters indicating the health levels of spaces of the building. In some embodiments, the instructions cause the one or more processors to generate a planet health score with the building data based on the one or more planet health parameters relating to the effect of the building on environmental pollution and generate an overall health score based on the people health score, the space health score, and the planet health score. In some embodiments, the instructions cause the one or more processors to generate a home screen including the people health score, the space health score, the planet health score, and the overall health score and cause the display device to display the home screen.

In some embodiments, the instructions cause the one or more processors to generate a trend element, the trend element including a trend of at least one of the people health score, the space health score, the planet health score, or the overall health score over a time period and cause the home screen to include the trend element.

In some embodiments, the instructions cause the one or more processors to generate a list of buildings based on a specific overall health score for each of buildings, the list of buildings listing the buildings from lowest overall health score to highest overall health score and cause the home screen to include the list of buildings.

In some embodiments, the instructions cause the one or more processors to identify alerts indicating issues occurring at the building, the alerts impacting the overall health score by a particular amount and reducing the overall health score and cause the home screen to include the alerts and the particular amount impacting the overall health score.

In some embodiments, the instructions cause the one or more processors to receive a first selection, via the user device, of a first element associated with the people health score, cause the display device to display sub-scores of the people health score in response to receiving the first selection, wherein the people health score is based on the sub-scores of the people health score, and receive a second selection, via the user device, of a second element associated with the space health score. In some embodiments, the instructions cause the one or more processors to cause the display device to display sub-scores of the space health score in response to receiving the second selection, wherein the space health score is based on the sub-scores of the space health score, receive a third selection, via the user device, of a third element associated with the planet health score, and cause the display device to display sub-scores of the planet health score in response to receiving the second selection, wherein the planet health score is based on the sub-scores of the planet health score.

Another implementation of the present disclosure is a method including receiving, by a processing circuit, building data from one or more building systems of a building and causing, by the processing circuit, a display device of a user device of a user to display, based on the building data, one or more building scores of the building based on at least one of one or more space parameters indicating health levels of spaces of the building, one or more planet health parameters relating to an effect of the building on environmental pollution, or one or more people parameters relating to at least one of physical or mental health of occupants of the building. In some embodiments, the method includes generating, by the processing circuit, one or more recommendations for improving the one or more building scores, the one or more recommendations including a prediction of an increase to a level of the one or more building scores or a decrease to the level of the one or more building scores, causing, by the processing circuit, the display device of the user device of the user to display the one or more recommendations and receive, via the display device, a selection of one recommendation of the one or more recommendations via the display device from the user, and operating, by the processing circuit, the one or more building systems based on one or more operating settings of the one recommendation.

In some embodiments, the method includes receiving, by the processing circuit, second building data resulting from operation of the one or more building systems based on the one or more operating settings of the one recommendation, generating, by the processing circuit, one or more second building scores with the second building data based on the at least one of one or more space parameters indicating the health levels of spaces of the building, the one or more planet health parameters relating to the effect of the building on environmental pollution, or the one or more people parameters relating to the at least one of physical or mental health of occupants of the building, and causing, by the processing circuit, the display device to display the one or more second building scores.

In some embodiments, the method includes determining, by the processing circuit, one or more monthly financial costs resulting from energy consumption resulting from operating the one or more building systems based on the one or more recommendations and causing, by the processing circuit, the display device to display the one or more monthly financial costs.

In some embodiments, the method includes generating, by the processing circuit, a user interface including the one or more recommendations, one or more monthly financial costs resulting from energy consumption resulting from the one or more recommendations, and particular operating settings for the one or more recommendations and a current operating state of the building, a current monthly financial cost, and one or more current operating settings and causing, by the processing circuit, the display device to display the user interface.

In some embodiments, the one or more recommendations include a first recommendation and a second recommendation. In some embodiments, the first recommendation includes one or more first proposed settings for the one or more operating settings. In some embodiments, the second recommendation includes one or more second proposed settings for the one or more operating settings.

In some embodiments, the method includes generating, by the processing circuit, a people health score with the building data based on the one or more people parameters relating to the at least one of physical or mental health of occupants of the building, generating, by the processing circuit, a space health score with the building data based on the one or more space parameters indicating the health levels of spaces of the building, and generating, by the processing circuit, a planet health score with the building data based on the one or more planet health parameters relating to the effect of the building on environmental pollution. In some embodiments, the method includes generating, by the processing circuit, an overall health score based on the people health score, the space health score, and the planet health score, generating, by the processing circuit, a home screen including the people health score, the space health score, the planet health score, and the overall health score, and causing, by the processing circuit, the display device to display the home screen.

In some embodiments, the method includes generating, by the processing circuit, a trend element, the trend element including a trend of at least one of the people health score, the space health score, the planet health score, or the overall health score over a time period and causing, by the processing circuit, the home screen to include the trend element.

In some embodiments, the method includes generating, by the processing circuit, a list of buildings based on a specific overall health score for each of buildings, the list of buildings listing the buildings from lowest overall health score to highest overall health score and causing, by the processing circuit, the home screen to include the list of buildings.

In some embodiments, the method includes identifying, by the processing circuit, alerts indicating issues occurring at the building, the alerts impacting the overall health score by a particular amount and reducing the overall health score and causing, by the processing circuit, the home screen to include the alerts and the particular amount impacting the overall health score.

Another implementation of the present disclosure is a building system of a building including one or more storage devices storing instructions thereon and one or more processors configured to execute the instructions that cause the one or more processors to receive building data from one or more building systems of the building and cause a display device of a user device of a user to display, based on the building data, one or more building scores of the building based on at least one of one or more space parameters indicating health levels of spaces of the building, one or more planet health parameters relating to an effect of the building on environmental pollution, or one or more people parameters relating to at least one of physical or mental health of occupants of the building. The instructions cause the one or more processors to generate one or more recommendations for improving the one or more building scores, the one or more recommendations including a prediction of an increase to a level of the one or more building scores or a decrease to the level of the one or more building scores, cause the display device of the user device of the user to display the one or more recommendations and receive, via the display device, a selection of one recommendation of the one or more recommendations via the display device from the user, and operate the one or more building systems based on one or more operating settings of the one recommendation.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 19 is a table of air quality parameter scoring, according to an exemplary embodiment.

FIG. 20 is a table of thermal comfort parameter scoring, according to an exemplary embodiment.

FIG. 21 is a table of light parameter scoring, according to an exemplary embodiment.

FIG. 22 is a table of light sunshade parameter scoring, according to an exemplary embodiment.

FIG. 23 is a table of occupancy parameter scoring, according to an exemplary embodiment.

FIG. 24 is a table of healthy building parameter scoring, according to an exemplary embodiment.

FIG. 25 is a table of sound parameter scoring, according to an exemplary embodiment.

FIG. 26 is a table of sanitization parameter scoring, according to an exemplary embodiment.

FIG. 27 is a table of food parameter scoring, according to an exemplary embodiment.

FIG. 28 is a table of fitness parameter scoring, according to an exemplary embodiment.

FIG. 29 is a table of handwashing parameter scoring, according to an exemplary embodiment.

FIG. 30 is a table of water quality parameter scoring, according to an exemplary embodiment.

FIG. 31 is a table of pest control parameter scoring, according to an exemplary embodiment.

FIG. 32 is a table of emergency parameter scoring, according to an exemplary embodiment.

FIG. 33 is a table of accessibility parameter scoring, according to an exemplary embodiment.

FIG. 34 is a table of mind parameter scoring, according to an exemplary embodiment.

FIG. 35 is a table of social parameter scoring, according to an exemplary embodiment.

FIG. 36 is a table of physical user health parameter scoring, according to an exemplary embodiment.

FIGS. 56A-B is a user interface including indoor health recommendations, employee productivity recommendations, space utilization recommendations, energy efficiency recommendations, and asset upkeep recommendations, according to an exemplary embodiment.

DETAILED DESCRIPTION

Overview

Figure 1:
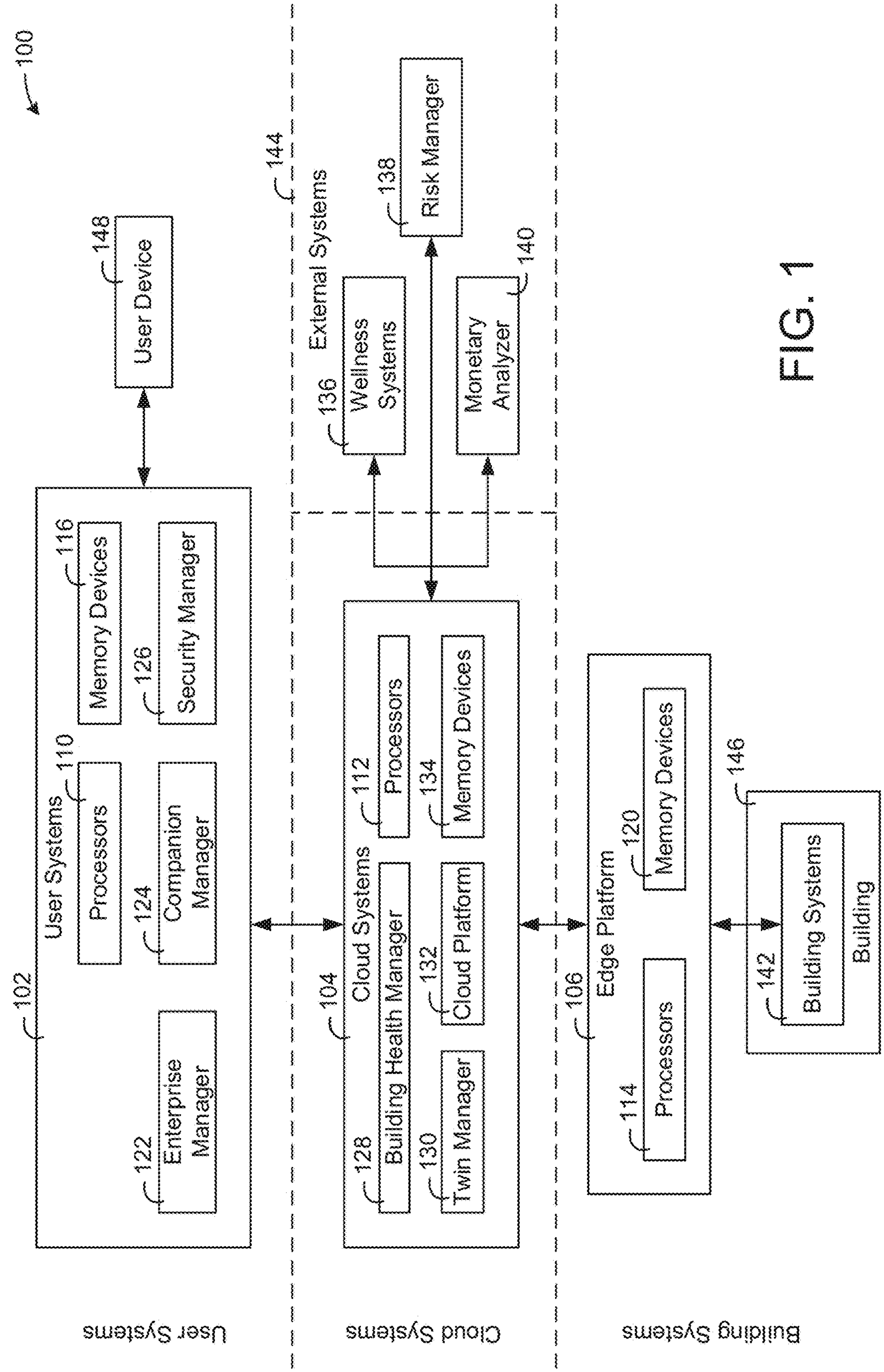
FIG. 1 is a block diagram of a system including building systems, cloud systems, and user systems including a building health manager for managing building health, according to an exemplary embodiment.

Referring generally to the FIGURES, systems and methods for a building system with recommendation interfaces is shown, according to an exemplary embodiment. The recommendation interfaces can provide various recommendations generated through machine learning models. The recommendations can be recommendations in various category types, e.g., employee productivity, energy efficiency, space utilization, asset upkeep, etc. The recommendations can be presented to the user via a user interface and allow the user to interact with each recommendation, either accepting or declining the recommendations.

In some embodiments, the building system can categorize recommendations and/or organize the recommendations in a user interface according to their category. In some embodiments, the user interface could include multiple elements, e.g., windows, tables, groupings, etc. Each window could include a list of recommendations for the category of recommendation that the window is generated for, e.g., a window of employee productivity recommendations, a window of energy efficiency recommendations, etc. This organization of recommendations can aid a user in quickly understanding what impact a particular recommendation will have, e.g., will help increase employee productivity, will increase energy efficiency, etc. Each window can, in some embodiments, include elements for accepting and/or rejecting each recommendation.

In some embodiments, the system can generate recommendations by learning preferences of the user or users based on what recommendations are approved and what recommendations are rejected. For example, if a user always declines recommendations to lower temperature setpoints by amounts greater than five degrees, the system can learn that the user does not want to make large reductions in temperature setpoint. The system can train one or more models based on indications of the user accepting and/or declining recommendations. The system can use the model to predict which recommendations are likely to be approved by the user and only provide recommendations to a user that have a high level of likelihood to be approved (e.g., a probability of approval above a particular level).

In some embodiments, a user can provide the building system with a goal for a particular metric. For example, the goal could be to reduce energy spend to be a particular budget amount. Another goal could be to increase employee productivity to a particular level. In some embodiments, the user can provide the building system with a set of different goals. The building system can run one or more machine learning models to identify recommendations that help meet the one or more goals. The building system can generate new recommendations over time as dynamic conditions around the building change (e.g., weather, building equipment deterioration, energy prices changing, etc.).

In some embodiments, the user interface can include a three dimensional graphical model of the building, e.g., a BIM viewer. A user can navigate throughout the building and view recommendations generated by the building system within the BIM. In some embodiments, the recommendations that are displayed affect the particular area that is viewed in the BIM. For example, a recommendation to change a setpoint for a particular space may be displayed when the user is viewing the particular space. In some embodiments, a separate recommendation element can be included within the user interface to provide indications of the recommendations for the space that is currently being viewed by the user.

In some embodiments, various charts and graphs can be displayed in various user interfaces by the building system, the charts and graphs summarizing the recommendations, approval of the recommendations, rejection of the recommendations, etc. For example, the building system could generate charts that indicate a portion of recommendations that are accepted, rejected or unacknowledged by a user. Furthermore, the building system could generate a chart that summarizes the number and type of each recommendation made.

Referring now to FIG. 1, a system 100 including building systems, cloud systems, and user systems including a building health manager for managing building health, according to an exemplary embodiment. The system 100 includes an edge platform 106, cloud systems 104, user systems 102, and/or external systems 144 (e.g., wellness systems 136, monetary analyzer 140, and/or a risk manager 138). The edge platform 106, the cloud systems 104, and/or the user systems 102 include processors 110-114 and/or memory devices 116-120.

The processors 110-114 and/or memory devices 116-120 can be devices of one or multiple servers, computer systems, cloud systems, etc. The processors 110-114 can be general purpose or specific purpose processors, application specific integrated circuits (ASICs), one or more field programmable gate arrays (FPGAs), a group of processing components, and/or other suitable processing component. The processors 110-114 may be configured to execute computer code and/or instructions stored in the memory devices 116-120 or received from other computer readable media (e.g., CDROM, network storage, a remote server, etc.).

The memory devices 116-120 can include one or more devices (e.g., memory units, memory devices, storage devices, etc.) for storing data and/or computer code for completing and/or facilitating the various processes described in the present disclosure. The memory devices 116-120 can include random access memory (RAM), read-only memory (ROM), hard drive storage, temporary storage, non-volatile memory, flash memory, optical memory, or any other suitable memory for storing software objects and/or computer instructions. The memory devices 116-120 can include database components, object code components, script components, or any other type of information structure for supporting the various activities and information structures described in the present disclosure. The memory devices 116-120 can be communicably connected to the processors 110-114 and can include computer code for executing (e.g., by the processors) one or more of the processors 110-114 described herein.

The cloud systems 104 includes a twin manager 130 and a cloud platform 132. The twin manager 130, the cloud platform 132, and/or the edge platform 106 can be the same as, or similar to, the components described U.S. patent application Ser. No. 17/134,671 filed Dec. 28, 2020, the entirety of which is incorporated by reference herein. The cloud systems 104 further include a building health manager 128. The edge platform 106 can be configured to integrate with building systems 142 to receive building data and provide the building data to the cloud systems 104. Furthermore, the cloud platform 132 can facilitate routing of the building data and/or enrichment of the building data based on a digital twin of a building managed by the twin manager 130. In some embodiments, the building systems 142 are environmental control systems, lighting systems, security systems, fire response systems, and/or any other type of building system.

The building health manager 128 can be configured to generate health scores for parameters such as planet health parameters, people health parameters, and/or space health parameters. Furthermore, the building health manager 128 can be configured to generate an overall health score from the scores for the planet health parameters, people health parameters, and/or space health parameters. The building health manager 128 can receive data from the building systems 142 and generate the scores for the planet health parameters, people health parameters, and/or space health parameters. The building health manager 128 can generate a building automation system (BAS) performance index, a light management system (LMS) performance index, a shade performance index, etc.

The building health manager 128 can receive building data from the building systems 142 and/or the external systems 144 for determining person health scores. The building data can include temperature, humidity, indoor air quality (IAQ), building lighting information, building sunshade information, seating information, sanitization information, emergency information, dining options, social distancing information, thermal control data, occupancy data, mental health data, social event data, etc. The building health manager 128 can determine occupant health scores for occupants and/or perform one or more control operations to improve the person health scores. For example, the building health manager 128 can determine and/or update control values for temperature, humidity, IAQ, light, and/or sunshade to improve person health scores.

The building health manager 128 can generate scores for system health of a building 146. The system health scores for building management systems (BMS), light management systems (LMS), sunshade systems, electrical metering and fire alarm systems, accessibility, transportation systems, parking management systems, power generation, access control systems, recycling systems, etc. Furthermore, the building health manager 128 can generate safety and security system health scores based on hardware point data, cyber security data (e.g., network cyber security data, Wi-Fi security data, firewall and/or port blocking data, antivirus data, etc.), fire alarm and suppression system data, electrical system data, water leak detection data, fire suppression system data, sprinkler system data, smoke detection data, staircase pressurization system data, evacuation system data, etc. Furthermore, the building health manager 128 can determine resource health scores for electrical usage, gas usage, and/or water usage (e.g., chilled or heated water usage) based on meter data received from the building systems 142.

The building health manager 128 can receive security system data from CCTVs, intrusion systems, glass-break systems, number plate recognition systems, evacuation system data, facial recognition systems, biometric reader systems. Furthermore, the building health manager 128 can be configured to generate service health scores indicating mechanical, electrical, sound systems, chemical systems, life safety, and transportation system, and/or plumbing system service.

In some embodiments, the building data received from the edge platform 106 is ingested and stored in a digital twin of the building 146 managed by the twin manager 130. The digital twin can be the digital twin described in U.S. patent application Ser. No. 17/134,671 filed Dec. 28, 2020. The digital twin can be a graph including edges and nodes representing the entities of the building 146 (e.g., the building 146, spaces of the building 146, devices, users, systems, etc.) and relationships between the entities. In some embodiments, the digital twin can store health data of the building 146 used by the building health manager 128 to generate the planet health scores, space health scores, people health scores, and/or overall building scores. The digital twin can store health related metadata descriptions for points, devices, systems, equipment, spaces, buildings, etc. The digital twin can, in some embodiments, store health scores for the entities of the digital twin, e.g., health scores for buildings, spaces, people, etc.

In some embodiments, the building health manager 128 can be configured to search and filter health criteria for displaying health information and scores on a user device 148. Furthermore, various building control operations, e.g., calculations, logic, workflows, automation, machine learning, artificial intelligence, etc. that the building health manager 128 may execute to control the building systems 142, can all incorporate health scores for inputs and outputs of the building control operations. In this regard, the building control operations may execute to account for health and improve health scores. For example, a machine learning algorithm that determines setpoints to use in a zone based on predicted occupancy can incorporate health scores into the setpoint optimization to determine setpoints that result in ideal health scores.

The cloud systems 104 are configured to receive health data from the various external systems 144. The health data received from the external systems 144 can be used by the building health manager 128 to determine health scores. For example, the cloud systems 104 can connect with other external systems 144 managed and/or owned by the same or a different entity, e.g., partner systems. The wellness systems 136 can provide information on the mental, emotional, and/or physical health of occupants of the building 146. The risk manager 138 can provide risk related data for the building 146, the building systems 142 of the building 146 and/or occupants of the building 146. For example, the risk manager 138 can provide risk scores to the cloud systems 104. The risk manager 138 can be the systems described in U.S. application Ser. No. 16/143,221 filed Sep. 26, 2018, the entirety of which is incorporated by reference herein. The external systems 144 further include a monetary analyzer 140. The monetary analyzer 140 can be configured to perform monetization optimizations and/or provide expense reports of the building 146 to the cloud systems 104 based on the operation of the building systems 142.

The system 100 includes a user device 148. The user device 148 can be any device that provides information to a user and receives input from the user. The user device can include various input and/or output devices, e.g., a keyboard, a mouse, a touch screen, a microphone, a speaker, a display, etc. The user device 148 can be a smartphone, a tablet, a laptop, a desktop computer, a console, a smart television, etc.

The user systems 102 can manage user interfaces displayed on the user device 148. The user systems 102 can generate the user interfaces and cause the user device 148 to display the user interfaces. In some embodiments, the user systems 102 can be configured to provide input to the user systems 102 via the user interfaces. The user systems 102 include an enterprise manager 122, a companion manager 124, and a security manager 126. The user interfaces may be the user interfaces shown and described with reference to FIGS. 13-18, 37, and 38.

The enterprise manager 122 can generate one or more interfaces that provide visibility to building health aspects with health scores, descriptions, trends, insights, and/or actionable recommendations. The enterprise manager 122 can provide easy, intuitive navigation and drill down for rollups of health data to organize detailed information related to concepts and scores. Furthermore, the interfaces can include progress reports.

The companion manager 124 can provide occupant health information in user interfaces. The occupant health information can include feedback on clean, comfortable spaces (e.g., air, water, light, sanitization, etc.), social distancing and connectivity information, productivity measures, nourishment and fitness goals, reward points, etc. Furthermore, the companion manager 124 can provide user interfaces including health information for spaces. The information can include systems availability and/or provide feedback on janitorial services. Furthermore, the companion manager 124 can provide planet health information. For example, the interface can include responsibility and conversation information, corporate sustainability progress and success, nature information, and/or reward points.

The security manager 126 can provide security information via user interfaces for security professionals. The information can include health for spaces (e.g., places within a building), safety and security risk information, process and actionable recommendations for improving health and/or risk, etc.

In some embodiments, the cloud systems 104 can receive data from the building systems 142 and/or the external systems 144. The building health manager 128 can generate health scores based on the data. The data can include space equipment relationships, time series data for temperature, humidity, pressure, IAQ, velocity, light and sunshade data. In some embodiments, the building health manager 128 can be configured to generate thermal, air, and/or light health scores based on the data. Furthermore, based on the data, the health manager 128 can perform HVAC, light, and/or sunshade command and/or control. In some embodiments, the cloud systems 104 can manage a pest administration portal to review and schedule pest control for the building 146.

In some embodiments, the building health manager 128 can be configured to receive mechanical and/or electrical fault data from the building systems 142. Based on the fault data (or the absence of fault data), the building health manager 128 can generate building health scores for the building 146. The fault data can include high air pressure faults, high water pressure faults, high temperature faults, coil freezing faults, high voltage faults, overload faults, short circuit faults, earth faults, high harmonic faults, etc.

Figure 2:
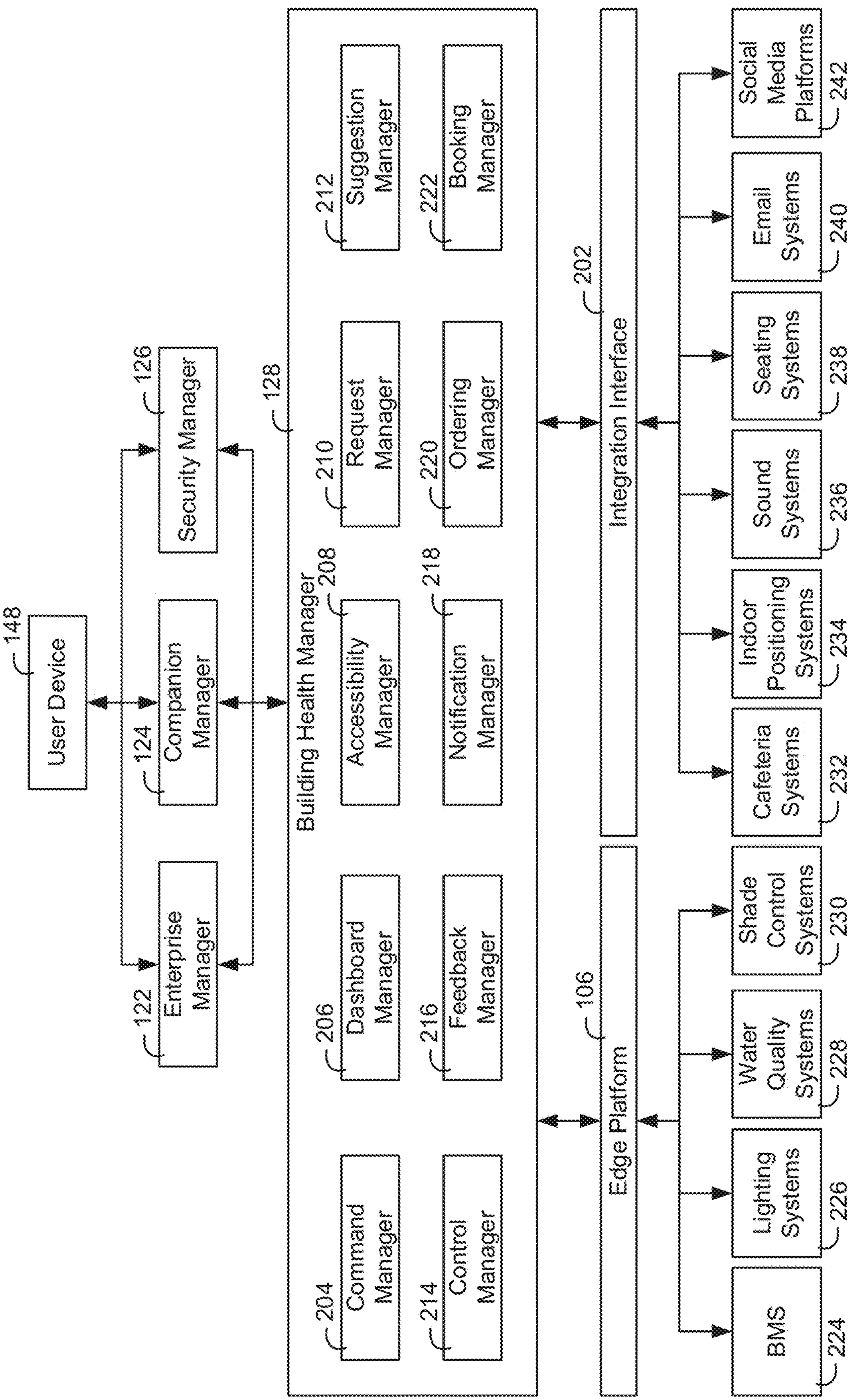
FIG. 2 is a block diagram of the building health manager in greater detail, according to an exemplary embodiment.

Referring now to FIG. 2, the building health manager 128 is shown in greater detail, according to an exemplary embodiment. The building health manager 128 is shown to receive building data from systems 224-242 via the edge platform 106 and via an integration interface 202. The systems 224-242 can be systems of the building systems 142. In some embodiments, the integration interface 202 is an Application Programming Interface (API) that interfaces systems 234-242 with the building health manager 128. The building management system (BMS) 224 which can include systems for heating the building 146, cooling the building 146, controlling air quality within the building 146, etc. The lighting systems 226 can include lights and/or light control systems configured to control lighting parameters in various zones of the building 146, e.g., turn lights on or off, control the level of light, control the hue of light, etc.

The water quality systems 228 can be configured to measure water quality of water for the building 146, e.g., water used in the building 146 or used by particular systems of the building 146. The shade control system 230 can be configured to control the shades (e.g., control shade position) of various windows of the building 146. The cafeteria systems 232 can be configured to manage food ordering and/or food delivery within the building 146. The indoor positioning systems 234 can be configured to identify occupants and/or track the location of occupants within the building 146, e.g., through Wi-Fi triangulation or trilateration, Bluetooth beacons, 5G tracking, GPS, etc.

The sound systems 236 can be control sound played by speakers throughout various zones of the building 146. The sound systems 236 can control announcements, music, white noise, etc. The email systems 240 can manage email servers for sending and/or receiving emails. The email systems 240 can manage email accounts for various employees, tenants, and/or users of the building 146. The social media platforms 242 can be a social media platform that facilitates message post feeds, group conversations, messaging, etc. The social media platforms 242 can include social media accounts for the building 146 or entity, e.g., a company, a tenant of the building 146, an employee of the building 146, etc.

The seating systems 238 can be systems that perform desk scheduling, e.g., hot desking. Furthermore, the seating systems 238 can track the number and locations of desks, seats, tables, chairs, couches, etc. throughout the building. For example, the seating systems 238 can provide the building health manager 128 with data pertaining to seating, seating scheduling, and/or what types of seats occupants are using.

The building health manager 128 includes various components for managing or operating the systems 224-242. The building health manager 128 includes a command manager 204, a dashboard manager 206, an accessibility manager 208, a request manager 210, a suggestion manager 212, a control manager 214, a feedback manager 216, a notification manager 218, an ordering manager 220, and a booking manager 222.

The command manager 204 can be configured to control systems 224-242. The command manager 204 can receive commands for controlling characteristics of the building 146 from the user device 148 and operate the systems 224-242 based on the commands. The command manager 204 can control zone temperature, control HVAC equipment on or off status, control optimum equipment start, control humidity, control indoor air quality (IAQ), control static pressure, operate an air/night purge mode, control air velocity in the building 146, control particulate matters in the building 146, activate filters, control organic gasses in the building 146, control inorganic gasses in the building 146, control radon levels in the building 146, control water quality in the building 146, control water temperature, turn lights on or off, control light intensity, control sunshades, control noise levels of the building 146, control music played in the building 146, personalize comfort, turn desk lights on or off, control desk light intensity, control desk light color, control music played in a gym, etc.

The dashboard manager 206 can generate dashboards for display via the user device 148. The user device 148 can provide input via the dashboards. The dashboard can display, and/or provide control over, zone temperature, static pressure, air velocity, particulate matters, gasses, water quality, light status, sunshade status, sanitization status, gym occupancy status, etc.

The feedback manager 216 can aggregate feedback received from the user device 148. The feedback manager 216 can generate feedback reports based on the feedback collected. The feedback reports can include complaints and/or feedback over building smell, water quality, noise levels, employee sickness, etc.

The accessibility manager 208 can facilitate navigation or directions for the user device 148. The accessibility manager 208 can receive navigation requests via the user device 148 and generate navigation directions for display to the user via the user device 148. The navigation directions can aid users in finding or viewing information pertaining to water refilling stations, eating areas, contract tracing, gardens, other employees, rooms, etc. In some embodiments, the accessibility manager 208 receives data from elevator systems and/or escalator systems.

The notification manager 218 can be configured to generate alerts pushed and/or communicated to the user device 148. The alerts can be a dehydration alert, a sunshade alert, a sanitization completed alert, duress alarms, a food order ready alert, a fruit basket arrived alert, a lunch break alert, a coffee break alert, an eye relaxation alert, a social distancing alert, a health data alert, a fitness program alert, a pest control status, a fitness awareness alert, a no movement alert, a gym occupancy alert, a hand washing alert, a sanitization alert, a medical emergency alert, an indoor air quality alert, a bush fire alert, a mental health program alert, a nearby social event alert, etc.

The request manager 210 can receive requests from the user device 148 and make control updates and/or notify technicians to improve systems of the building 146 based on the requests. The requests may be requests to improve smell, improve air replacement, add more water refilling stations, request a desk or room booking, request sanitization for an area or desk, order food, pest control, playing music in a gym, facilitate air replacement, book a bicycle or vehicle, etc.

The ordering manager 220 can be configured to order food and/or drinks for users. A user can place an order to the cafeteria systems 232 via the user device 148. In some embodiments, the order can include a delivery request with delivery location (e.g., employee desk).

The suggestion manager 212 can be configured to generate suggestions for improving employee mental and/or physical health. The suggestion manager 212 can send the suggestions to the user device 148. The suggestions may be nourishment education, physical activity suggestions, hand washing suggestions, mental health suggestions, suicide prevention help, etc. The booking manager 222 can be configured to facilitate room or desk booking. For example, the booking manager 222 can book conference rooms, meeting rooms, make gym appointment bookings, etc. Furthermore, the booking manager 222 can facilitate desk booking, e.g., hot-desking.

Figure 3:
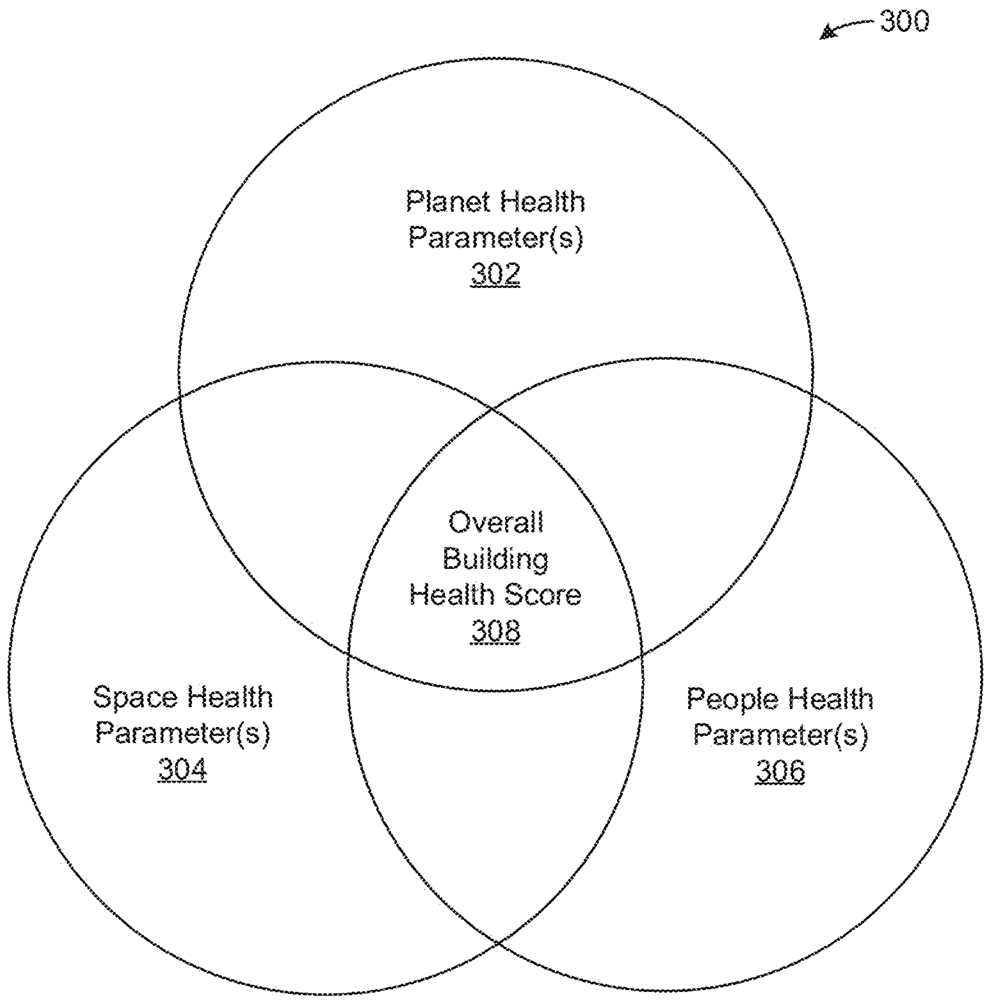
FIG. 3 is a Venn diagram of planet health parameters, space health parameters, and people health parameters contributing to an overall building health score, according to an exemplary embodiment.

Referring now to FIG. 3, a Venn diagram 300 of planet health parameters 302, space health parameters 304, and people health parameters 306 contributing to an overall building health score 308 is shown, according to an exemplary embodiment. The planet health parameters 302, the space health parameters 304, and the people health parameters 306 can individually describe the health of different aspects of the building 146, e.g., the planet, spaces of the building 146, and people of the building 146. Together, the planet health parameters 302, the space health parameters 304, and the people health parameters 306 can contribute to an overall building health score 308. In some embodiments, the people health parameters 306 do not include any medical records of individuals. In this regard, the building health manager 128 can determine the influence of building system operation on the mental and/or physical health of occupants without requiring private medical records.

The planet health parameters 302 can be scores that describe the effect of operating the building 146 on the planet. For example, the planet health parameters 302 can indicate how much energy is consumed by the building 146, how much pollution is generated by the building 146, how much air is filtered by the building 146, etc.

The people health parameters 306 can be scores that describe the effect of operation of the building 146 and/or services offered by the building 146 on people, occupants of the building 146. The people health parameters 306 can indicate mental and/or physical health of occupants of the building 146. For example, temperature and/or humidity settings can be rated according to occupant comfort. Light levels, light color, and/or light hue can be rated according to the mental affect that the light has on the occupants. Similarly, services such as having a gym, personal trainer, healthy food options, etc. offered by the building 146 can indicate whether the scores describing whether the occupant health is high or low.

The space health parameters 304 can indicate the health levels of spaces of the building 146. For example, the presence of faults in building environmental control systems can indicate whether the building environmental control systems are operating well. Furthermore, emergencies such as flooding, fire, cyber security attacks, etc. can all indicate the health of space of the building 146.

Figure 4:
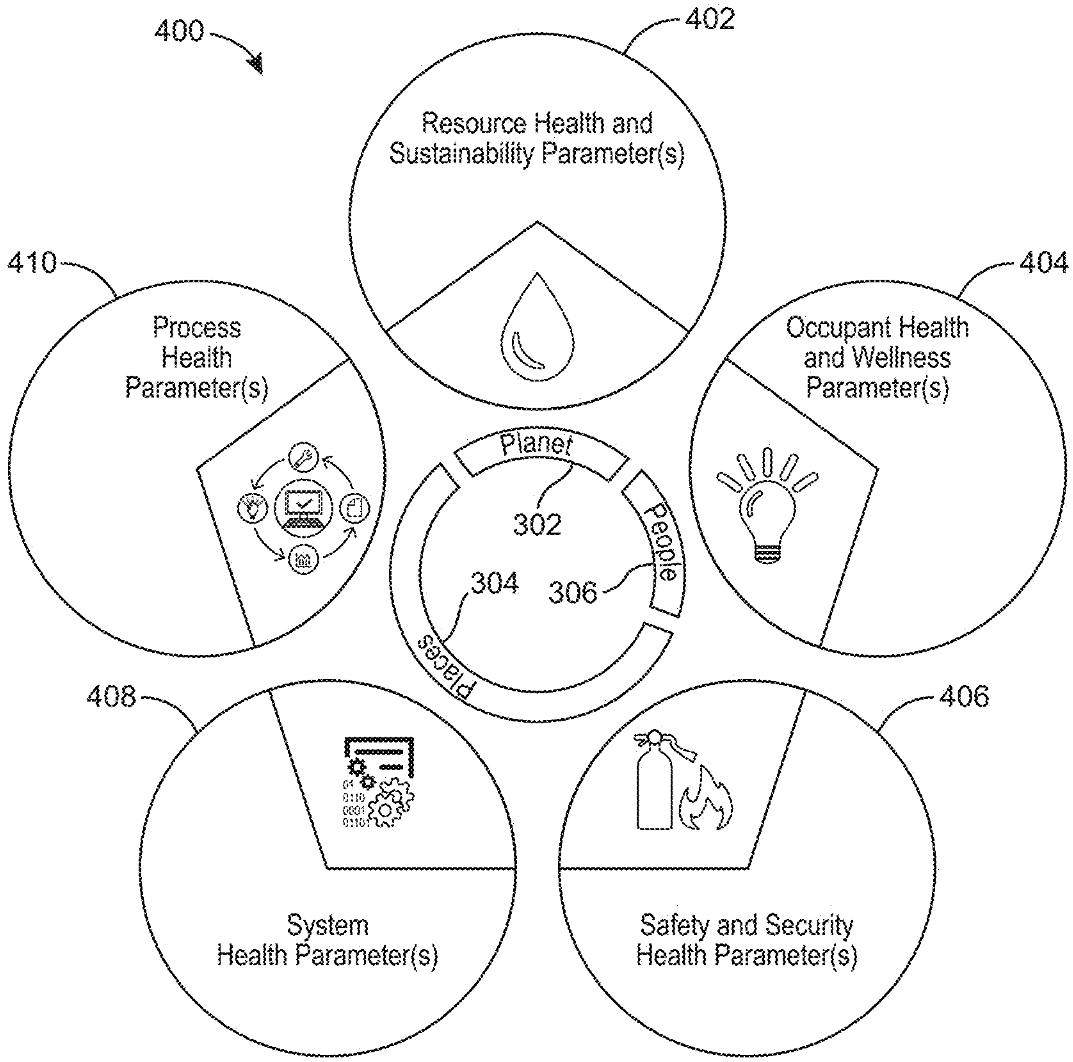
FIG. 4 is a schematic drawing of process health parameters, resource health and sustainability parameters, occupancy health and wellness parameters, safety and security health parameters, and system health parameters, according to an exemplary embodiment.

Referring now to FIG. 4, a diagram 400 of process health parameters 410, resource health and sustainability parameters 402, occupancy health and wellness parameters 404, safety and security health parameters 406, and system health parameters 408 is shown, according to an exemplary embodiment. The diagram 400 illustrates the planet health parameters 302, the people health parameters 306, and the space health parameters 304.

Furthermore, the relationships between the process health parameters 410, the resource health and sustainability parameters 402, the occupancy health and wellness parameters 404, the safety and security health parameters 406, and the system health parameters 408 and the planet health parameters 302, the people health parameters 306, and the space health parameters 304. As shown by the diagram 400, the process health parameters 410, the system health parameters 40, and the safety and security health parameters 406 are all parameters of the space health parameters 304. The resource health and sustainability parameters 402 are parameters of the planet health parameters 302. Furthermore, the occupant health and wellness parameters 404 are parameters of the people health parameters 306.

The process health parameters 410 can represent the health of processes of the building 146. The process health parameters 410 are shown and described in greater detail with respect to FIG. 9. The process health parameters 410 can be parameters that describe that presence and/or performance of processes such as regulatory compliance and audit, standard operating procedures, proactive maintenance and service, and/or quality of response. The process health parameters 410 can indicate the health of various services offered in the building 146, e.g., whether maintenance workflows are efficient, whether work order creation is automated, the presence of safety recommendations, the presence of informed capital planning services, whether cleaning services are efficient, etc.

The system health parameters 408 can be parameters that describe system health of systems of the building 146. The system health parameters 408 are shown and described in greater detail with respect to FIG. 8. The system health can be the health of a building automation system (BAS), fire systems, security systems, lighting systems, indoor positioning system data, electrical system data, etc. The system health can be reliability of control systems, the presence of autonomous control, the number of alarms, faults, manual override, etc. The system health parameters 408 can be based on air and water quality, sanitization of spaces, proactive asset maintenance, space utilization, whether spaces are smoke free, noise levels, space furnishing and usefulness, etc. The system health parameters 408 can include the software version of equipment of the building 146 and/or whether the equipment software versions are up to date.

The resource health and sustainability parameters 402 can indicate the effect of resource usage by the building system of the building 146 on the planet. The resource health and sustainability parameters 402 are shown and described in greater detail FIG. 10. The resource health and sustainability parameters 402 indicate the success of sustainability goals and/or net zero energy usage goals. The resource health and sustainability parameters 402 include the success of carbon footprint reduction. The resource health and sustainability parameters 402 indicate efficiency of HVAC operation, lighting operation, and/or utility usage. The resource health and sustainability parameters 402 indicate active utilization of spaces and assets. Furthermore, the resource health and sustainability parameters 402 indicate the presence and/or performance of central plant optimization and/or performance.

The resource health and sustainability parameters 402 further indicate energy health, e.g., whether electricity and/or water (e.g., hot water, cold water, etc.) is being used efficiently, whether HVAC systems and/or lighting control systems are operating autonomously to reduce energy usage, whether peak demand systems are operating properly, etc.

The occupant health and wellness parameters 404 indicate the mental, emotional, and/or physical health of occupants of the building 146. The occupant health and wellness parameters 404 are shown and described in greater detail with reference to FIG. 6. The occupant health and wellness parameters 404 indicate indoor air quality, the level of comfort for spaces of the building 146, whether a work environment is productive, the presence of frictionless experiences, the presence of social distancing, contact tracing, and engagement in the building 146, nourishment services, fitness services, stress, hand washing, etc.

The safety and security health parameters 406 can indicate health levels of security systems of the building 146. The safety and security health parameters 406 are shown and described in greater detail with reference to FIG. 7. The safety and security health parameters 406 indicate emergency responsiveness of security systems, the presence or absences of physical and/or cyber security threats, safety incidents that have occurred, alarm information, and/or whether safety and/or security needs of occupants of the building 146 are met. The safety and security health parameters 406 can indicate cyber security health levels, e.g., security levels of networks, Wi-Fi coverage in buildings, bandwidth availability of networks, antivirus presence and performance, firewall presence and performance, the presence of network security at particular ports, etc.

Figure 5A:
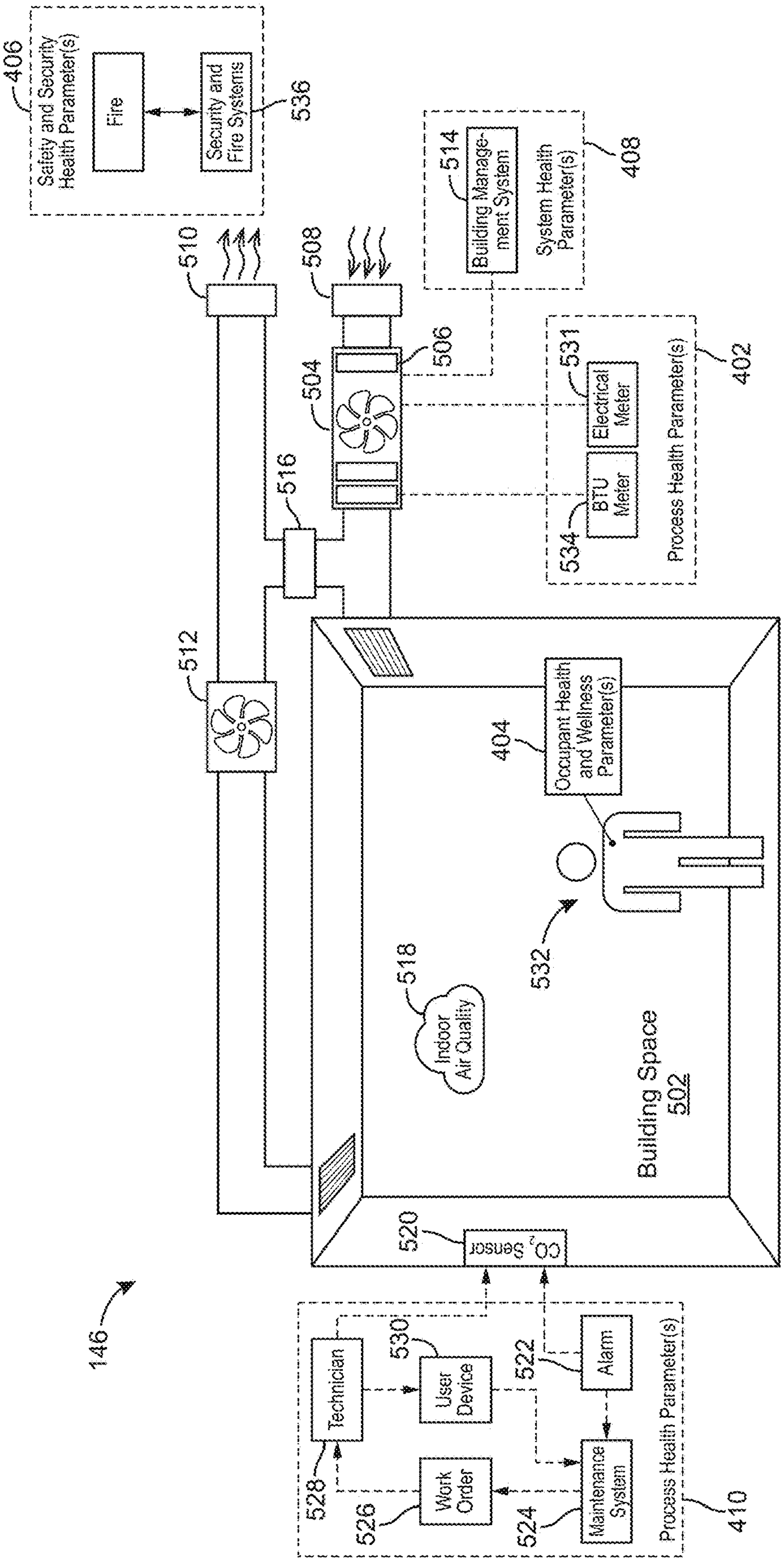
FIG. 5A is a schematic drawing of the health parameters of FIG. 4 shown in a building, according to an exemplary embodiment.

Referring now to FIG. 5A, the building 146 with the health parameters 402-410 of FIG. 4 is shown, according to an exemplary embodiment. The building 146 includes various pieces of equipment and a building space 502. However, any number and type of HVAC, security, fire response, or any other building subsystem can be included within the building 146 in addition to a variety of different spaces.

The building 146 includes an air handling unit 504 connected to a building management system 514 (e.g., one or more controllers). The building 146 further includes a British Thermal Unit (BTU) meter 534 and an electrical meter 531. The meters 534 and 531 can track the operation of the air handling unit 504, i.e., electricity used by the air handling unit 504 and/or thermal energy generated by the air handling unit 504. Furthermore, the meters 534 and 531 can measure electrical energy consumption of various pieces of equipment of the building 146 and/or energy generated by the pieces of equipment to heat or cool the building 146. The building 146 may further include water meters to track the water consumption and usage by equipment of the building 146. The building 146 can include electrical metering, gas metering, water metering, etc. and/or any other meter to track resource consumption of equipment of the building 146. The building 146 can include power generation, fuel management systems, and/or any other system.

The air handling unit 504 draws outside air through an outside air damper 506 and provides heated or cooled air to the building space 502. An exhaust fan 512 can exhaust air of the building space 502 out of the building 146 through the exhaust air damper 510.

The meters 534 and 531 can track energy usage of the building 146 and the efficiency of equipment of the building 146 to determine the effect of operation on the building 146 on the planet, e.g., the environment outside the building 146. The building health manager 128 can track the resource usage of the building 146 via the meters 534 and 531 and determine the resource health and sustainability parameters 402 to track an efficiency, sustainability, and/or energy usage of the building 146. For example, the building health manager 128 can determine whether an excessive amount of kWh is being consumed by the air handling unit 504.

Furthermore, occupant health and wellness parameters 404 can be determined for occupants of the building 146, e.g., the occupant 532, by the building health manager 128. The building health manager 128 can track what services are offered to the occupant 532, e.g., exercise programs, the availability of a gym, comfort levels of the building space 502, etc. The building health manager 128 can generate occupant health and wellness parameters 404 to track how well the building space 502 supports occupant mental and physical health.

The building 146 can determine safety and security health parameters 406. Security and fire systems 536 of the building can track events occurring in the building 146, e.g., the presence of fires, glass breaks, door forced open events, etc. Based on the presence or absence of fire or security threat events, the building health manager 128 can determine safety and security health parameters 406.

The building space 502 includes a carbon dioxide sensor 520. The carbon dioxide sensor 520 can cause an alarm 522 to be generated responsive to carbon dioxide readings going above a particular level. Responsive to the alarm 522 being generated, a maintenance system 524 can generate a work order 526. The work order 526 can identify the alarm 522, the carbon dioxide sensor 520, the building space 502, and/or any other system associate with the building space 502. The work order 526 can be provided to a user device 530 of a technician 528 who can work on the carbon dioxide sensor 520 or another system of the building 146 to resolve the alarm 522. Responsive to resolving the alarm 522, the technician 528 can provide a notice to the maintenance system 524.

The process health parameters 410 can be based on alarms, work orders, and technician actions such as the alarm 522 and the work order 526. The building health manager 128 can determine process health parameters 410 based on the performance of processes of the building 146. For example, an average response time indicating an average length of time for a technician to resolve a fault can be one of the process health parameters 410. Furthermore, the frequency of maintenance performed on building equipment of the building 146 can be another one of the process health parameters 410. Furthermore, the building health manager 128 can determine whether faults are present and in what number for building systems of the building 146, e.g., whether a fan is in a fault mode, whether a filter is clean, etc. The presence and number of the faults can be parameters of the process health parameters 410.

Figure 5B:
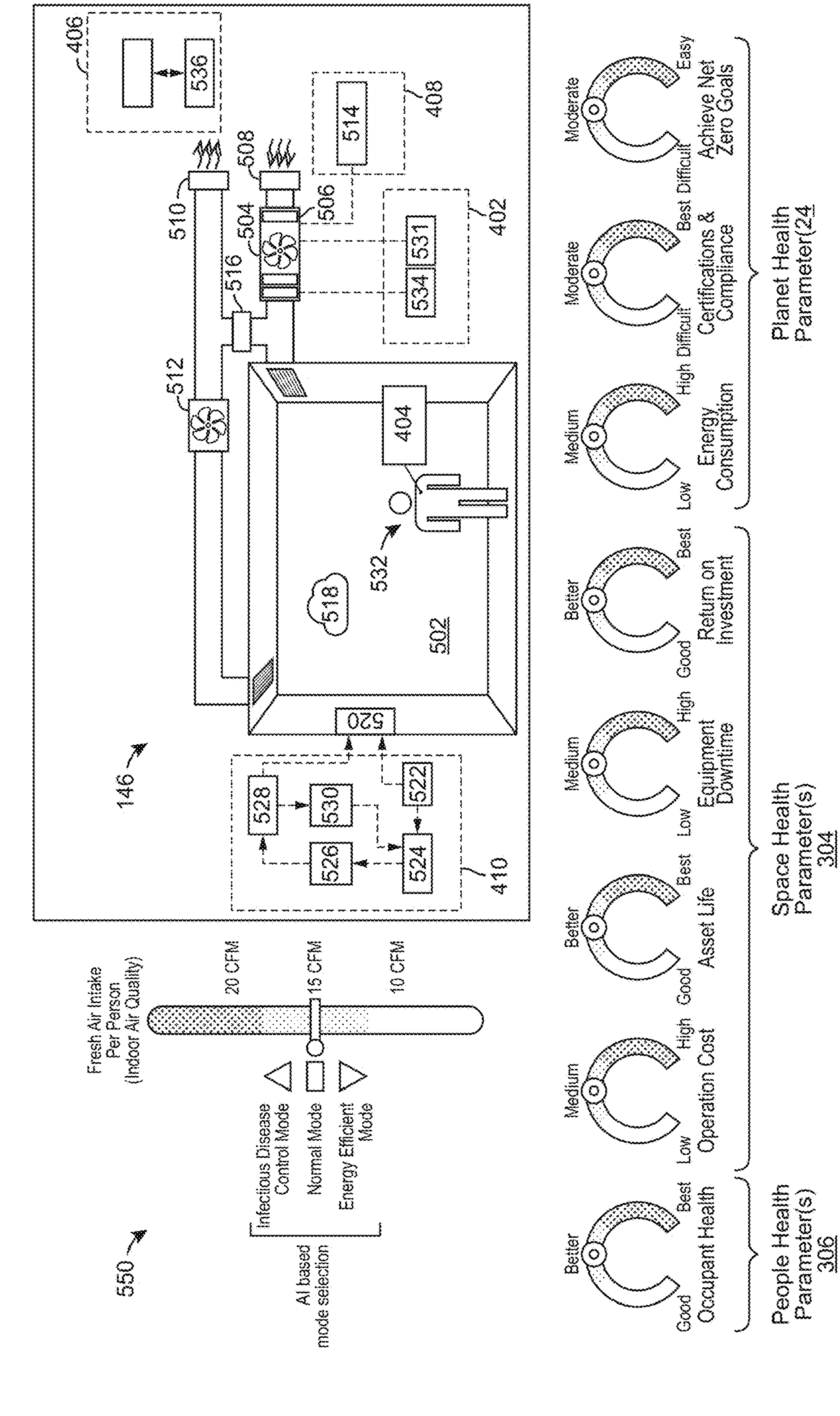
FIG. 5B-5D are schematic drawings of the building of FIG. 5A where an artificial intelligence performs a mode selection for balancing the health parameters, according to an exemplary embodiment.
Figure 5C:
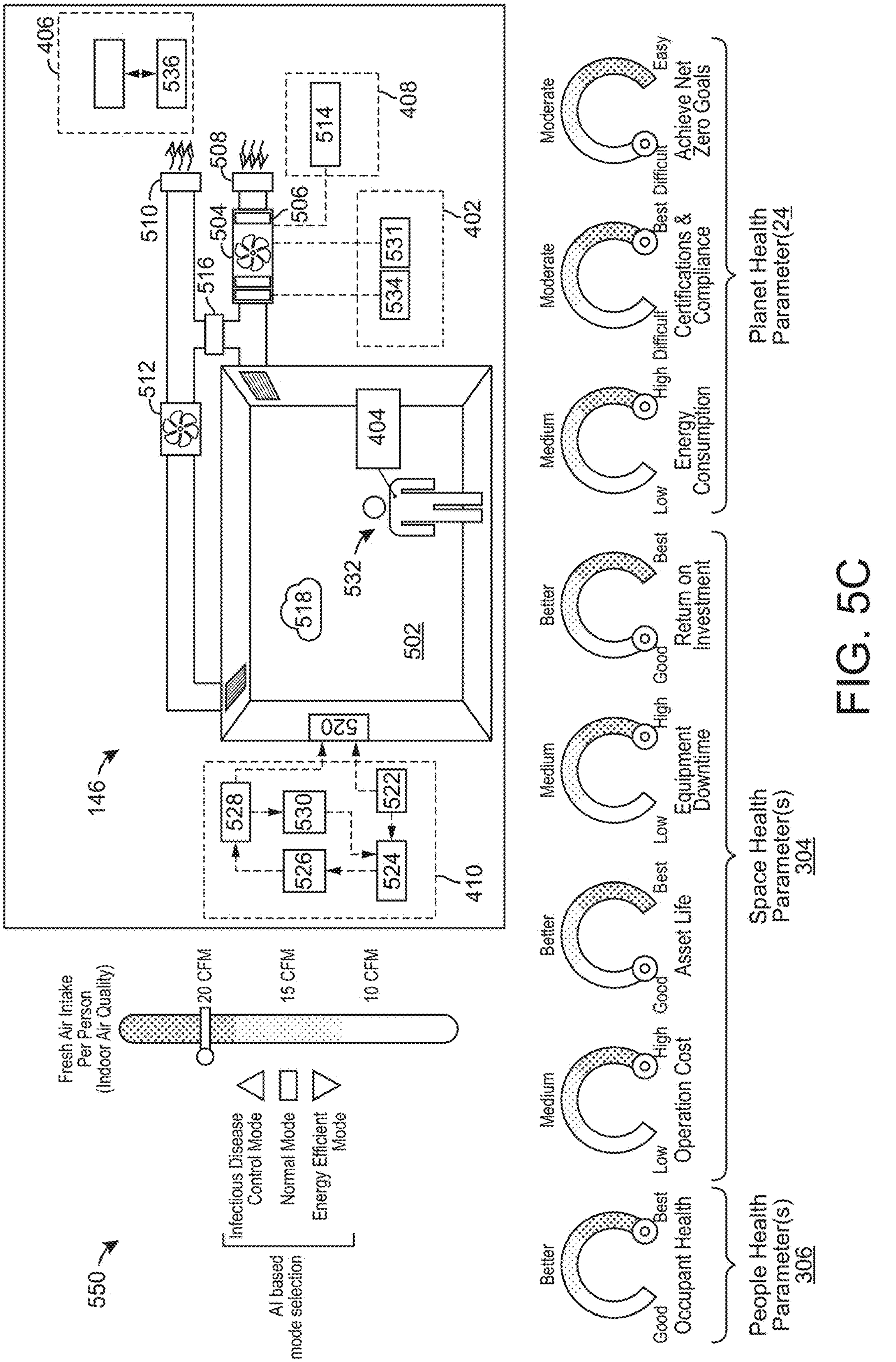
Figure 5D:
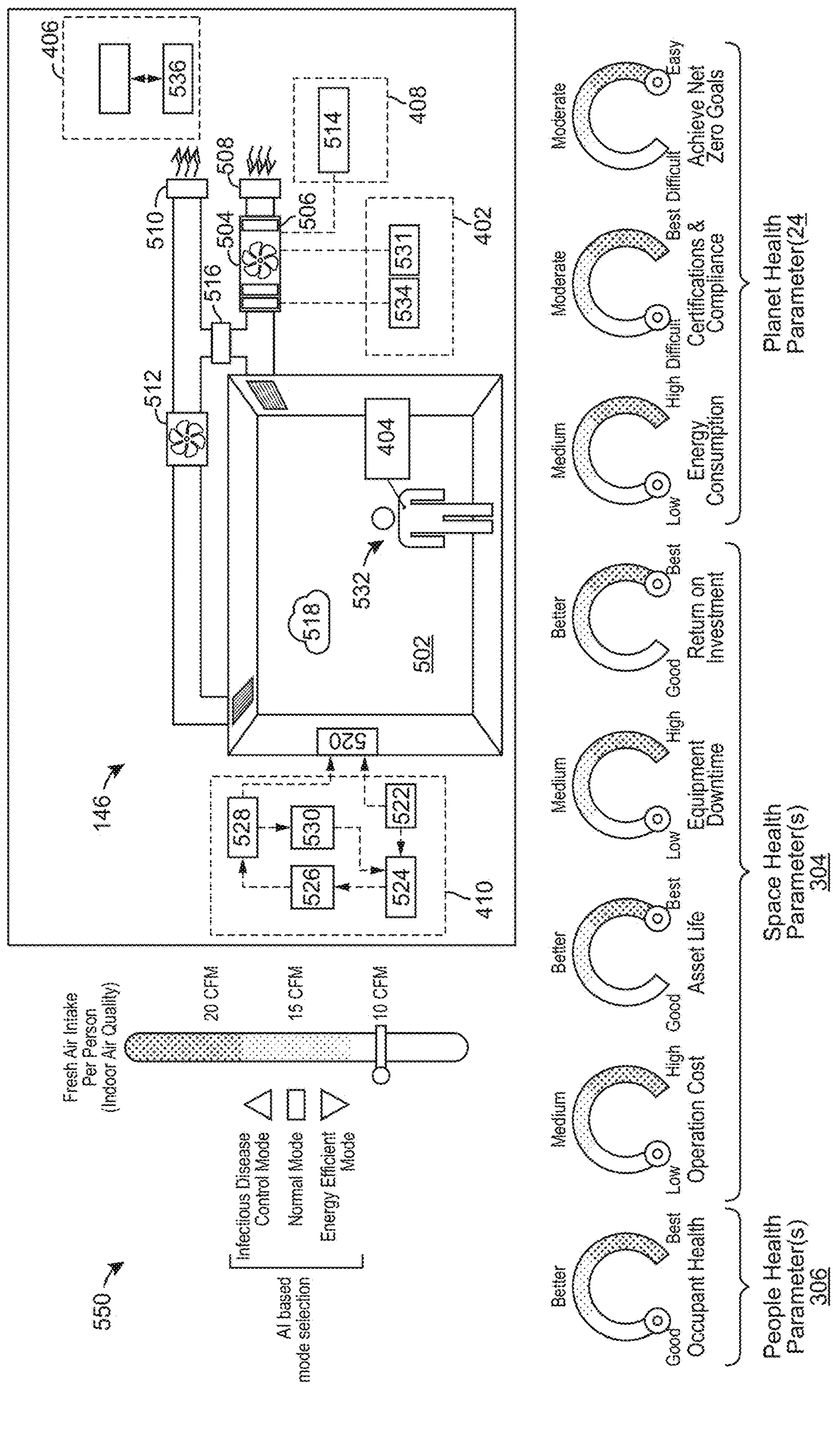

Referring now to FIGS. 5B-5D, schematic drawings of the building of FIG. 5A in the building of FIG. 5A where an artificial intelligence performs a mode selection for balancing the health parameters is shown, according to an exemplary embodiment. FIGS. 5B-5D illustrate balancing a fresh air intake per person parameter for the building space 502 by an artificial intelligence is shown. The artificial intelligence can be implemented and trained by the building health manager 128 and can be any type of artificial intelligence, e.g., a neural network, a linear programming component, a Gaussian model, a support vector machine, a Bayesian network, a decision tree, etc.

The building health manager 128 can implement an artificial intelligence that optimizes operation parameters of the building space 502. The artificial intelligence can determine what setting values result in optimal score(s) based on the people health parameters 306, the space health parameters 304, and the planet health parameters 302. The people health parameters 306 relate to occupant wellness, safety, satisfaction, and productivity of the building space 502. The people health parameters 306 can be parameters based on occupant health, e.g., whether air of the building space 502 is clean, whether ergonomics of the building space 502 are good, whether security of the building space 502 is present and operational, occupant wellness, and/or cleanliness and infection risk for occupants of the building space 502.

In some embodiments, adjusting environmental control parameters of the building management system 514 in the building space 502 to reduce the chance of air-borne infections between occupants can consume more energy and could make the building space 502 uncomfortable. Therefore, the artificial intelligence can solve and optimize for the people health parameters 306, the space health parameters 304, and the planet health parameters 302 to help a building achieve more of your objectives without sacrificing others, or at the very least inform a user of decisions for a building and provide operating recommendations to the users. In some embodiments, the element 550 is a user interface element that illustrates the operation of the artificial intelligence or an adjustable element for allowing a user to input control into a system. For example, when an infectious disease control mode of the element 550 is selected, as shown in FIG. 5C, the air flow increases, and the impact of this change can affect several other outcomes of the parameters 302-306. When the energy efficient mode of the element 550 is selected, as shown in FIG. 5D, the air flow decreases, and the impact of this change can affect the parameters 302-306. By understanding, calculating, monitoring, and reporting these impacts, the building health manager 128 can make it easier for a user to operate a buildings and meet more objectives for the building.

As shown in FIGS. 5B-5D, it can be seen that increasing the fresh air intake for the building space 502 will have an impact on multiple other aspects of building health as represented by the dials for the parameters 302-306. For example, by increasing the fresh air intake can require one or more fans to operate which can increase occupant health (the primary objective) but will also increase operation cost, lower asset life, increase risk for equipment downtime, increase energy consumption, etc. The element 550 can provide multi-factor decisions making for a building and putting owners/operators in control by informing their decisions and ultimately optimizing their objectives.

The planet health parameters 302 can include parameters that relate to resource sustainability and quality of life for local communities. The planet health parameters 302 can include energy consumption, certifications and compliance with energy standards, and whether or not the building space 502 achieves net zero emissions. The planet health parameters 302 include how much renewable energy is used for the building space 502, a carbon footprint of the building space 502, resource conservation for the building space 502, whether the building space 502 has reduced emissions, sustainability, etc.

The space health parameters 304 can include parameters that relate to building system resiliency factors, process and operations health that focuses on service effectiveness for asset and space maintenance and important tasks, and life safety and security health that focuses on physical and cyber security health as well as building emergencies and alarms. The space health parameters 304 can include operation cost of the building space 502, asset lift of assets of the building space 502, equipment downtime of equipment that operates the building space 502, and return on investment for the building space 502.

The space health parameters 304 can relate too life safety and security health, e.g., whether life safety systems are present for the building space 502, whether security and access control systems are present for the building space 502, cyber security status for equipment of the building space 502, emergency response systems presence and/or status for the building space 502, alarm management presence and/or status for the building space 502, etc.

The space health parameters 304 include process and operation health parameters, e.g., workflows, audits, permits, scheduled tasks, etc. The space health parameters 304 can further indicate system health of systems of the building space 502, e.g., health of automation systems, networks, electrical systems, metering systems of the building space 502.

The building health manager 128 can continuously measure criteria or factors that can impact the health of the building space 502, e.g., collect data for the people health parameters 306, space health parameters 304, and the planet health parameters 302. By measuring and calculating scores for these criteria, the building health manager 128 can systematically and repeatedly monitor and report on the people health parameters 306, the space health parameters 304, and the planet health parameters 302 for the building space 502. Furthermore, the building health manager 128 can track negative impacts to the scores, and offer reactive and predictive recommendations that would produce positive changes to the scores. The scoring implemented by the building health manager 128 provides a consistent, normalized view of a building space 502 health and removes the technical lens which makes the information faster and easier to consume.

The building health manager 128 can generate overall scores for the building space 502 and/or the people health parameters 306, the space health parameters 304, and the planet health parameters 302. The scores can be determined for a group of buildings, a building, or a particular space within a building. The scores can provide a baseline for health and performance on a consistent scale so a system or user can understand how well or poorly a building is performing. The scores can be generated in real-time for the building health manager 128 to provide real-time improvements and trended improvements over time. The scores can be generated by the building health manager 128 on a space and building level to help users or systems to identify the best and worst performing buildings of a group of buildings, floors of a building, spaces of a floor of a building, etc. Furthermore, the scores for multiple buildings determined by the building health manager 128 can be used to compare one building against peer buildings to understand how the one building is operating. Furthermore, the scores can be used to make informed capital planning and investment decisions.

Figure 6:
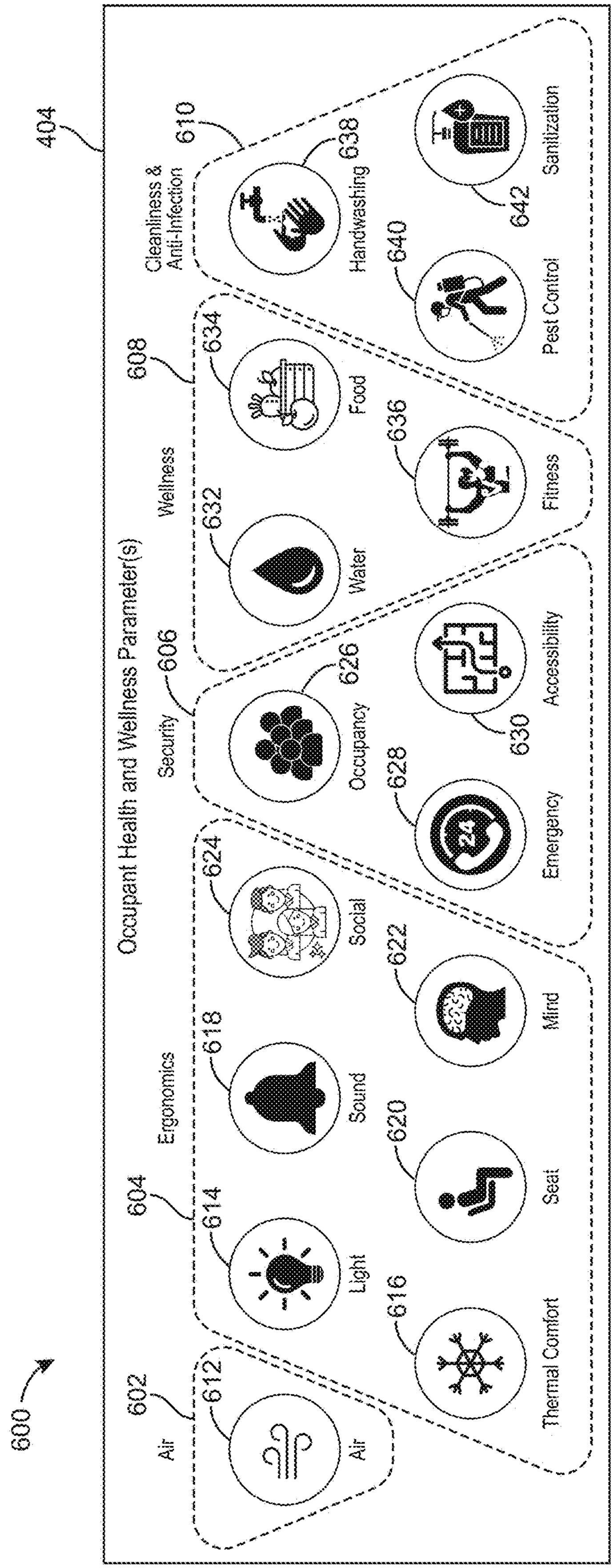
FIG. 6 is a schematic drawing of occupant health and wellness parameters, according to an exemplary embodiment.

Referring now to FIG. 6, a schematic drawing 600 of occupant health and wellness parameters 404 is shown, according to an exemplary embodiment. The occupant health and wellness parameters can be values, information, and/or scores describing various aspects of occupant health and wellness. The occupant health and wellness parameters 404 can be based on building data received by the building health manager 128 received from the building systems 142 and the external systems 144. The building data can indicate the presence and/or performance of the building systems 142 and/or systems or services offered by the building 146.

The occupant health and wellness parameters 404 include an air parameter 602, e.g., air parameter 612 which indicates whether air levels are healthy for an occupant. For example, the air parameter 612 can indicate whether there is enough airflow within the building 146 or what the levels of carbon dioxide (CO2), volatile organic compound (VOC), pollen, pollution, etc. are for the building 146. The air parameter 612 can indicate whether the levels of gasses within the building 146 are healthy for a user.

The occupant health and wellness parameters 404 include ergonomics parameters 604 such as a light parameter 614, a sound parameter 618, a social parameter 624, a thermal comfort parameter 616, a seat parameter 620, and a mind parameter 622. The ergonomics parameters 604 indicate efficiency of occupants working in the building 146. The light parameter 614 indicates whether the light levels are ideal for a working environment. For example, if light levels are too low, occupants may not work efficiently since low light levels may make the occupants tired. However, if the light levels are too high, occupants may have trouble focusing.

The thermal comfort parameter 616 can indicate whether temperature and/or humidity levels of the building 146 are at comfortable levels for an occupant. The building health manager 128 can store a chart or table indicating temperature and humidity level ranges that are appropriate for various outdoor air temperatures. The building health manager 128 can compare current temperature and/or humidity levels to the chart or table to determine whether current temperature and humidity is comfortable or uncomfortable. The building health manager 128 can generate recommendations to improve the temperature and/or humidity by suggesting temperature levels and/or humidity levels that are comfortable for occupants at particular outdoor air temperature levels.

The seat parameters 620 can indicate whether occupants have comfortable and sufficient seating in the building 146. The seating can indicate chairs, tables, desks, couches, cafeteria tables and seating, etc. The building health manager 128 can receive information about the seating available in the building 146 and/or within spaces of the building 146. For example, the building health manager 128 can determine the seat parameters 620 by determining whether there are sufficient numbers of seats for a number of occupants, whether the seats are comfortable for occupants, etc.

The sound parameter 618 can indicate sound levels of the building 146 and/or building space and whether the sound levels are ideal for working conditions of a building. For example, the building health manager 128 can determine whether sound levels are too noisy for working environments, whether music is played within the building 146 and/or is of a genre ideal for working environments, whether noise cancellation is activated for the building 146 or a building space, etc.

The mind parameter 622 indicates whether services offered by the building help occupants mental health. For example, counseling services offered by the building 146, human resources services offered by the building 146, vacation time offered to employees, work load of employees, reported occupant stress levels, etc. The building health manager 128 can generate the mind parameters 622 from building data.

The social parameter 624 can indicate social offerings of the building 146. For example, the social parameter 624 can indicate the presence, frequency, and/or availability of social gatherings. For example, the social parameter 624 can be based on scheduling data received by the building health manager 128. Furthermore, the social parameter 624 can indicate whether the location of occupants of the building 146 is near other occupants to verify that occupants are not isolated. For example, the building health manager 128 can determine occupant desk locations and whether occupants desk locations are in proper proximity with other occupants for social purposes.

The occupant health and wellness parameters 404 include security parameters 606. The security parameters 606 can indicate whether occupants are secure within the building 146. The security parameter 606 include an occupancy parameter 626 which indicates occupant levels of the building 146, e.g., how many occupants are within the building 146. If too many occupants are within the building 146, the probability of danger may increase, the probability of the spread of disease may increase, etc. The building health manager 128 can determine occupant levels of the building 146 based on building data received from the building systems 142.

The security parameters 606 include an emergency parameter 628. The emergency parameter 628 can indicate emergency response readiness for the building 146. For example, the emergency parameter 628 can indicate whether emergency alert stations are within the building 146, whether security of the building 146 is properly staffed, whether building occupants are properly trained for emergency evacuation, etc. The security parameter 606 can include an accessibility parameter 630. The accessibility parameter 630 can indicate navigation abilities of the building 146, e.g., whether the building 146 has a system for navigating through spaces of the building 146.

The occupant health and wellness parameters 404 include wellness parameters 608. The wellness parameters 608 can track activities of a user, e.g., how much water, food, or exercise a user gets in a day, week, month, etc. The wellness parameters 608 include a water parameter 632 indicating how much water a user has drank. A user may record, via a user device, how much water the user drinks during a day. Similarly, the wellness parameters 608 includes a food parameter 634 indicating what food an occupant eats. A user may record what food the user consumes throughout the day and whether the food that the user has eaten is healthy. In some embodiments, the food parameter 634 indicates whether food services within the building 146, e.g., a cafeteria, offer healthy food, offers unhealthy food, offers nutrition advice services, etc.

The fitness parameters 636 indicate whether occupants of the building exercise and/or have access to exercise equipment, classes, gyms, etc. For example, whether occupants attend exercising classes, go to the gym, attend personal training sessions, etc. can be indicated by the fitness parameter 636. The fitness parameter 636 can indicate whether the building 146 has a gym, offers fitness classes, offers personal training, etc.

The cleanliness and anti-infection parameter 610 indicates whether the building 146 and/or occupants of the building 146 are clean. The cleanliness and anti-infection parameter 610 includes a handwashing parameter 638, a pest control parameter 640, and a sanitization parameter 642. For example, the handwashing parameter 638 indicates whether handwashing is available in the building 146 and/or whether sinks, air driers, soap dispensers, etc. are functioning properly. The sanitization parameter 642 indicates whether hand sanitizer dispensers are located at entrances of the building 146, at doorways, dispersed through the building 146, etc.

Figure 7:
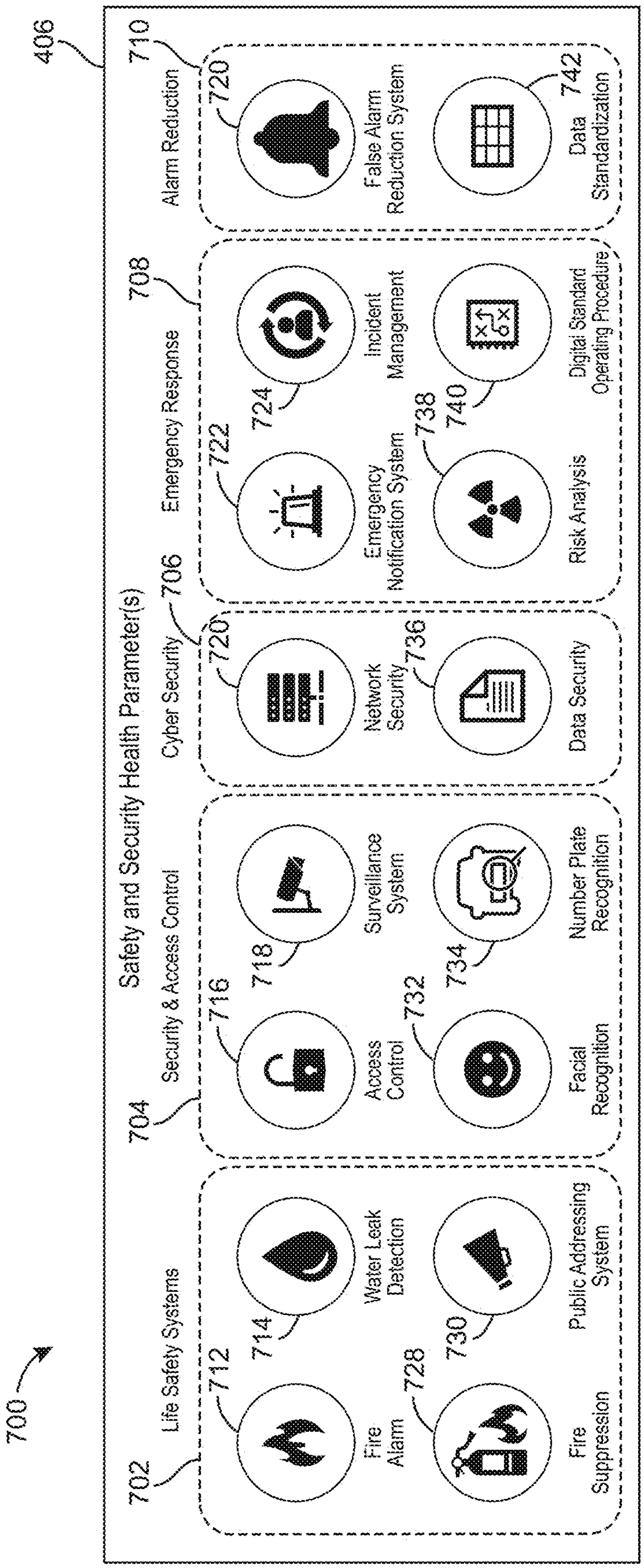
FIG. 7 is a schematic drawing of safety and security health parameters, according to an exemplary embodiment.

Referring now to FIG. 7, a schematic drawing of safety and security health parameters 406 are shown, according to an exemplary embodiment. The safety and security health parameters 406 include a life safety systems parameter 702, a security and access control parameter 704, a cyber-security parameter 706, an emergency response parameter 708, and alarm reduction parameter 710. The safety and security health parameters 406 can be based on building data received by the building health manager 128 received from the building systems 142 and the external systems 144. The building data can indicate the presence and/or performance of the building systems 142 and/or systems or services offered by the building 146.

The life safety systems parameter 702 include a fire alarm parameter 712 indicating whether a fire alarm system is present in the building 146 and/or whether the fire alarm system has detected fires and/or smoke within the building 146. The life safety systems parameters 702 include a water leak detection parameter 714. The water leak detection parameter 714 includes the presence of a water detection system and/or whether the water detection system has detected water leaks in the building 146. The life safety systems 702 include fire suppression parameter 728. The fire suppression parameter 728 indicates the presence and/or health of fire safety systems of the building 146. For example, the fire suppression parameter 728 can indicate whether placement of fire extinguishers in a building are appropriate, whether fire sprinkler systems are functioning properly, audit test results of fire suppression systems of the building 146, etc.

The public addressing system parameters 730 indicate whether a building addressing system is present in the building 146 and/or whether the public addressing system is operating correctly. For example, technicians can perform a test to verify that a public addressing system can broadcast messages properly and/or to all locations within a building. The result of the test can be one parameter of the public addressing system parameters 730.

The security and access control parameters 704 include parameters that indicate the presence and/or performance of security and access control systems of the building. For example, the building health manager 128 can be configured to receive alarm and/or fault data, maintenance reports, etc. of security and access control systems of the building 146 and determine the security and access control parameters 704 based on the data. The security and access control parameters 704 can include an access control system parameter 716 for an access control system, a surveillance system parameter 718 for a surveillance system, a facial recognition parameter 732 for a facial recognition system, and/or a number plate recognition parameter 734 for a number plate recognition system.

The cyber security parameter 706 indicates cyber security of the building 146. The cyber security parameter 706 indicates a network security parameter 720 indicating network security of the building 146, e.g., the number and type of current network cybersecurity threats (e.g., hacking threats, malware threats, etc.). Furthermore, the cyber security parameter 706 includes a data security parameter 736 indicating whether data storage of building systems of the building 146 are secure, e.g., whether they use the proper encryption, proper firewalls, etc.

The emergency response parameters 708 include parameters such as emergency notification system parameters 722, incident management parameters 724, risk analysis parameters 738, and/or digital standard operating procedure parameters 740. The emergency response parameters 708 can indicate the presence and/or performance of various systems of the building 146. The emergency response parameters 708 can indicate the presence and/or performance of emergency response systems in the building 146.

The emergency notification system parameter 722 can indicate the presence and/or performance of an emergency notification system, e.g., a siren system, a light flashing system, an exit system, an evacuation system, etc. The emergency response parameter 708 includes a risk analysis parameter 738. The risk analysis parameter 738 indicates the presence and/or performance of a risk analysis system that analyzes risk for a building. The risk analysis system may be the risk analysis system described with reference to U.S. patent application Ser. No. 16/783,936 filed Feb. 6, 2020, the entirety of which is incorporated by reference herein. Furthermore, the emergency response parameters 708 include an incident management parameter 724 indicating the presence and/or performance of an incident management system of the building 146. Furthermore, the emergency response parameter 708 includes a digital standard operating procedure parameter 740 indicating the presence and/or performance of a digital standard operating procedure system within a building 146. The digital standard operating procedure system may be the same and/or similar to the standard operating procedure system described in U.S. application Ser. No. 16/559,318 filed Sep. 3, 2019 and U.S. patent application Ser. No. 17/062,003 filed Oct. 2, 2020, the entirety of both of which are incorporated by reference herein.

Furthermore, alarm reduction parameters 710 include false alarm reduction system parameters 726 and/or data standardization parameter 742. The false alarm reduction system parameter 726 can indicate the presence and/or performance of a false alarm reduction system of the building 146. For example, the false alarm reduction system can be a system that receives false alarms in the building 146. The false alarm reduction system parameters 726 can indicate the success in reducing false alarms in the building 146. The false alarm reduction system can be the false alarm reduction system described in U.S. patent application Ser. No. 15/947,725 filed Apr. 6, 2018, the entirety of which is incorporated by reference herein.

Figure 8:
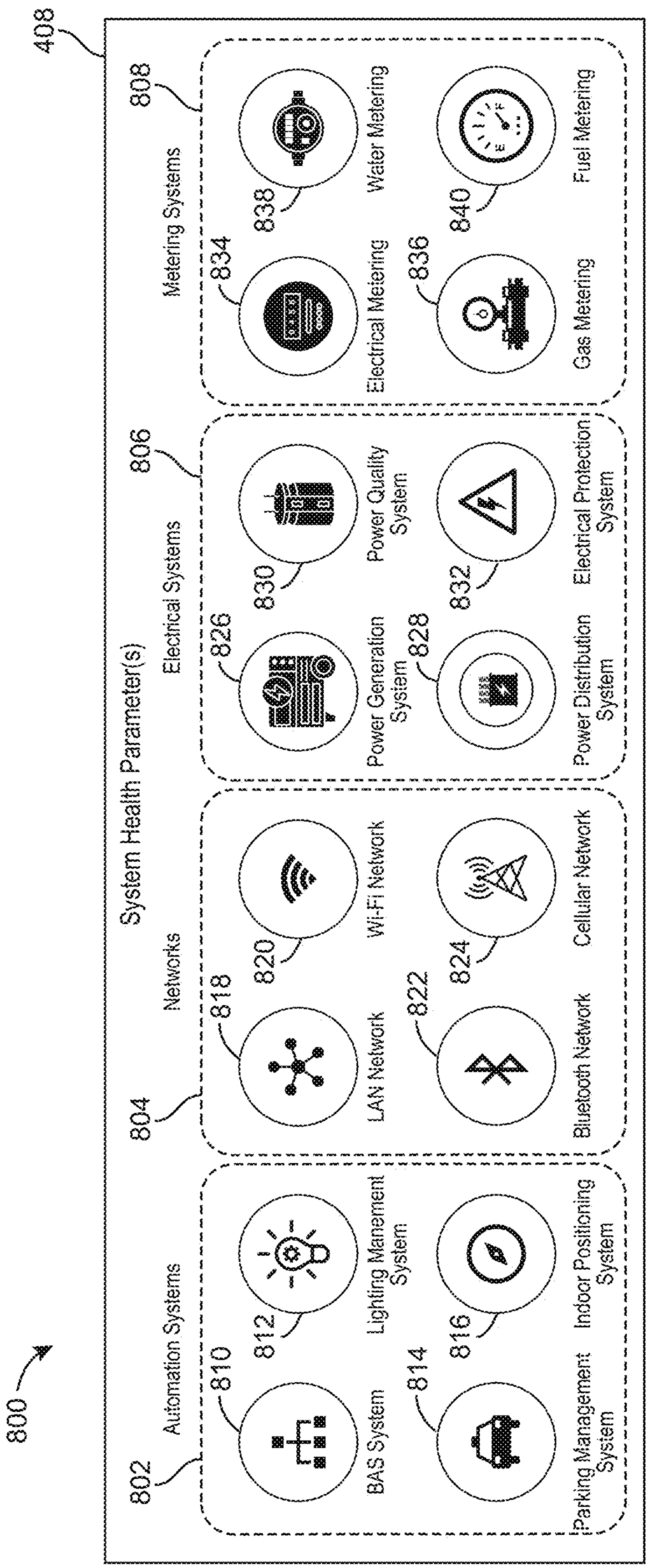
FIG. 8 is a schematic drawing of system health parameters, according to an exemplary embodiment.

Referring now to FIG. 8, a schematic drawing 800 of system health parameters 408 is shown, according to an exemplary embodiment. The system health parameters 408 include automation system parameters 802, networks parameters 804, electrical systems parameters 806, and metering systems parameters 808. The safety and security health parameters 406 can be based on building data received by the building health manager 128 received from the building systems 142 and the external systems 144. The building data can indicate the presence and/or performance of the building systems 142 and/or systems or services offered by the building 146.

The automation system parameters 802 indicate the presence and/or performance of automation systems of the building. For example, the building health manager 128 can determine whether automation systems are present within the building and/or operation correctly, e.g., whether faults are present and/or test results indicate that the automation systems are operating properly. The automation system parameters 802 include BAS system parameters 810 for a BAS system, lighting management system parameters 812 for a lighting management system, parking management system parameters 814 for a parking management system, and indoor positioning system parameters 816 for an indoor positioning system.

The networks parameters 804 can indicate the performance of networks of the building 146. For example, the network parameters 804 can be determined by the building health manager 128 based on network data received by the building health manager 128. The building health manager 128 can indicate performance parameters such as bandwidth, network speed (e.g., upload speed and/or download speed), network coverage within the building 146, etc. The networks parameters 804 include local area network (LAN) network parameters, Wi-Fi network parameters 820, Bluetooth network parameters 822, and/or cellular network parameters 824.

The electrical systems parameter 806 indicate the presence and/or performance of electrical systems within the building 146. For example, the building health manager 128 can be configured to receive data indicating the presence of various electrical systems and/or whether the various electrical systems are operating properly (e.g., whether the systems have faults). The electrical systems parameters 806 include a power generation system parameter 826 for power generation systems, a power quality system parameter 830 for power quality systems, a power distribution system parameter 828 for power distribution systems, and an electrical protection system parameter 832 for electrical protection systems.

The metering systems parameters 808 indicate the performance of meters of the building 146. For example, the metering systems parameters 808 indicate whether meters of the building have faults, the accuracy of the meters, the precision of the meters, etc. The building health manager 128 receives meter data and determines the health of the meters. Furthermore, the building health manager 128 can use meter measurements the meter data to determine the health of other system so the building. For example, the building health manager 128 can identify efficiencies or issues of building equipment based on the measurements of the meters. The metering systems parameters 808 include electrical metering parameters 834, gas metering parameters 836, water metering parameters 838, and/or fuel metering parameters 840.

Figure 9:
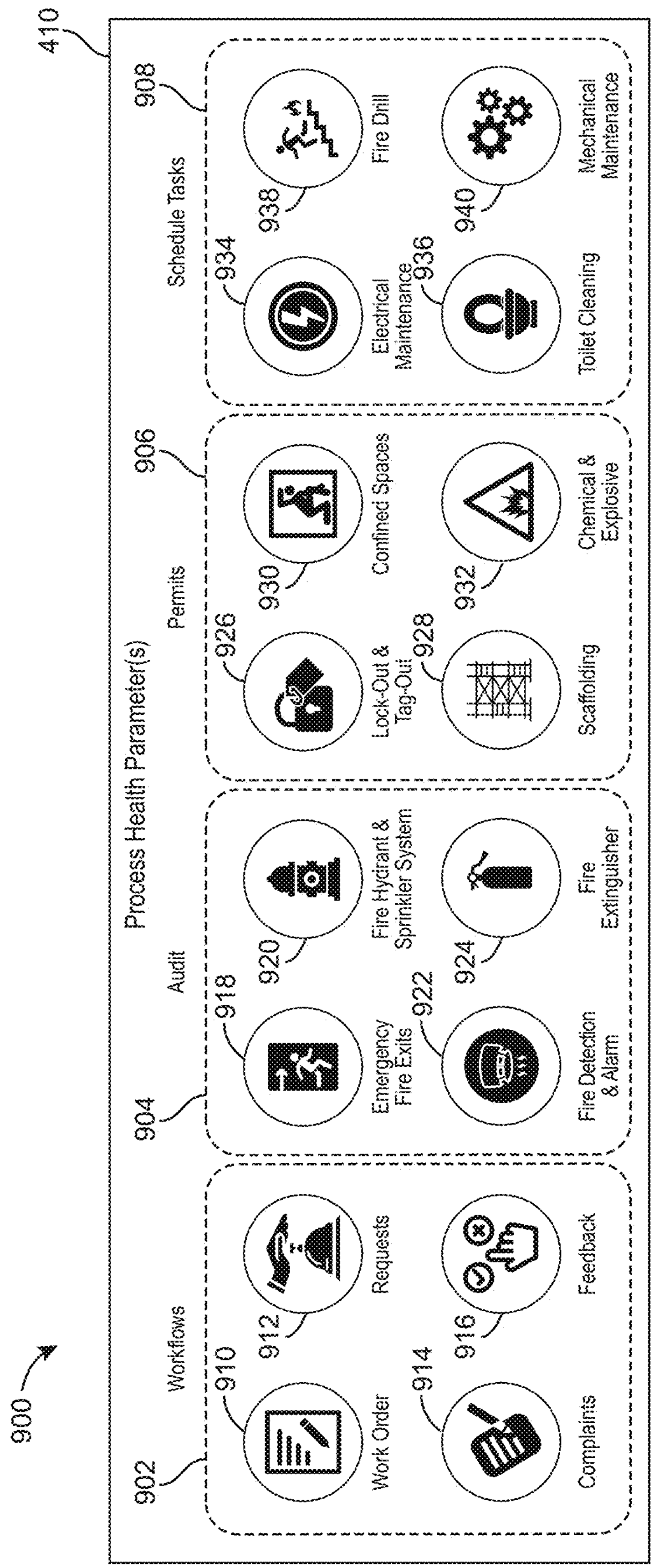
FIG. 9 is a schematic drawing of process health parameters, according to an exemplary embodiment.

Referring now to FIG. 9, a schematic drawing 900 of process health parameters 410 is shown, according to an exemplary embodiment. The process health parameters 410 include workflows parameters 902, audit parameters 904, permits parameters 906, and/or scheduled tasks parameters 908. The building health manager 128 can be configured to determine the process health parameters 410 based on building data received from the building 146. For example, the building data can indicate the presence and/or use of various services and systems within the building 146. Furthermore, the building data can indicate whether the systems are operating properly.

The workflows parameters 902 include a work order system parameter 910 for a work order system. The work order system can facilitate the automatic generation, or user requested generation, of work orders for technicians to repair systems of the building. The work order system parameters 910 can indicate the presence of a work order system in the building 146, an average response time for work orders (e.g., how quickly a work order is performed by a technician), etc. The workflows parameters 902 include requests parameters 912 for a request system of the building 146. The requests parameters 912 can indicate whether a request system is present in the building 146 and/or the performance of the request system, e.g., whether request are being responded to, the amount of time from when a request is generated to when a request is answered, etc.

The workflows parameters 902 include a complaints parameter 914 for a complaints system. The complaints system can be a system that allows a building occupant to file a complaint regarding the building 146. The complaints parameters 914 can indicate whether a complaints system is present in the building and/or the performance of the complaints system, e.g., how widely adopted the complaints system is, how quickly the complaints are addressed, etc. The workflows parameters 902 include a feedbacks parameter 916 for a feedback system. The feedbacks parameter 916 can indicate the presence, adoption, or review time of the feedback system.

The audit parameters 904 can indicate audit results of fire systems of a building. For example, audit results of emergency exists, fire hydrants and sprinkler systems, fire detection and alarm systems, and/or fire extinguishers. The building health manager 128 can be configured to receive audit data from audit systems for the various fire systems of the building. The audit parameters 904 include an emergency fire exits parameter 918 for emergency fire exits, a fire hydrant and sprinkler system parameter 920, a fire detection and alarm parameter 922, and a fire extinguishers parameter 924.

The permit parameters 906 indicate parameters for permits given out for various aspects of a building. For example, the permit parameters 906 include a lock-out and tag-out parameter 926, a confined spaces parameter 930, a scaffolding parameter 928, and a chemical and explosive parameter 932.

The scheduled tasks parameter 908 include an electrical maintenance parameter 934, a fire drill parameter 938, a toilet cleaning parameter 936, and a mechanical maintenance parameter 940. The scheduled tasks parameter 908 can indicate the health of task scheduling of various systems of the building 146. The task scheduling health can indicate that maintenance, drills, cleaning, etc. are scheduled and performed at an appropriate frequently. The scheduled tasks parameters 908 include an electrical maintenance parameter 934, a toilet cleaning parameter 936, a fire drill parameter 938, and a mechanical maintenance parameter 940.

Figure 10:
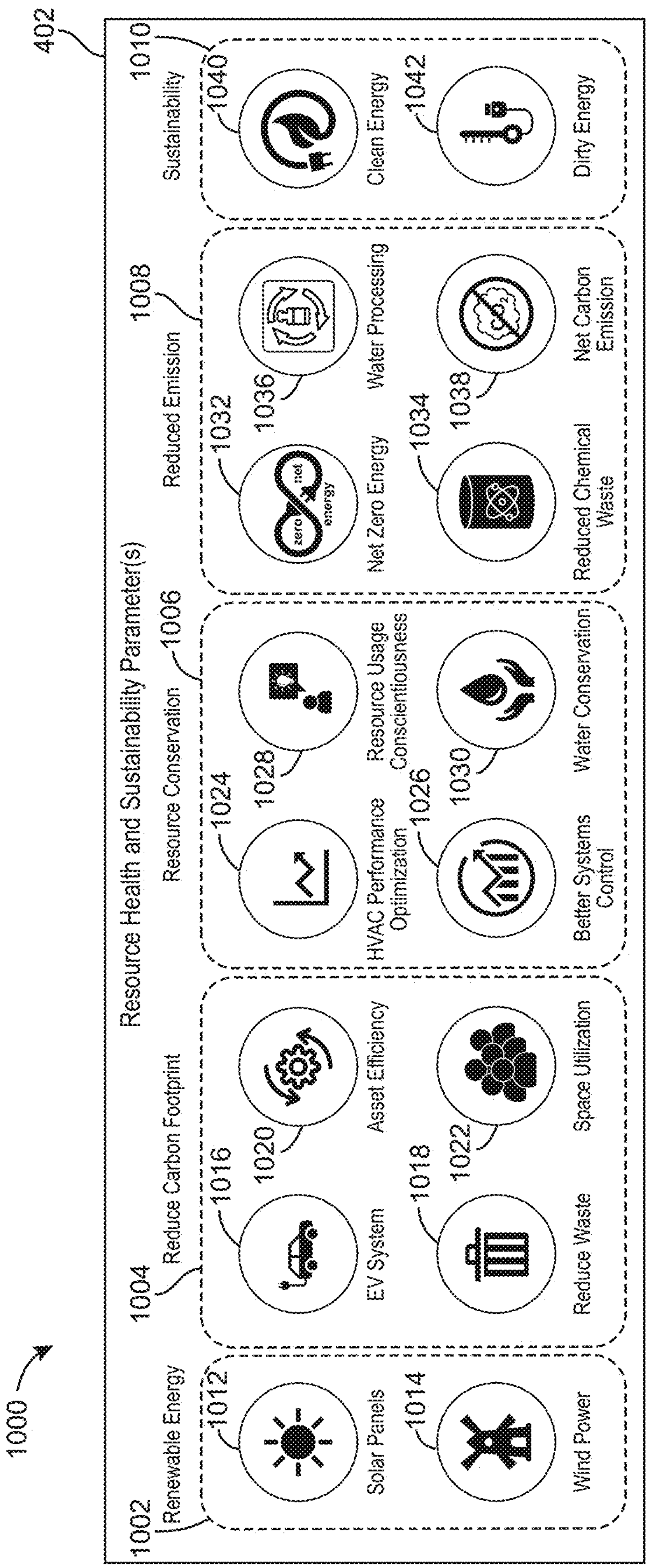
FIG. 10 is a schematic drawing of resource health and sustainability parameters, according to an exemplary embodiment.

Referring now to FIG. 10, a schematic drawing 1000 of resource health and sustainability parameters 402 is shown, according to an exemplary embodiment. The resource health and sustainability parameters 402 include parameters that indicate the effect of building operation of the building 146 on the environment. The building health manager 128 can be configured to receive building data from the building systems 142 and determine the resource and sustainability parameters 402.

The resource health and sustainability parameters 402 include renewable energy parameters 1002. The renewable energy parameters 1002 can indicate whether the building 146 uses renewable energy sources such as solar panels or wind power. The renewable energy parameters 1002 include a solar panels parameter 1012 for the presence of solar panels in the building 146 and wind power parameters for the presence in wind power systems associated with the building 146.

The reduce carbon footprint parameters 1004 can include an electric vehicle (EV) system parameter 1016 indicating whether an electric vehicle charging system is available in the building 146. The reduce waste parameter 1018 can track waste of the building 146 and indicate whether waste is increasing, decreasing, greater than a particular amount, less than a particular amount, etc. The reduce carbon footprint parameters 1004 include an asset efficiency parameter 1020 indicating whether equipment of the building 146 is operating efficiently or inefficiently. Furthermore, the reduce carbon footprint parameter 1004 include space utilization parameter 1022 which indicates whether spaces of the building are at the proper occupancy levels, e.g., whether spaces have to many occupants or not enough occupants.

The resource health and sustainability parameters 402 include an HVAC performance optimization parameter 1024 indicating if HVAC equipment of the building is optimized to utilize less energy. The resource conservation parameter 1006 indicates a better systems control 1026 indicating whether the building 146 includes system control that minimizes energy usage. Furthermore, the resource conservation parameter 1006 includes a water conservation parameter 1030 indicating water usage by the building 146. Furthermore, the resource conservation parameter 1006 includes a resource usage conscientiousness parameter 1028 indicating the presence of systems at the building 146 for users to log complaints indicating poor resource usage in the building 146.

The reduced emission parameters 1008 include parameters relating to emissions of the building 146. The building health manager 128 can be configured to receive building data from the building systems 142 and determine the reduced emission parameters 1008 based on the building data. For example, the net zero energy parameter 1032 can indicate whether the building 146 is at net zero energy, i.e., whether all energy consumed by the building 146 is created by the building 146, e.g., via wind power, solar power, etc. In some embodiments, the net zero energy parameter 1032 indicates how close to net zero energy production the building is at, e.g., a percentage or score. The reduced emission parameter 1008 includes a net carbon emission parameter 1038 indicating how close the building 146 is to net carbon neutrality.

The reduced emission parameter 1008 include a reduced chemical waste parameter 1034. The reduced chemical waste parameter 1034 can indicate the levels of chemical waste created by systems of the building 146, e.g., chemical waste created from disposed light bulbs, oil from oil changes of systems of the building, refrigerant fluid changes, etc. The reduced emission parameters 1008 include a water processing parameter 1036. The water processing parameter 1036 indicates whether water reuse and processing systems are available at the building 146 that are configured to clean and filter used water and reuse the water in the building 146. The water processing parameter 1036 can further indicate the percentage of water used at the building 146 is reused water. Furthermore, the reduced emission parameter 1008 indicate carbon emission levels and/or whether the building 146 is at net zero carbon emission and/or how close the building 146 is to net zero carbon emission.

The resource health and sustainability parameters 402 include sustainability parameters 1010. The sustainability parameters 1010 include a clean energy parameter 1040 and a dirty energy parameter 1042. The clean energy parameter 1040 can indicate what percentage or what amount of electrical energy consumed by the building 146 is clean energy, e.g., originating from clean energy sources such as wind power, solar power, nuclear, etc. The dirty energy parameter 1042 indicates what percentage or what amount of electrical energy consumed by the building 146 is dirty energy, e.g., originating from a coal power plant, gas generator, etc.

Figure 11:
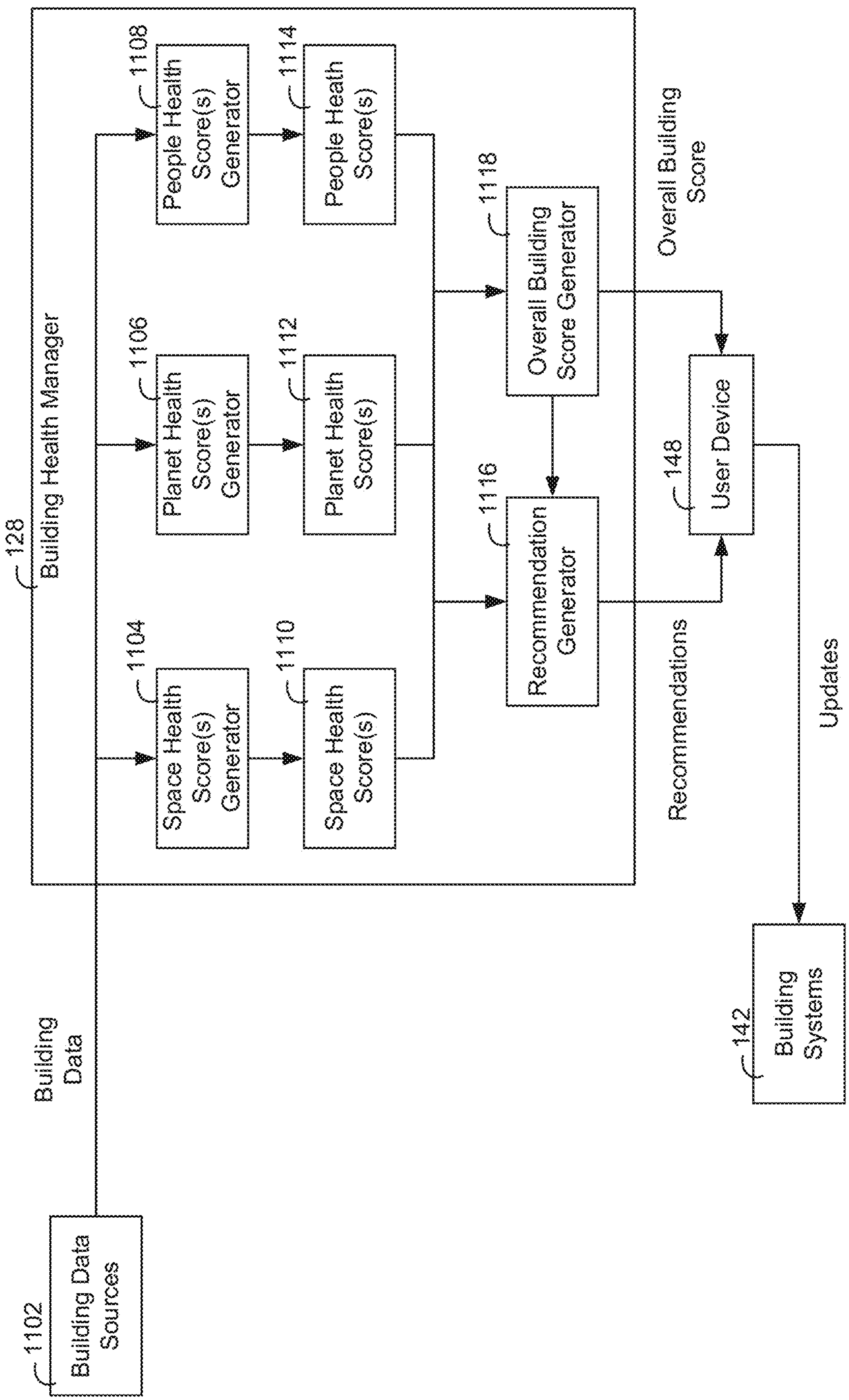
FIG. 11 is a block diagram of the building health manager generating an overall building score from space health scores, planet health scores, and people health scores, according to an exemplary embodiment.

Referring now to FIG. 11, the building health manager 128 is shown generating an overall building score from space health scores, planet health scores, and people health scores, according to an exemplary embodiment. The building health manager 128 can receive building data from building data sources 1102. For example, the building data sources 1102 can include local subsystems of the building 146 operating at the building, e.g., the building systems 142. Furthermore, the building data sources 1102 can include the external systems 144. The building data received by the building health manager 128 can include data such as space temperature, humidity, light levels, equipment fault data, water usage, occupant locations, meeting productivity, food or drink menu nutrition levels, occupant physical activity levels, and/or any other data as described with reference to FIGS. 1-10.

The building health manager 128 includes a space health scores generator 1104, a planet health scores generator 1106, and a people health scores generator 1108. The space health scores generator 1104 can generate space health scores 1110 for the space health parameters 304. The planet health scores generator 1106 can generate the planet health scores 1112 for the planet health parameters 302. The people health scores generator 1108 can generate people health scores 1114 for the people health parameters 306. In some embodiments, the scores generated by the space health scores generator 1104, the planet health scores generator 1106, and the people health scores generator 1108 are scores generated for the parameters described with reference to FIGS. 1-10.

For example, for the people health scores 1114, the people health scores generator 1108 can generate scores for parameters that indicate whether a workplace is safe and secure, whether a work environment is comfortable, enhanced productivity of a space, stress of occupants, nutrition and exercise of occupants, frictionless access and services offered by the building 146, social distancing and contact tracing of the building 146, and hand washing of the building space.

For example, the people health scores generator 1108 could generate scores for each parameter. For example, the people health score generator 1108 can generate a score of 9 for the workplace safety and security parameter, a score of 8 for the work environment comfortability parameter, a score of 7 for an enhanced productivity of a space parameter, a score of 7 for a stress of occupants parameter, a score of 8 for a nutrition and exercise of occupants parameter, a score of 10 for a frictionless movement parameter, a score of 6 for a social distancing parameter, a score of 9 for a contact tracing parameter, and a score of 7 for a hand washing parameter. Based on the scores for the parameters, the people health scores generator 1108 can generate a people health score, e.g., with a score of 8. Similar determinations can be generated for the space health scores 1110 by the space health scores generator 1104 and the planet health scores 1112 by the planet health scores generator 1106.

Based on the space health scores 1110, the planet health score 1112, and/or the people health scores 1114, the building health manager 128 can be configured to generate an overall building score with the overall building score generator 1118 of the building health manager 128. The overall building score generator 1118 can generate an average (e.g., a weighted average) of the space health scores 1110, the planet health scores 1112, and/or the people health scores 1114. The overall building score generator 1118 can be configure to provide the overall building score to a recommendation generator 1116 and/or the user device 148 via a user interface (e.g., the user interfaces shown and described with reference to FIGS. 13-18).

The recommendation generator 1116 can generate recommendations for improving the overall building score, the space health scores 1110, the planet health scores 1112, and/or the people health scores 1114. The recommendation generator 1116 can generate recommendations to update temperature of spaces, update lighting levels of spaces, offer healthier cafeteria food, offer workout classes, reduce employee workload, improve occupant social distancing, etc.

In some embodiments, the recommendations can be specific to the space health scores 1110, the planet health scores 1112, and/or the people health scores 1114. For example, the recommendations could be specific to the people health scores 1114. For example, the recommendation could be to condition meeting rooms prior to a meeting to ensure occupants are comfortable from the start, increase light levels in the building 146 due to lack of natural light, add a wayfinding service to the building 146 to help occupants efficiently navigate the building, remind occupants of proper hand washing techniques, etc.

The recommendations can be provided to a user via the user device 148 by the recommendation generator 1116. The user device 148 can approve the recommendations and make updates to the building systems 142, e.g., the building health manager 128 can provide setting updates to the building systems 142 updating the operation of the building systems 142 in response to receiving user approval. In some embodiments, the building health manager 128 can generate work orders. For example, the work orders may be work orders to install new equipment or services, perform maintenance, etc. Furthermore, in some embodiments, the building health manager 128 can implement the recommendations automatically without requiring user approval.

Figure 12:
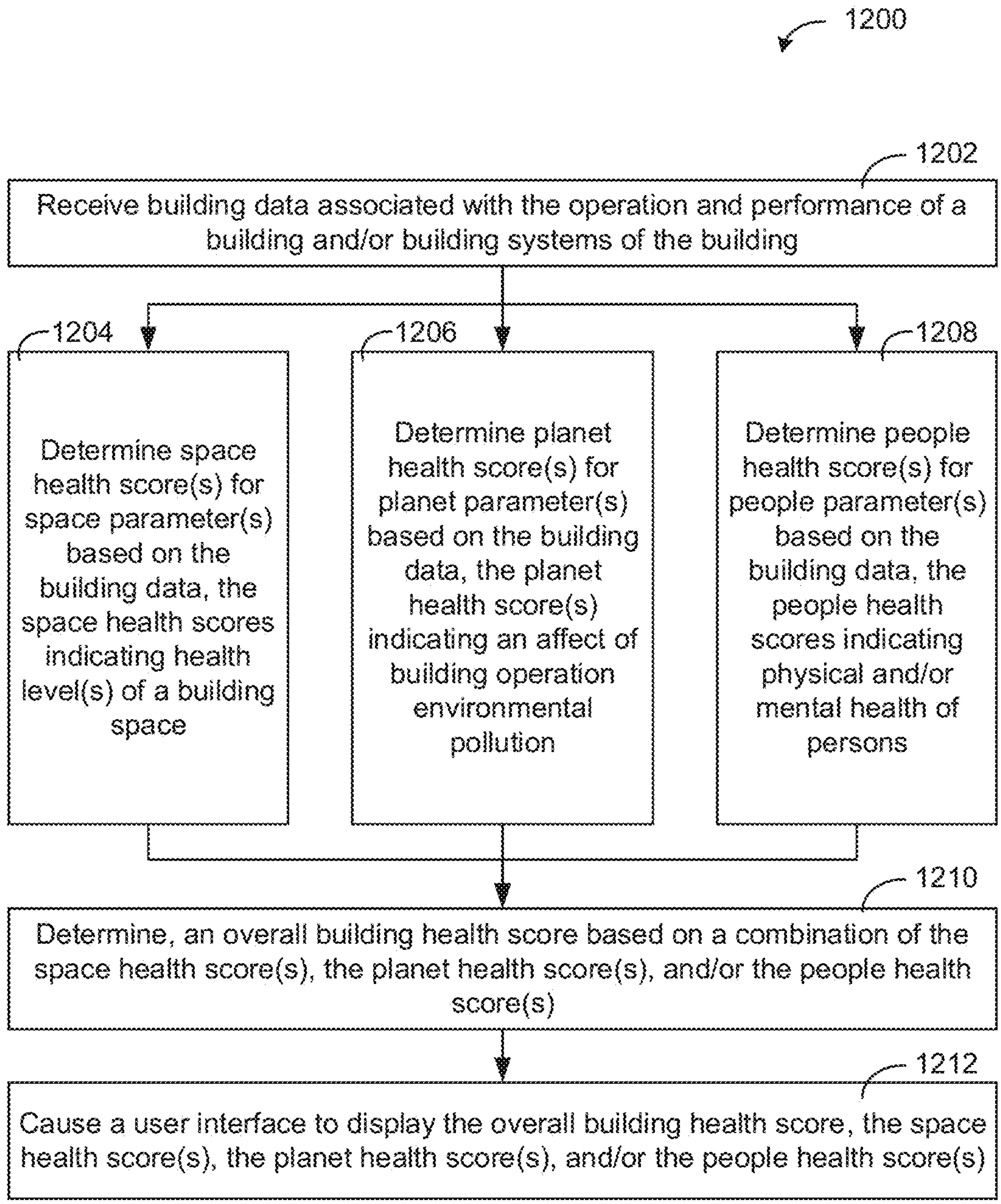
FIG. 12 is a flow diagram of a process of generating the overall building score from the space health scores, the planet health scores, and the people health scores, according to an exemplary embodiment.

Referring now to FIG. 12, a flow diagram of a process 1200 of generating the overall building score from the space health scores 1110, the planet health scores 1112, and the people health scores 1114 is shown, according to an exemplary embodiment. The building health manager 128 can be configured to perform the process 1200. Furthermore, any computing system or device described herein can be configured to perform the process 1200.

In step 1202, the building health manager 128 can receive building data associated with the operation and performance of the building 146 and/or the building systems 142. The building health manager 128 can receive operational data of the building systems 142, identifying information identifying what subsystems are present in the building 146, data from the external systems 144, etc.

In step 1204, the building health manager 128 can determine the space health scores 1110 for the space health parameters 304 based on the building data. For example, the building health manager 128 could determine a score for each of the space health parameters 304. In some embodiments, the building health manager 128 can generate a composite space health score based on the scores for each of the space health parameters 304.

In step 1206, the building health manager 128 can determine the planet health scores 1112 for the planet health parameters 302 based on the building data. For example, the building health manager 128 could determine a score for each of the planet health parameters 302. In some embodiments, the building health manager 128 can generate a composite planet health score based on the scores for each of the planet health parameters 302.

In step 1208, the building health manager 128 can determine the people health scores 1114 for the people health parameters 306 based on the building data. For example, the building health manager 128 could determine a score for each of the people health parameters 306. In some embodiments, the building health manager 128 can generate a composite people health score based on the scores for each of the people health parameters 306.

In step 1210, the building health manager 128 can be configured to generate an overall building health score based on a combination of the space health scores 1110, the planet health scores 1112, and the people health scores 1114. For example, the building health manager 128 can generate an average of the space health scores 1110, the planet health scores 1112, and the people health scores 1114. In some embodiments, the average is a weight average. In some embodiments, a user provides weight values for weighting each of the space health scores 1110, the planet health scores 1112, and the people health scores 1114.

In step 1212, the building health manager 128 can cause a user interface to display the overall building health score determined in the step 1210. In some embodiments, the building health manager 128 causes the user interface to include the space health scores 1110, the planet health scores 1112, and the people health scores 1114. The building health manager 128 can cause the user device 148 to display the user interface.

Figure 13:
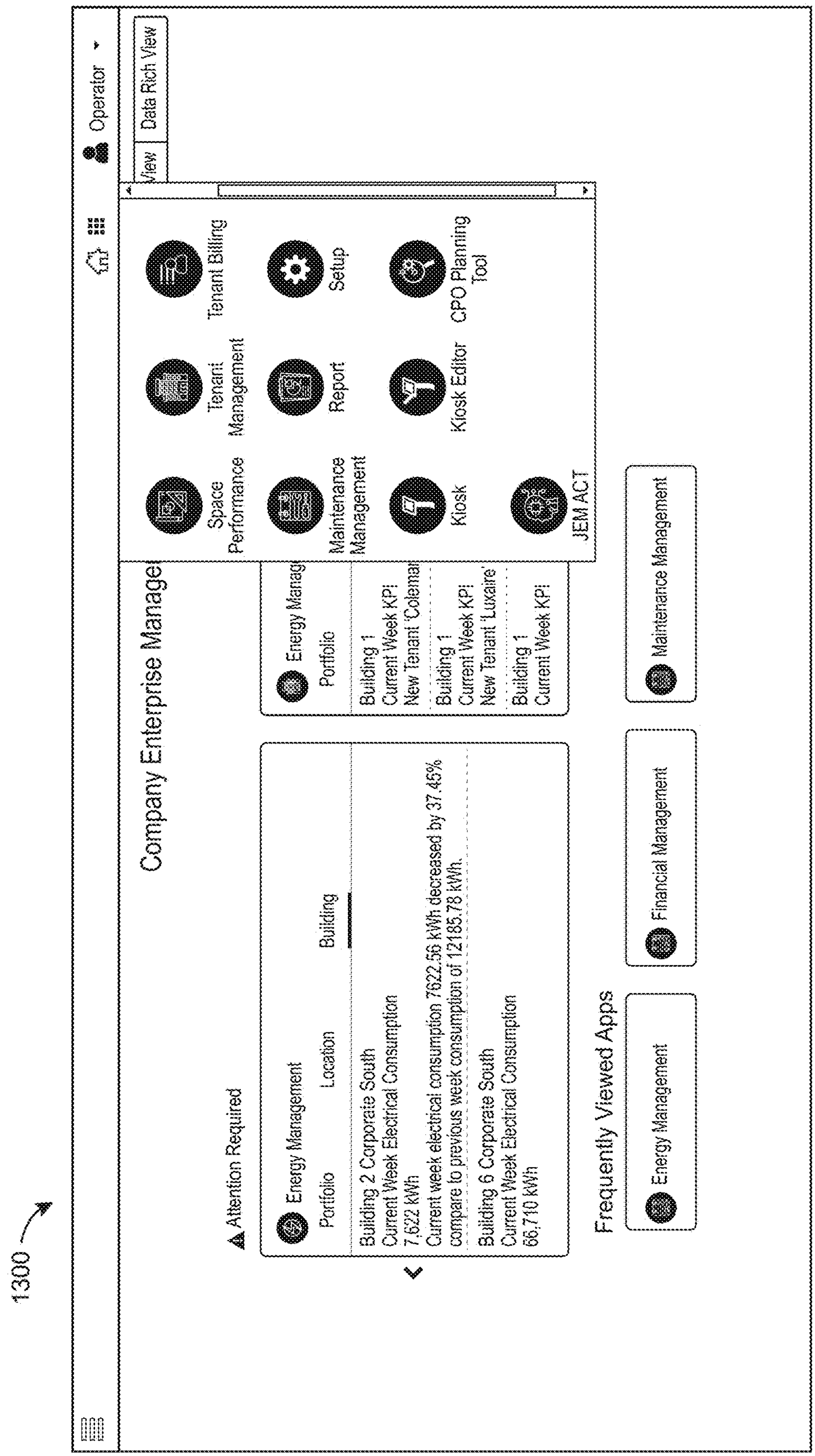
FIG. 13 is a building management interface, according to an exemplary embodiment.

Referring now to FIG. 13, a building management interface 1300 is shown, according to an exemplary embodiment. The building management interface 1300 displays information indicating actions that should be taken in a building and/or building notifications. The building management interface 1300 can provide a user with a summary of key performance indicators. Furthermore, the building management interface 1300 can provide a user with a menu to navigate to other user interfaces, e.g., the user interfaces described with reference to FIGS. 14-18.

Figure 14:
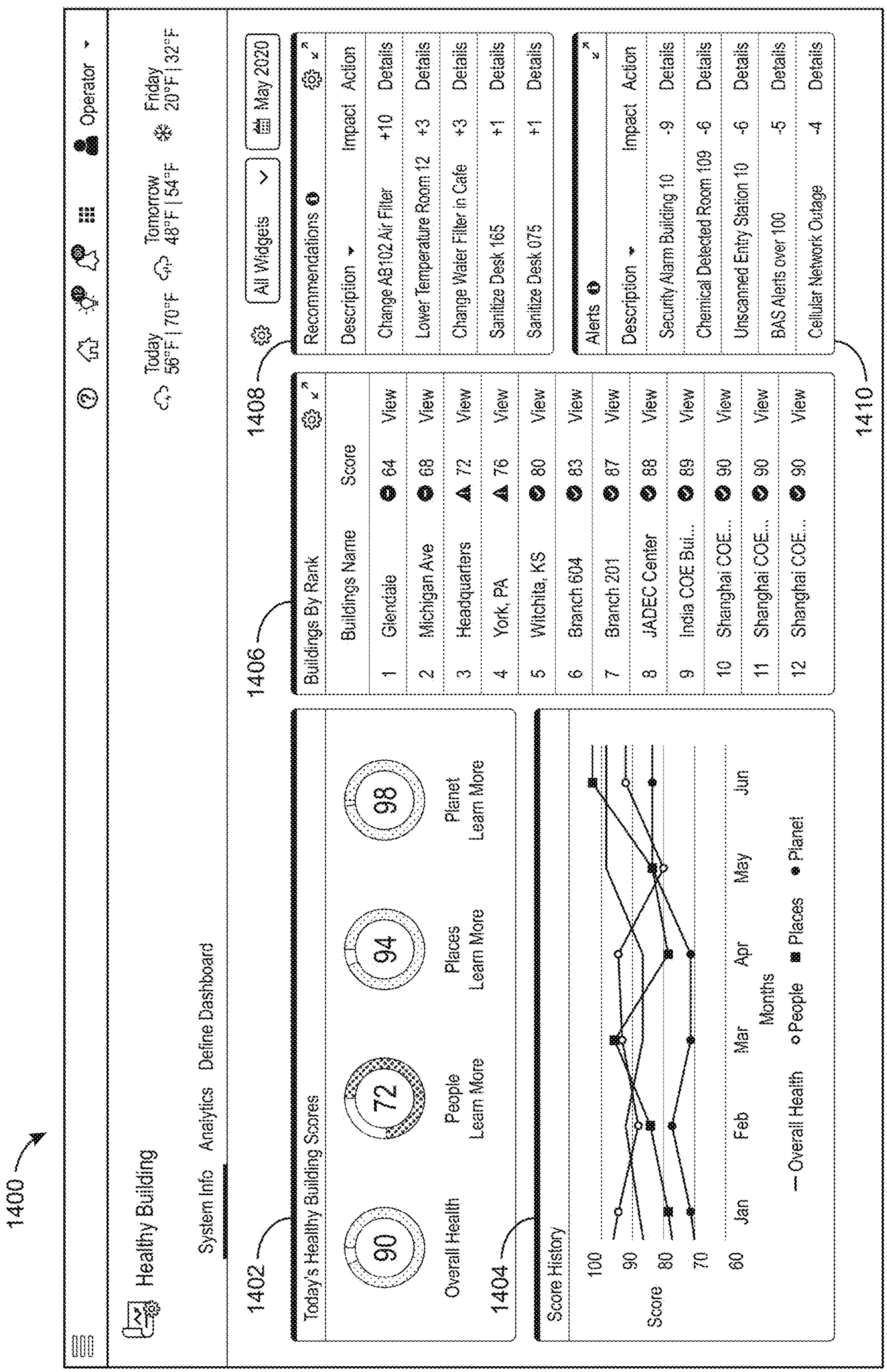
FIG. 14 is a building health interface, according to an exemplary embodiment.

Referring now to FIG. 14, a building health interface 1400 is shown, according to an exemplary embodiment. The interface 1400 includes an element 1402 indicating scores for a building for a particular day. The element 1402 can include an overall building health score determined by the building health manager 128 from the space health scores 1110, the planet health scores 1112, and/or the people health scores 1114. Furthermore, the element 1402 includes indications of the space health scores 1110, the planet health scores 1112, and the people health scores 1114. The interface 1400 further includes a score history element 1404. The element 1404 indicates a history of the overall health score, the space health scores 1110, the planet health scores 1112, and/or the people health scores 1114 trended over time.

The interface 1400 further includes ranked buildings for an entity in element 1406. The element 1406 indicates multiple different buildings associated with an entity, e.g., shopping locations associated with a retailer, office locations of a company, buildings of a campus, etc. The element 1406 can include an overall building score for each building of the element 1406 ranked in order from lowest score to highest score, in some embodiments.

Furthermore, the interface 1400 includes a recommendations element 1408 indicating multiple recommendations for improving the building 146. The recommendations of the recommendation element 1408 could be a recommendation to change the air filter of a device, lower temperature in a particular room, change a water filter in a cafeteria, sanitize particular desks, etc. Furthermore, the interface 1400 includes an alerts element 1410. The element 1410 indicates alerts for a building, issues that need to be addressed by a technician. For example, the alerts of the element 1410 can include a security alarm of a particular building, a dangerous chemical detected in a particular room, an unscanned entry of a user to a particular location of a building, a building automation system alert level increasing over a particular level, a cellular network outage at the building, etc.

Figure 15:
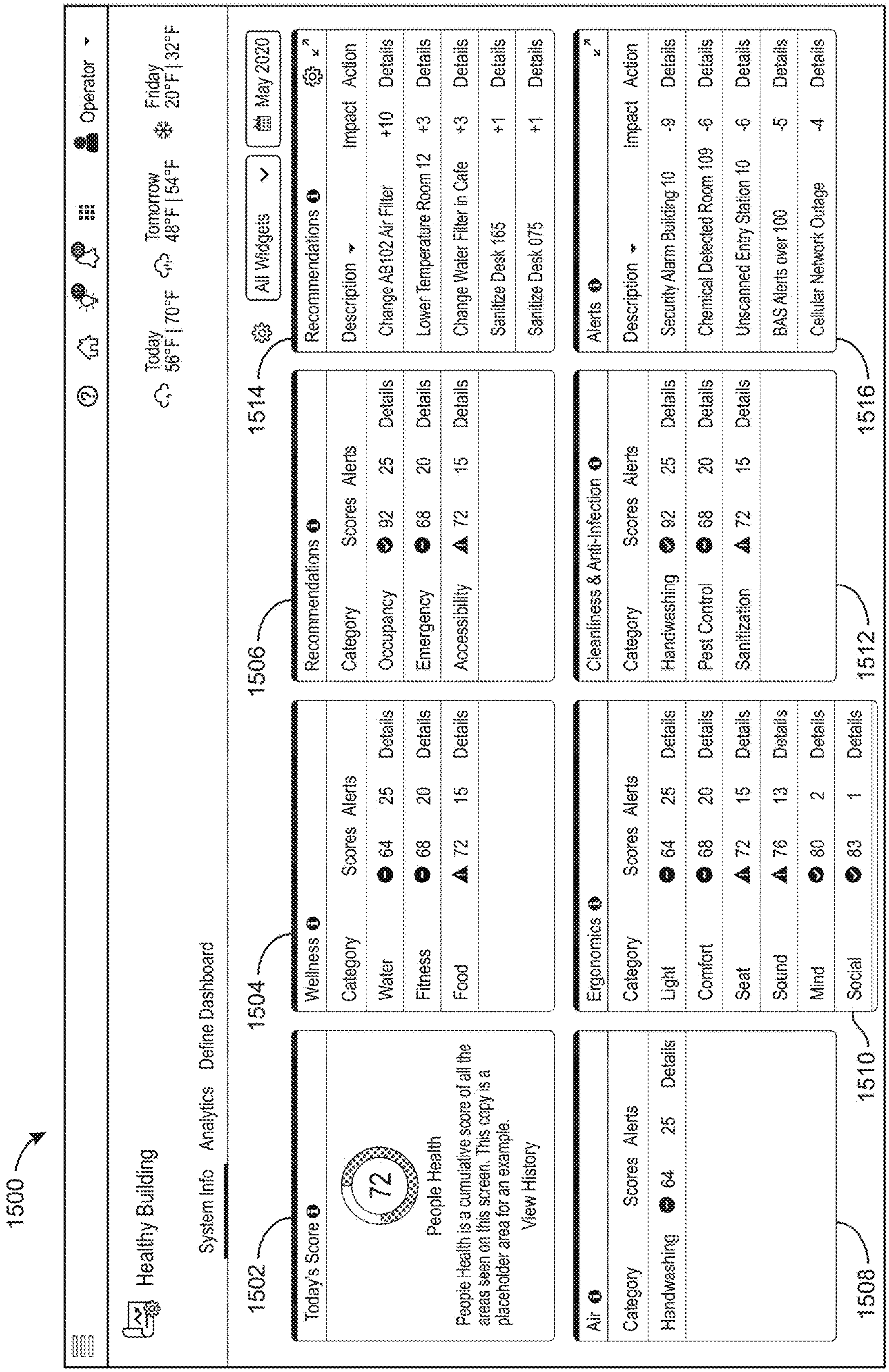
FIG. 15 is an occupant health interface, according to an exemplary embodiment.

Referring now to FIG. 15, an occupant health interface 1500 is shown, according to an exemplary embodiment. The occupant health interface 1500 indicates scores for the people health parameters 306. The occupant health interface 1500 includes an occupant health score element 1502. The element 1502 indicates a value for the people health scores 1114. For example, the element 1502 can indicate an overall people health score for the people health parameters 306 for a particular day.

The interface 1500 includes a wellness element 1504. The element 1504 can indicate scores and alerts for the water parameter 632, the fitness parameter 636, and the food parameter 634. The interface 1500 further includes a security element 1606 indicating scores and alerts for the occupancy parameter 626, the emergency parameter 628, and the accessibility parameter 630. The interface 1500 includes an air element 1508 indicating a score and associated alerts for the air parameter 612.

The interface 1500 includes an ergonomics element 1510 including indications of scores and alerts for the light parameter 614, the thermal comfort parameter 616, the seat parameter 620, the sound parameter 618, the mind parameter 622, and the social parameter 624. Furthermore, the interface 1500 includes a cleanliness and anti-infection element 1512. The element 1512 indicates scores and alerts for the handwashing parameter 638, the pest control parameter 640, and the sanitization parameter 642.

The interface 1500 includes a recommendations element 1514. The recommendations element 1514 further includes an impact value, whether positive or negative, for each recommendation indicating the impact that each recommendation has on the overall occupant health score. The recommendations element 1514 include a recommendation to change an air filter for a system, lower a temperature in a particular room, change a water filter in a cafeteria, sanitize particular desks, etc. Furthermore, the interface 1500 includes an element 1516 indicating alerts for the building and the impact of each alert on the overall occupant health score. The alerts can indicate a security alarm for a particular building, a chemical detection in a particular room, an unscanned occupant entry event at an entry station, a number of building automation system alerts going over a particular amount, a cellular network outage, etc.

Figure 16A:
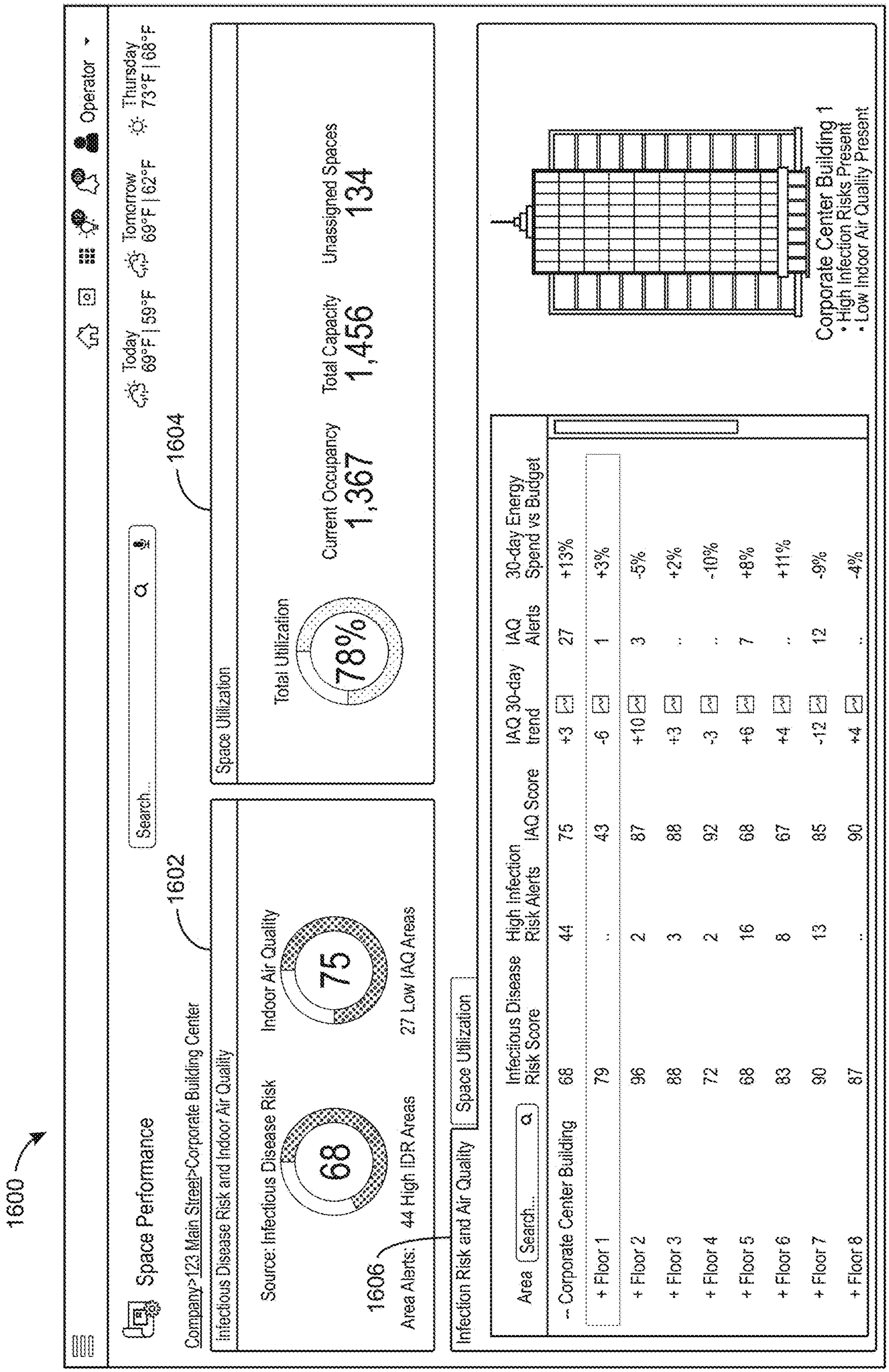
FIG. 16A is a space performance user interface including infection risk and air quality information, according to an exemplary embodiment.

Referring now to FIG. 16A, a space performance user interface 1600 including infection risk and air quality information is shown, according to an exemplary embodiment. The user interface 1600 includes an element 1602 indicating infectious disease risk for the building 146 and indoor air quality for the building 146. Furthermore, the space performance user interface 1600 includes an element 1604 indicating a space utilization element 1604.

The space performance user interface 1600 includes an infection risk and air quality element 1606. The element 1606 includes indications of various areas of a building, e.g., floors of the building 146. The element 1606 further includes infectious disease risk scores, high infection risk alerts, IAQ scores, an IAQ trend, IAQ alerts, and a thirty day energy spend vs. budget score for each of the spaces of the building 146.

Figure 16B:
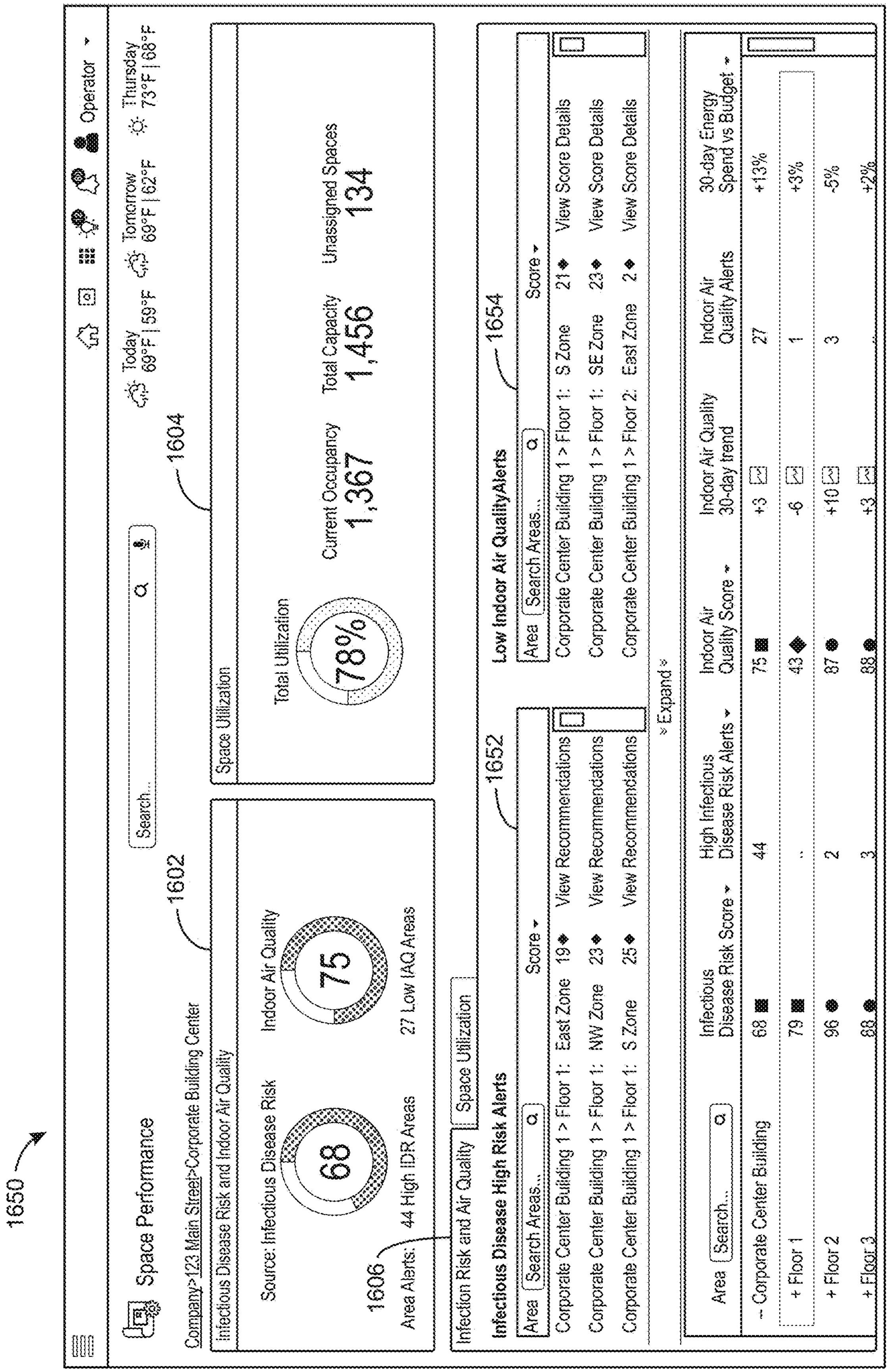
FIG. 16B is another space performance user interface including infection risk and air quality information, according to an exemplary embodiment.

Referring now to FIG. 16B, another space performance user interface 1650 including infection risk and air quality information is shown, according to an exemplary embodiment. The interface 1650 can be similar to the interface 1600 of FIG. 16A and includes similar elements, e.g., the elements 1602-1606. Furthermore, the interface 1650 includes an element 1652 that includes an indication of alerts affecting an infectious disease risk score. The interface 1650 includes an element 1654 indicating alerts that affect indoor air quality.

Figure 16C:
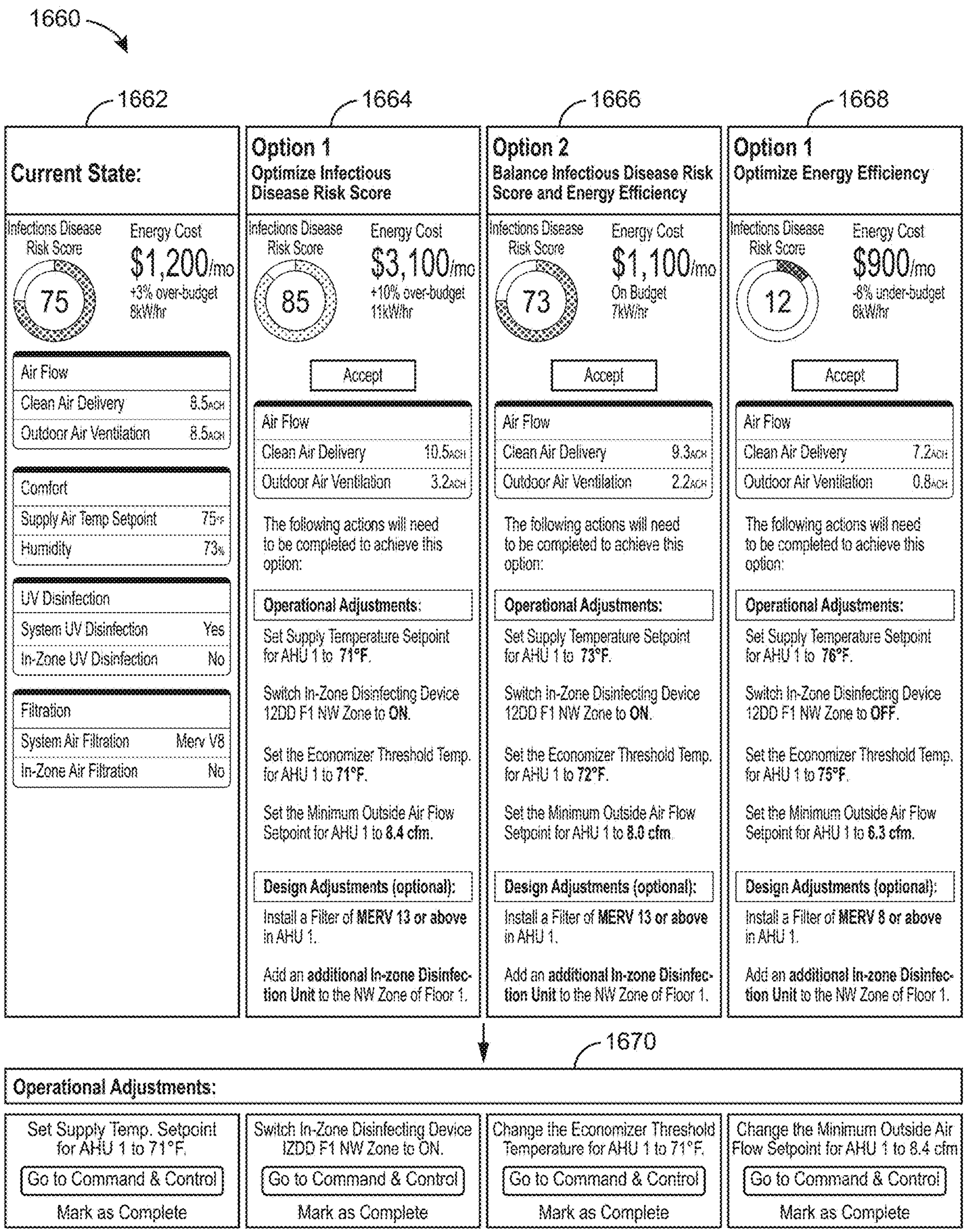
FIG. 16C is a user interface providing recommendations for a user to select from that affect an infectious disease risk score, according to an exemplary embodiment.

Referring now to FIG. 16C, a user interface 1660 providing recommendations for a user to select from that effect an infectious disease risk score is shown, according to an exemplary embodiment. The recommendation generator 1116 can generate the user interface 1660 and/or the recommendations included within the user interface 1660. The user interface 1660 includes an element 1662 indicating a current state of the user interface 1660. Furthermore, the user interface 1660 includes elements 1664-1668 indicating recommendations.

The element 1662 provides an indication of a score for infectious disease risk and a current monthly energy cost, e.g., a monthly energy bill. Furthermore, the element 1662 includes an indication of current values for settings such as air flow, comfort, ultraviolet (UV) disinfection, and filtration. Each of the recommendations of the elements 1664-1668 include updates to the values of the current settings. Furthermore, each of the elements 1664-1668 indicate operational adjustments and optional design adjustments.

Furthermore, each element 1664-1668 indicate predicted updates to the infectious disease risk score and monthly energy cost (e.g., increase or decreases) that will result from the settings of each recommendation. An accept element is included within each of the elements 1664-1668 allowing a user to interact with the interface 1660 and select one of the recommendations. Responsive to selecting one of the recommendations, e.g., the recommendation of element 1664, a user interface displaying operational adjustments 1670, e.g., the user interface 1680 can be displayed.

Figure 16D:
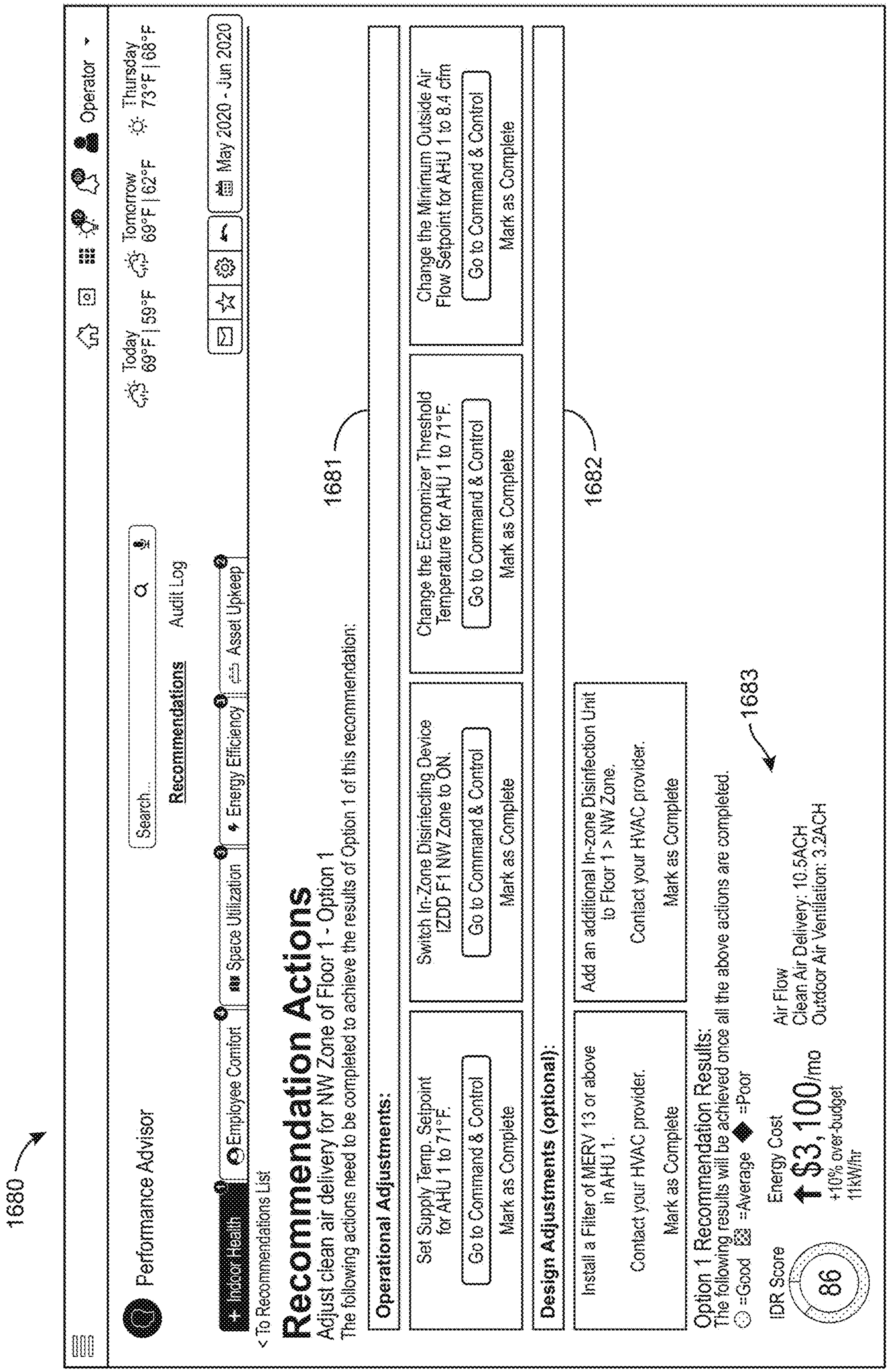
FIG. 16D is a user interface including optional adjustments for one of the recommendations of the interface of FIG. 16C, according to an exemplary embodiment.

Referring now to FIG. 16D, a user interface 1680 including optional adjustments for one of the recommendations of the interface of FIG. 16C is shown, according to an exemplary embodiment. The user interface 1680 can be displayed responsive to a user interacting with the element 1664, e.g., "Option 1." The user interface 1680 includes operational adjustments 1681 and design adjustments 1682 which are optional. The operational adjustments 1681 summarize the changes for the recommendation. A user can navigate to a command and control element for each setting change to implement or review an automatic change made by the system to operating settings for the building systems 142.

The design adjustments 1682 can be optional adjustments which do not affect the predictions of the recommendation but could improve the results of the recommendation. The element 1683 provides a description of the selected recommendation.

Figure 16E:
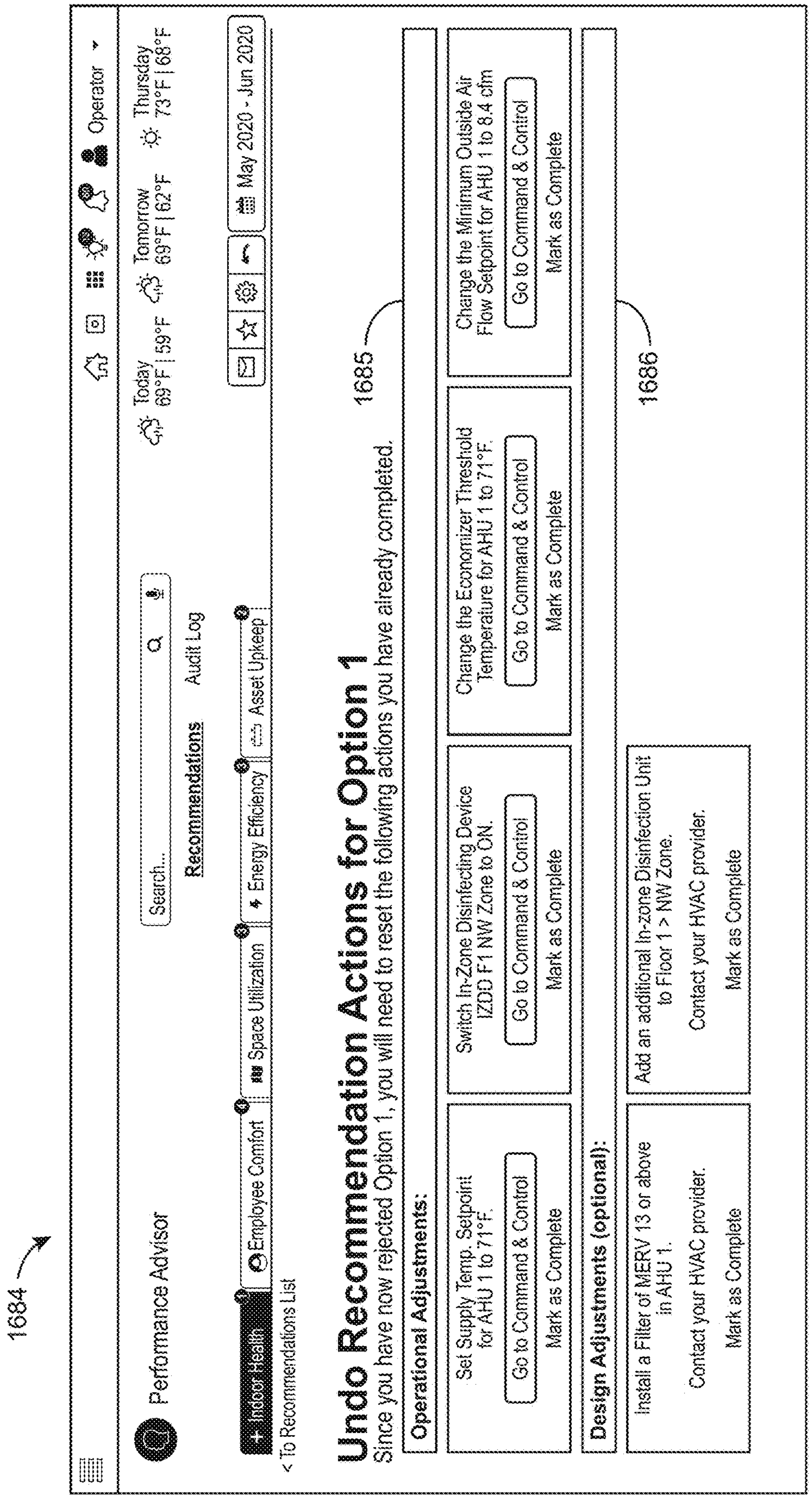
FIG. 16E is a user interface including accepted operational adjustments for the one recommendation of FIG. 16D, according to an exemplary embodiment.

Referring now to FIG. 16E, a user interface 1684 including accepted operational adjustments for the one recommendation of FIG. 16D is shown, according to an exemplary embodiment. The user interface 1684 can be displayed responsive to the settings of the recommendation described in FIG. 16D is accepted by a user. Accepted operational adjustments 1685 and accepted design adjustments 1686 can be displayed in the user interface 1684.

Figure 16F:
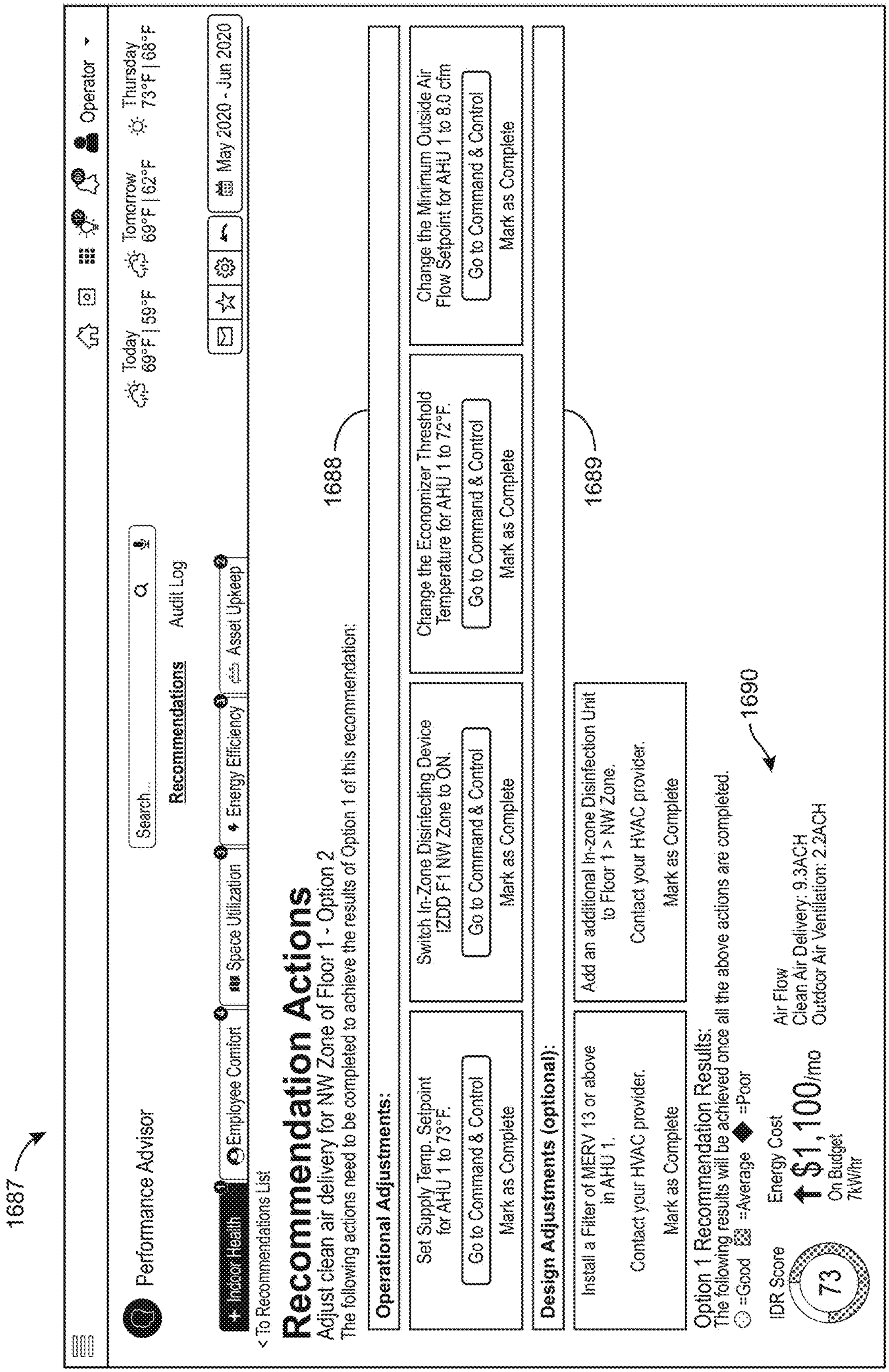
FIG. 16F is a user interface including optional adjustments for another one of the recommendations of the interface of FIG. 16C, according to an exemplary embodiment.

Referring now to FIG. 16F, a user interface 1687 including optional adjustments for another one of the recommendations of the interface of FIG. 16C is shown, according to an exemplary embodiment. The user interface 1688 can be displayed responsive to a user interacting with the element 1666, e.g., "Option 2." The user interface 1687 includes operational adjustments 1688 and design adjustments 1689 which are optional. The operational adjustments 1688 summarize the setting changes for the recommendation. A user can navigate to a command and control element for each setting change to implement or review an automatic change made by the system to operating settings for the building systems 142. The design adjustments 1689 can be optional adjustments which do not affect the predictions of the recommendation but could improve the results of the recommendation. The element 1690 provides a description of the selected recommendation.

Figure 16G:
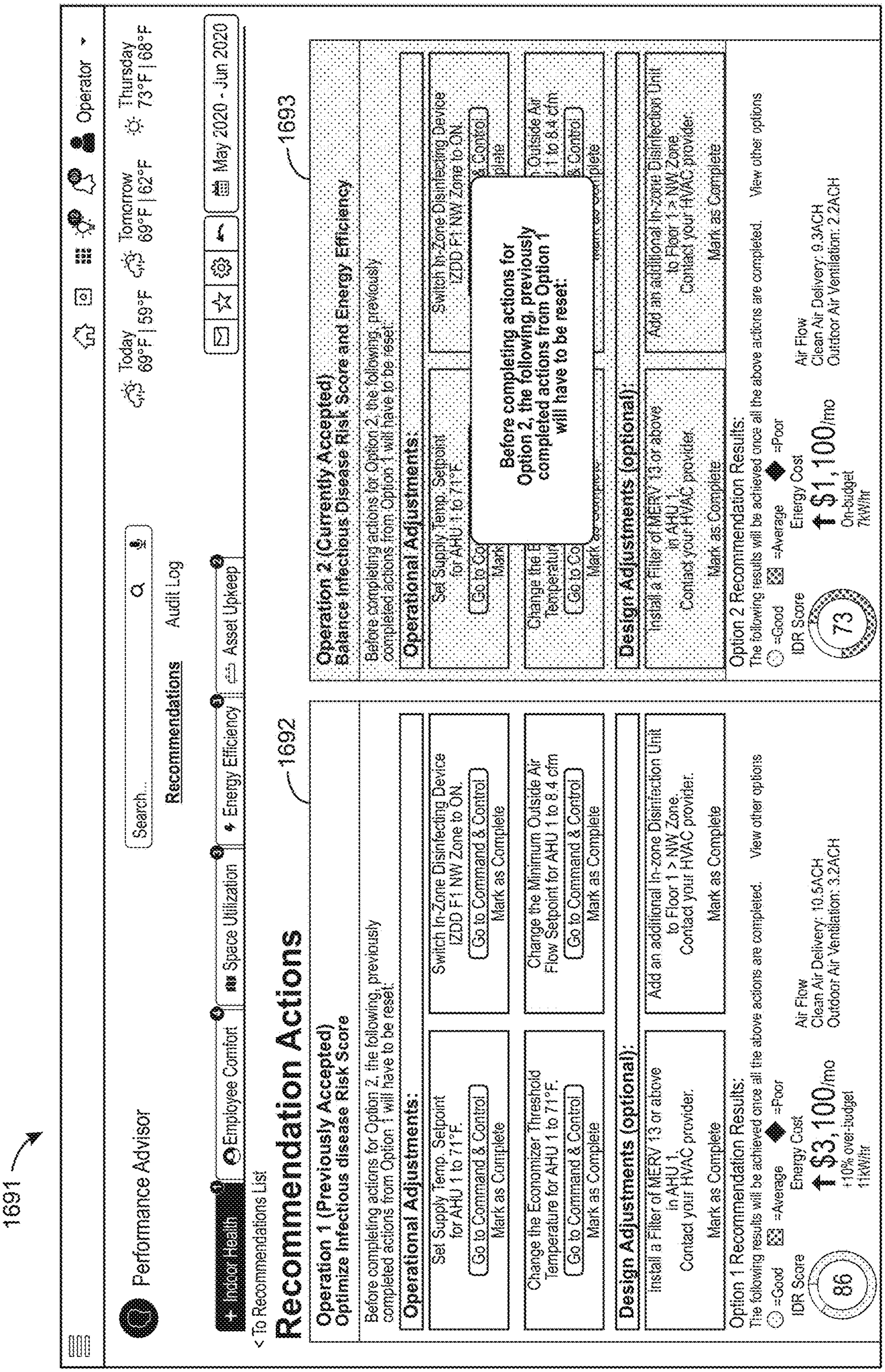
FIG. 16G is a user interface including recommendations where a first recommendation needs to be reset before a second recommendation can be accepted, according to an exemplary embodiment.

Referring now to FIG. 16G, a user interface 1691 including recommendations where a first recommendation needs to be reset before a second recommendation can be accepted is shown, according to an exemplary embodiment. The user interface 1691 can be displayed responsive to a user selecting a recommendation after a first recommendation is selected, e.g., the second recommendation conflicts with the first recommendation. In FIG. 16G, the example is the "Option 2" being selected after the "Option 1" is selected. Element 1692 provides a summary of the "Option 1," a recommendation selected via element 1664 of FIG. 16C. The element 1693 can provide a summary of the "Option 2," a recommendation selected via element 1666 of FIG. 16C.

Figure 17:
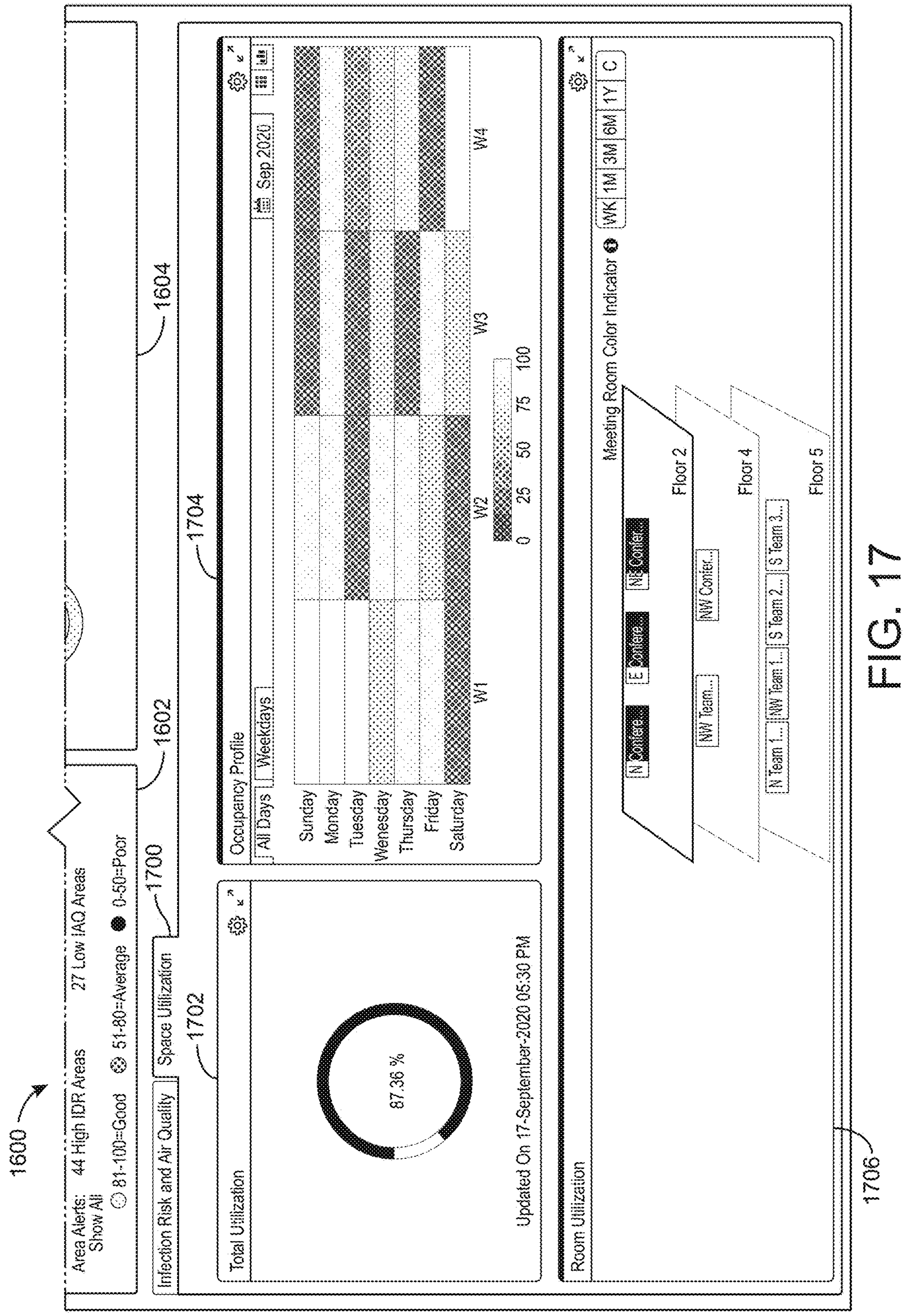
FIGS. 17-18A-B is the space performance user interface of FIGS. 16A-B including space utilization information, according to an exemplary embodiment.
Figure 18A:
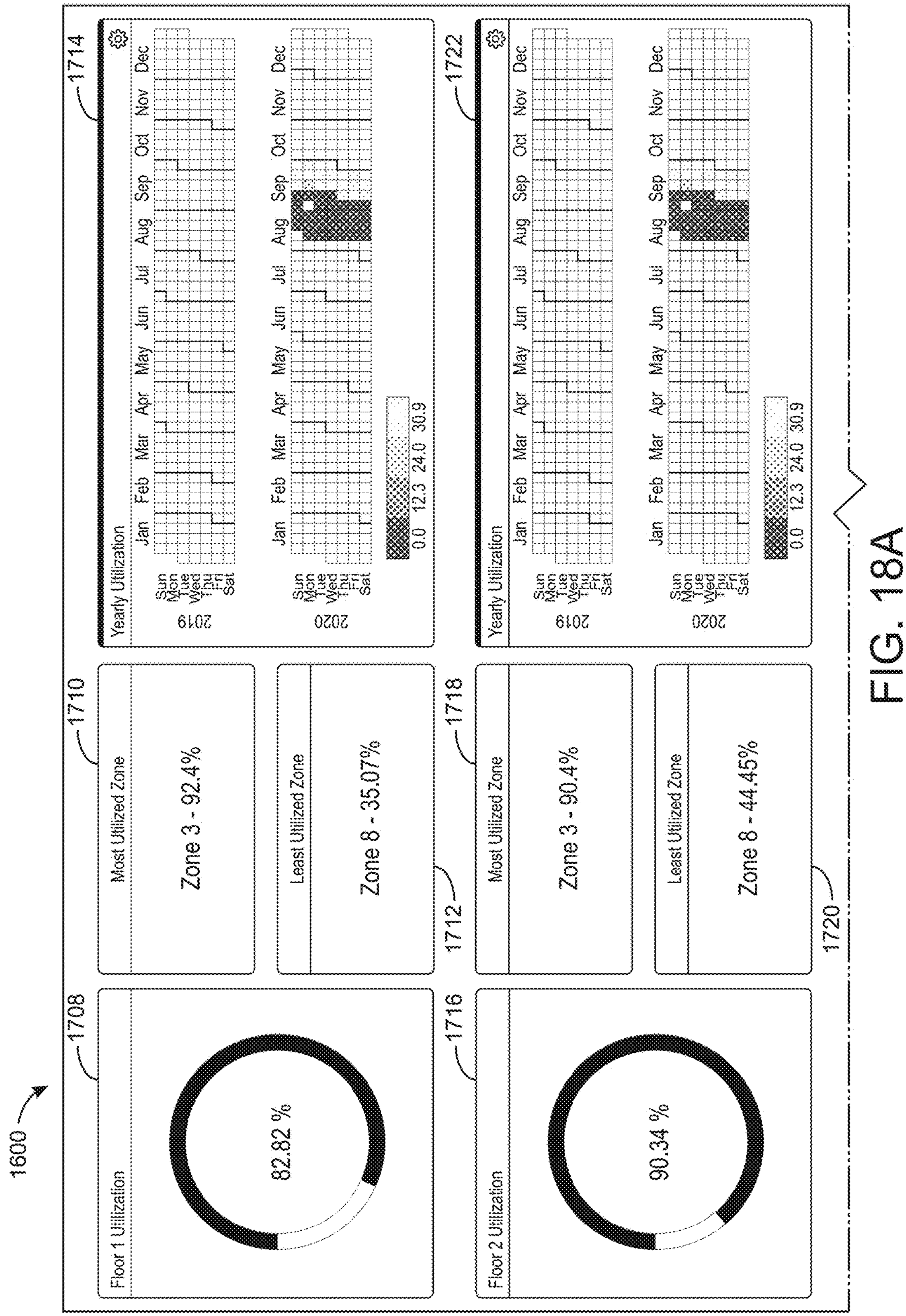
Figure 18B:
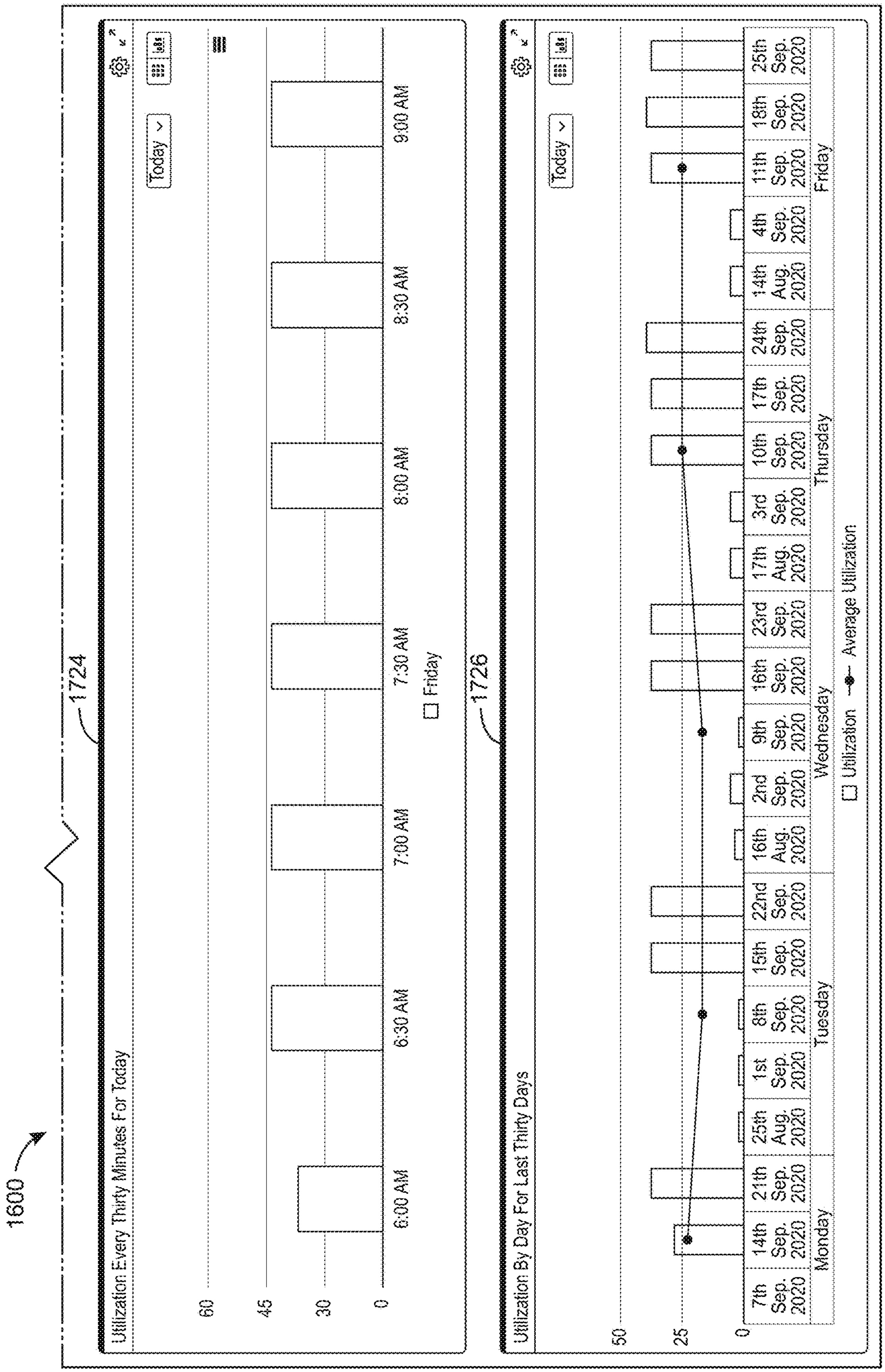

Referring now to FIGS. 17-18A-B, the space performance user interface 1600 including space utilization information is shown, according to an exemplary embodiment. The space performance user interface 1600 includes a space utilization element 1700. The element 1700 includes a total utilization 1702 indicating an overall occupancy level of the building 146. The element 1700 includes an occupancy profile 1704 indicates occupancy profiles for various days of the week for the building 146. Furthermore, the element 1706 indicates meeting rooms of various floors of the building 146 and the utilization of each meeting room.

The space performance user interface 1600 includes a floor utilization element 1708 indicating the floor utilization of a "Floor 1" of the building 146. The space performance user interface 1600 further includes a most utilized zone element 1710 indicating which zone of the "Floor 1" of the building 146 is the most utilized zone. Furthermore, the space performance user interface 1600 includes a least utilized zone element 1712 indicating the least utilized zone in the building 146.

The space performance user interface 1600 includes a yearly utilization element 1714 indicating the yearly space utilization of areas of the building 146. The space performance user interface 1600 indicates a floor utilization element 1716 indicating floor utilization for a "Floor 2" of the building 146. The space performance user interface 1600 includes a most utilized zone element 1718 indicating which zone of the "Floor 2" is the most utilized zone. Similarly, the space performance user interface 1600 indicates a least utilized zone element 1720 of the "Floor 2." The space performance user interface 1600 includes a yearly utilization element 1722 of the "Floor 2" of the building 146. Furthermore, the space performance user interface 1600 indicates a utilization element 1724 indicating utilization of the building 146 for every thirty minutes of a day. The space performance user interface 1600 further indicates an element 1726 indicating utilization of the building 146 by day for the last thirty days.

Referring now to FIG. 19, is a table 1900 of air quality parameter scoring is shown, according to an exemplary embodiment. The table 1900 can indicate scoring for the air parameters 602. The table 1900 indicates sub parameters such as carbon dioxide, duct static pressure, air velocity, air replacement, total volatile organic compound (TVOC), particulate matters, air replacement, etc. The parameters can be parameters measured and/or controlled by the building systems 142 in the building 146. Furthermore, the table 1900 indicates a criteria for scoring each sub parameter. Each sub parameter includes an allocated score (e.g., the allotted score to the parameter if the criterial is met), a total instances parameter, a deviation instances parameter, and a score calculation (e.g., an equation based on the allocated score parameter, the total instances parameter, and/or the deviation instances parameter).

Indoor air quality (IAQ) may depend on the presence and abundance of pollutants in the indoor environment that may cause harm. People spend 80-90% of time in enclosed building, in some cases. During this time, the occupants may inhale indoor air pollutants that could result in short-term or long-term health problems. A ventilation system can be installed in the building 146 to bring required fresh air in from outside and dilute occupant-generated pollutants (e.g., carbon dioxide) and product-generated pollutants (e.g., volatile organic compounds). Poorly ventilated spaces promote symptoms such as headache, fatigue, shortness of breath, sinus congestion, cough, sneezing, eye, nose, throat, and skin irritation, dizziness, and nausea. Furthermore, an airborne disease (e.g., COVID-19) can spread through transmission from one person to another in tiny particles of water and virus called aerosols. Aerosols can stay floating in the air for hours and can travel long distances. Aerosols can build up if the air inside is not circulated and/or filtered by the building 146 the right way.

Referring now to FIG. 20, a table 2000 of thermal comfort parameter scoring is shown, according to an exemplary embodiment. The table 2000 can indicate scoring for the air parameters 602. The table 2000 indicates sub parameters such as dry bulb temperature, personalized control optimum start, and/or humidity control, etc. The sub parameters can be parameters measured and/or controlled by the building systems 142 in the building 146. Furthermore the table 2000 indicates a criteria for scoring each sub parameter. Each sub parameter includes an allocated score (e.g., the allotted score to the parameter if the criterial is met), a total instances parameter, a deviation instances parameter, and a score calculation (e.g., an equation based on the allocated score parameter, the total instances parameter, and/or the deviation instances parameter).

Thermal conditions may be integral to the occupant experience in the building 146. Ventilation, temperature control, and/or humidity are all factors of the building 146 that may contribute significantly to workplace experience and task capabilities. A study on workplace thermal conditions and/or health impacts observed that workers experienced itchy, watery eyes, headaches, and/or throat irritation when thermal factors such as ventilation, humidity, and heat were unfavorable.

When indoor environments are too warm, there is evidence of increases in sick building syndrome symptoms, negative moods, elevated heart rate, respiratory issues, and feelings of fatigue. Thermal comfort can be more important to office worker performance than job stress or job satisfaction. Thermal comfort may be influenced by objective factors like air temperature, mean radiant temperature, air speed, and humidity, as well as personal factors like metabolic activity level and thermal insulation from clothing.

Referring now to FIG. 21, a table 2100 of light parameter scoring is shown, according to an exemplary embodiment. The table 2100 can indicate scoring for the light parameters 614. The table 2100 indicates sub parameters such as desk light control, meeting room light control, outdoor conditions, etc. The sub parameters can be parameters indicating the presence or absence of certain systems of the building systems 142 in the building 146. Furthermore the table 2100 indicates a criteria for scoring each sub parameter. Each sub parameter includes an allocated score and a score calculation. The calculation can indicate that the allocated score is attributed to the sub parameter if the system referenced by the sub parameter is present in the building 146.

The eye can have dual roles. The eye can detect light to allow us to see but also detects light to tell the brain what time of day it is. These visual and non-visual effects of light can have different sensitivities to light intensity, spectrum, timing, pattern, and/or light history and are served by different light detectors (photoreceptors) in the eye. Both roles are important considerations when assessing the quality of a built environment. Light may be the main driver of the visual and circadian systems. Light levels typically experienced indoors (e.g., tens to hundreds of lux) can induce non-visual responses. Therefore the type of lighting occupants are exposed to during the day and night may need to be optimized. Light exposure can impact mood and reduces symptoms of depression in individuals. Light also has acute effects on our cognitive function and sleep.

Referring now to FIG. 22, a table 2200 of light sunshade parameter scoring is shown, according to an exemplary embodiment. The table 2200 can indicate scoring for light sunshade parameters. The table 2100 indicates sub parameters for sunshade control. The sub parameters can be parameters indicating the presence and/or operation of sunshade control systems of the building systems 142 in the building 146. Furthermore the table 2200 indicates a criteria for scoring each sub parameter. Some sub parameters includes an allocated score and a score calculation. The calculation can indicate that the allocated score is attributed to the sub parameter if the system referenced by the sub parameter is present in the building 146. For one sunshade control sub parameter, a total number of instances and a total number of deviations are used in a score calculation to determine a score of the sunshade control parameter.

Many studies on the health impacts of daylight have reported evidence for potential benefits including improvement to vision and sleep quality and reduced symptoms of myopia, eye strain, headache, and depression. Daylight exposure and/or access to windows at work have been linked to improved sleep duration and mood, reduced sleepiness, lower blood pressure and increased physical activity, whereas lack of natural light has been associated with physiological, sleep, and depressive symptoms. Office workers exposed to electric and natural lighting conditions have reported experiencing less glare and less sleepiness earlier in the day under natural lighting compared to when they were under electric lighting. Moreover, not only intensity but also the timing of daytime light exposure has been found to influence body mass index (BMI) in adults, with lower BMI in those who receive most of their bright light exposure earlier rather than later in the day Referring now to FIG. 23, a table 2300 of occupancy parameter scoring is shown, according to an exemplary embodiment. The table 2300 can indicate scoring for light sunshade parameters. The table 2300 indicates sub parameters for occupancy. The sub parameters can be parameters indicating a number of occupants sensed by the building systems 142 in the building 146. Furthermore the table 2300 indicates a criteria for scoring each sub parameter. Some sub parameters include an allocated score, a total instances, a deviation instances, and a score calculation.

Referring now to FIG. 24, a table 2400 of healthy building parameter scoring is shown, according to an exemplary embodiment. The table 2400 can indicate scoring for the seating parameters 620. The table 2400 indicates sub parameters for seating parameters. The sub parameters can be parameters indicating the presence of hot desking and/or seating systems of the building systems 142 in the building 146. Furthermore, the table 2400 indicates a criteria for scoring each sub parameter. Some sub parameters includes an allocated score and a score calculation. The calculation can indicate that the allocated score is attributed to the sub parameter if the system referenced by the sub parameter is present in the building 146.

The seating parameters 620 can indicate whether ample active workstations, such as a sit-stand or treadmill desk are available in the building 146. Sedentary behavior has been linked to numerous negative health outcomes, including obesity, type 2 diabetes, cardiovascular and metabolic risks and premature mortality. Sedentary behavior also poses health risks, despite activity levels, and may even negate the positive health effects associated with physical activity. Active workstations may be effective at decreasing time spent sitting, thereby increasing energy expenditure. Studies do not suggest there is an impact on productivity for sit-stand or treadmill desks with more mixed findings for bicycle desks. Evidence further suggests that offering active workstations along with education, prompts and/or behavior change counseling may support sustained behavior change and further reduce sitting time.

Referring now to FIG. 25, a table 2500 of sound parameter scoring is shown, according to an exemplary embodiment. The table 2500 can indicate scoring for the sound parameters 618. The table 2500 indicates sub parameters for sound, e.g., noise level, music, etc. The sub parameters can be parameters indicating noise levels sensed by the building systems 142 in the building 146. Furthermore, the sub parameters indicate music playing actions that the building systems 142 can take in the building 146. Furthermore the table 2500 indicates a criteria for scoring each sub parameter. Some sub parameters are associated with an allocated score and a score calculation.

Noise may be defined as an “unwanted or disturbing sound” that interferes with normal activities such as work, sleeping, and/or conversation. Noise enters building interiors from outside sources such as aircraft, road traffic, trains, lawn mowers, snow blowers, and/or the operation of heavy equipment at construction sites. Indoors, noise can be generated from a mechanical system, HVAC systems, office equipment, vacuum cleaners, industrial machinery, and/or conversations among occupants.

The presence of background noise can also be disruptive and interfere with an ability of an individual to communicate and clearly perceive speech at a normal speaking volume. Thus, a building occupant may need to raise their voice to compensate. On the contrary, the music involves the use of the whole brain. Music can improve memory, attention, physical coordination and mental development. Classical music can stimulate the regeneration of brain cells. Classical music, played at a moderate volume, can encourage creativity, and/or repair brain damage.

Referring now to FIG. 26, a table 2600 of sanitization parameter scoring is shown, according to an exemplary embodiment. The table 2600 can indicate scoring for the sanitization parameters 642. The table 2600 indicates sub parameters regarding sanitization in the building 146. The sub parameters can indication a sanitization schedule of a space, a space sanitization status, and/or sanitization requests for a space. The table 2600 indicates a criteria for scoring each sub parameter. Some sub parameters are associated with an allocated score and a score calculation.

Referring now to FIG. 27, a table 2700 of food parameter scoring is shown, according to an exemplary embodiment. The table 2700 can indicate scoring for the food parameters 634. The table 2700 indicates sub parameters regarding food ordering, nourishment, fruit basket ordering, food break areas and eating areas, etc. in the building 146. The table 2700 indicates a criteria for scoring each sub parameter. Some sub parameters are associated with an allocated score and a score calculation.

Healthy diets have the potential to nurture human health and prevent several diet-related diseases, including cardiovascular disease, high blood pressure and diabetes. However, poor nutrition remains a top contributor to disease. Fruits and vegetables may be a key component of a healthy dietary pattern for the prevention of chronic disease. However, most individuals around the world do not meet the daily recommended five servings. Nutrition education has been shown to be more effective when focused on changing specific behaviors, rather than only increasing knowledge. The scope of nutrition and food education may also be broader than personal nutrition and health. For example, education can cover topics, such as safe food handling practices, gardening and food production techniques, as well as food preparation skills.

Referring now to FIG. 28, a table 2800 of fitness parameter scoring is shown, according to an exemplary embodiment. The table 2800 can indicate scoring for the fitness parameters 636. The table 2800 indicates sub parameters regarding fitness programs offered in the building 146, fitness awareness, occupant activity levels, gym occupancy status, bicycle stand booking, etc. The table 2800 indicates a criteria for scoring each sub parameter. Some sub parameters are associated with an allocated score and a score calculation.

Nearly a quarter of the global population do not achieve physical activity guidelines and is considered physically inactive. Key determinants of physical activity behavior include time, convenience, motivation, self-efficacy, weather conditions, travel and family obligations, fear of injury, lack of social support, and/or environmental barriers such as availability of sidewalks, parks and/or bicycle lanes. Physical inactivity has emerged as a primary focus of public health, due to a rise in premature mortality and chronic diseases attributed to inactive lifestyles, including type 2 diabetes, cardiovascular disease, depression, stroke and some forms of cancer. Physical activity can be intimately tied to prevention of these chronic conditions and overall health across the lifespan.

Referring now to FIG. 29, a table 2900 of handwashing parameter scoring is shown, according to an exemplary embodiment. The table 2900 can indicate scoring for the handwashing parameters 638. The table 2900 indicates sub parameters regarding hand washing, soap dispensers, touchless hand washing, etc. The table 2800 indicates a criteria for scoring each sub parameter. Some sub parameters are associated with an allocated score and a score calculation.

Handwashing with soap can remove germs from hands. This can help prevent infections because people frequently touch their eyes, nose, and mouth without even realizing it. Germs can get into the body through the eyes, nose and mouth and make people sick. Furthermore, germs from unwashed hands can get into foods and drinks while people prepare or consume them. Germs can multiply in some types of foods or drinks, under certain conditions, and make people sick. Germs from unwashed hands can be transferred to other objects, like handrails, tabletops, or toys, and then transferred to hands of another person. Proper and frequent handwashing can reduce the number of people who get sick with diarrhea by 23-40%, reduce diarrheal illness in people with weakened immune systems by 58%, reduces respiratory illnesses, like colds, in the general population by 16-21%, and/or reduce absenteeism due to gastrointestinal illness in schoolchildren by 29-57%.

Referring now to FIG. 30, a table 3000 of water quality parameter scoring is shown, according to an exemplary embodiment. The table 3000 can indicate scoring for water quality parameters 632. The table 3000 indicates sub parameters for water quality. The sub parameters can be parameters indicating contaminant levels, awareness, hot water quality, water refilling stations, water quality, and/or occupant dehydration alerts. Furthermore the table 3000 indicates a criteria for scoring each sub parameter. Some sub parameters include an allocated score, a total instances, a deviation instances, and a score calculation.

Water quality can be important because it directly affects the health of the people. When water quality is compromised, its usage puts users at risk of developing health complications. However, many people do not drink enough water, even where safe water is easily accessible. To ensure water quality, it is necessary to test water quality regularly and install water purification system for removal of contaminants, if necessary. Combinations of various building automation system can be used to make drinking water easily accessible and remind occupant if enough water is not consumed during office hours.

Referring now to FIG. 31, a table 3100 of pest control parameter scoring is shown, according to an exemplary embodiment. The table 3100 can indicate scoring for pest control parameters 640. The table 3100 indicates sub parameters for pest control. The sub parameters can be parameters indicating pest control scheduling, pest detections, pest control status, no entry alerts for pest control periods, etc. The table 3100 indicates a criteria for scoring each sub parameter and score calculation for each sub parameter.

Referring now to FIG. 32, a table 3200 of emergency parameter scoring is shown, according to an exemplary embodiment. The table 3200 can indicate scoring for emergency parameters 628. The table 3200 indicates sub parameters for the emergency parameters 628. The sub parameters can be parameters indicating a SOS button for occupancy emergencies, an alert and location sharing feature, a SOS alert for inorganic gas levels, and/or an SOS alert for occupants in the case of bush fires, etc. The table 3200 indicates a criteria for scoring each sub parameter and score calculation for each sub parameter.

Referring now to FIG. 33, a table 3300 of accessibility parameter scoring is shown, according to an exemplary embodiment. The table 3300 can indicate scoring for accessibility parameters 630. The table 3300 indicates sub parameters for outdoor access, indoor navigation, etc. The table 3300 indicates a criteria for scoring each sub parameter and score calculation for each sub parameter.

Referring now to FIG. 34, a table 3400 of mind parameter scoring is shown, according to an exemplary embodiment. The table 3400 can indicate scoring for mind parameters 622. The table 3400 indicates sub parameters for the presence and/or absence of services of the building 146, e.g., mental health awareness, access to organization (e.g., a mental health education program), access to suicide prevention resources, and/or access to organization stress management programs, etc. The table 3400 indicates a criteria for scoring each sub parameter and score calculation for each sub parameter.

Referring now to FIG. 35, a table 3500 of social parameter scoring is shown, according to an exemplary embodiment. The table 3500 can indicate scoring for social parameters 624. The table 3500 indicates sub parameters for the presence and/or absence of services of the building 146, e.g., alerts and notifications of organization social events, colleague birthday reminders, nearby social events, etc. The table 3500 indicates a criteria for scoring each sub parameter and score calculation for each sub parameter.

Referring now FIG. 36, a table 3600 of physical user health parameter scoring is shown, according to an exemplary embodiment. The table 3600 can indicate scoring for physical user health parameters. The table 3600 indicates sub parameters for the presence and/or absence of services of the building 146, e.g., customized alerts to occupants to low away from a screen, an alert for occupants when a person is less than three feet away from them, a service to update sick leave, contact tracing, a service to handle air replacement requests, alerts or notifications for occupant irregularities in health data, etc. The table 3600 indicates a criteria for scoring each sub parameter and score calculation for each sub parameter.

Figure 37:
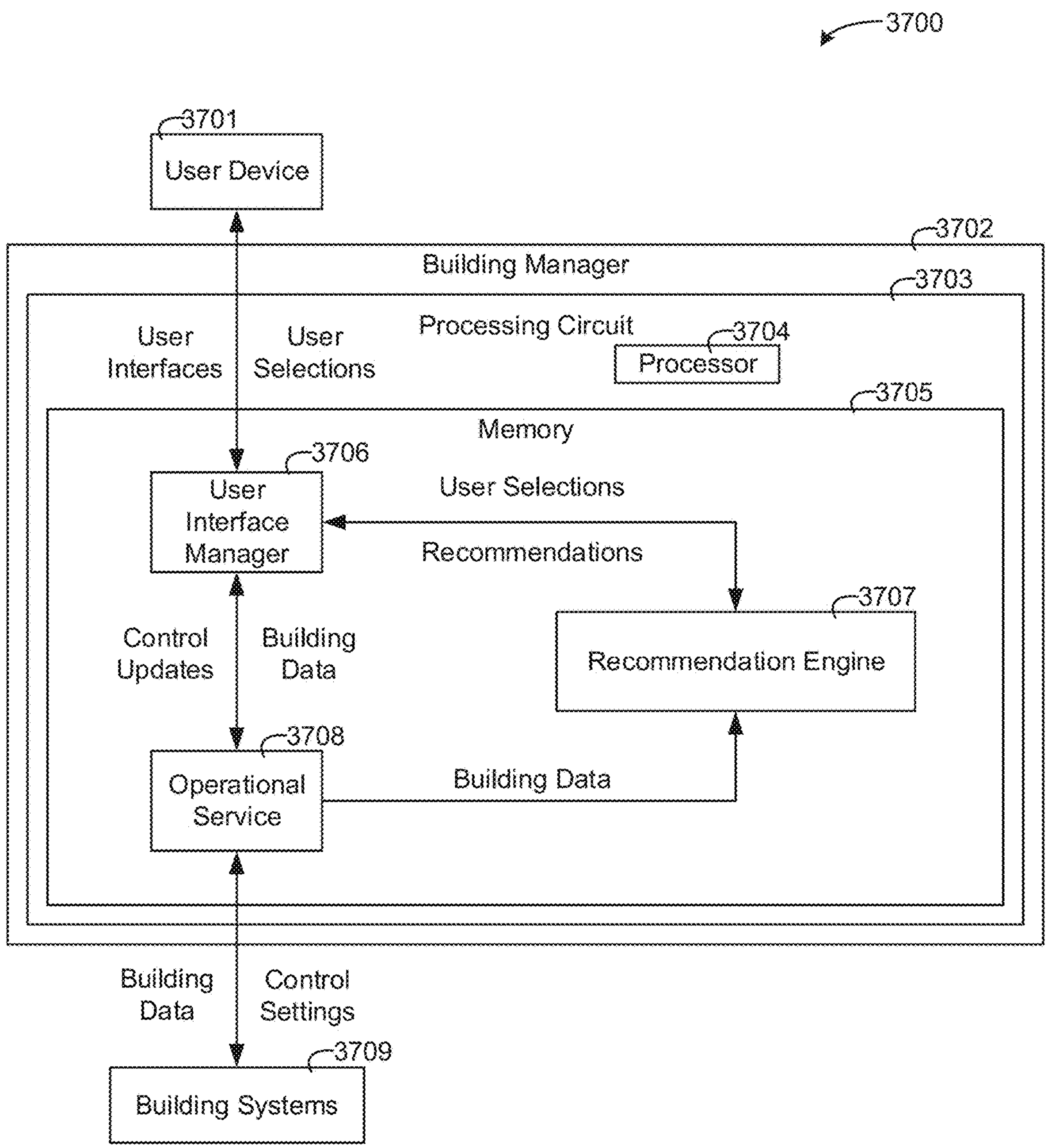
FIG. 37 is a block diagram of a system including a building manager, a user device, and a building system, where the building manager generates recommendations for review and approval by a user via the user device, according to an exemplary embodiment.

Referring now to FIG. 37, a block diagram of a system 3700 including a building manager 3702, a user device 3701, and a building system 318 is shown, where the building manager 3702 generates recommendations for review and approval by a user via the user device 3701, according to an exemplary embodiment. The system 3700 can be implemented for a building and/or campus of buildings. In some embodiments, the system 3700 can be implemented for one or multiple buildings owned by an entity located in various locations, e.g., a chain of stores. In some embodiments, the system 3700 is implemented for the building 146 as described with reference to FIG. 1. The system 3700 can be a component of the systems and methods described herein, e.g., the cloud systems 104, the building health manager 128, etc.

The user device 3701 may be a device associated with a particular user or group of users. The user device 3701 can be a smartphone, a tablet, a desktop computer, a laptop computer, a console, and/or any other type of user device. The user device can include display means, e.g., a liquid crystal display (LCD), an organic light-emitting diode (OLED) display, a light emitting diode (LED) display, etc. Furthermore, the user device can include input means, e.g., a keyboard, a mouse, a touch screen display, etc. The user device 3701 can receive user interfaces from the building manager 3702 and provide user selections made via the user interfaces to the building manager 3702. The user device 3701 may be the same as, or similar to, the user device 148.

The building systems 3709 can be HVAC systems, fire systems, security systems, access control systems, light systems, building surveillance systems, and/or any other type of building system. The building systems 3709 can be configured to control various conditions of a building, e.g., temperature, humidity, carbon dioxide ($CO_2$), flow rates, light levels, and/or any other type of environmental condition. In some embodiments, the building systems 3709 can be configured to operate based on control settings, e.g., temperature setpoints, zone temperature setpoints, humidity setpoints, airflow setpoints, pressure setpoints, etc. The building systems 3709 can be the building systems shown and described with reference to FIGS. 1-2.

The building manager 3702 can be implemented locally within a building and/or remote from the building. In some embodiments, the building manager 3702 can be distributed across on-premises and off-premises systems. The building manager 3702 can be implemented in server systems, computer systems, and/or cloud computing systems. The building manager 3702 can include one or more memory and processing devices, e.g., the processing circuit 3703 including the processor 3704 and the memory 3705.

The processing circuit 3703 can include one or multiple processors, e.g., the processor 3704 and one or multiple memory devices, e.g., the memory 3705. The processor 3704 can be a general purpose or specific purpose processor, an application specific integrated circuit (ASIC), one or more field programmable gate arrays (FPGAs), a group of processing components, or other suitable processing components. The processor 3704 may be configured to execute computer code and/or instructions stored in the memory 3705 or received from other computer readable media (e.g., CDROM, network storage, a remote server, etc.).

The memory 3705 can include one or more devices (e.g., memory units, memory devices, storage devices, etc.) for storing data and/or computer code for completing and/or facilitating the various processes described in the present disclosure. The memory 3705 can include random access memory (RAM), read-only memory (ROM), hard drive storage, temporary storage, non-volatile memory, flash memory, optical memory, or any other suitable memory for storing software objects and/or computer instructions. The memory 3705 can include database components, object code components, script components, or any other type of information structure for supporting the various activities and information structures described in the present disclosure. The memory 3705 can be communicably connected to the processor 3704 and can include computer code for executing (e.g., by the processor 3704) one or more processes described herein.

The memory 3705 includes a user interface manager 3706, an operational service 3708, and a recommendation engine 3707. The user interface manager 3706 can be configured to generate and manager various user interfaces, for example, the user interfaces and interface elements shown in FIGS. 5-14. Furthermore, the user interface manager 3706 can provide the user interfaces shown in FIGS. 5-14 to the user device 3701 and receive user interactions, e.g., selections made via the user interfaces with the user device 3701. The interfaces generated by the user interface manager 3706 can include recommendations generated by the recommendation engine 3707. User selections to approve or decline recommendations can be communicated to the recommendation engine 3707 by the user interface manager 3706.

The recommendation engine 3707 can be configured to receive building data from the operational service 3708. The building data can be data indicating the performance of the building systems 3709 and/or various spaces of a building. The recommendation engine 3707 can perform one or more machine learning and/or artificial intelligence based algorithms to generate recommendations. Furthermore, based on user selections associated with the recommendations, e.g., approving or rejecting a recommendation, the recommendation engine 3707 can perform learning to generate future recommendations. The recommendation engine 3707 can implement various modeling and/or learning algorithms, e.g., neural networks (e.g., recurrent neural networks (RNNs), convolutional neural networks (CNNs), etc.), support vector machines (SVMs), Bayesian networks, a constraint tool model, etc.

In some embodiments, the recommendation engine 3707 performs learning algorithms based on a persona of a user of the user device 3701 (e.g., technician, building manager, tenant, etc.). For example, the persona may indicate the goals and responsibilities of the user. The recommendation engine 3707 can be configured to generate personalized recommendations for each of multiple users based on the persona of each user.

The operational service 3708 can be configured to collect building data from the building systems 3709. Furthermore, the operational service 3708 can be configured to implement control settings for the building systems 3709, e.g., execute control algorithms based on the control settings and/or communicate the control settings to the building systems 3709. The control settings can be suggested control settings suggested by the recommendation engine 3707 and approved by a user via a user interface generated by the user interface manager 3706.

Figure 38A:
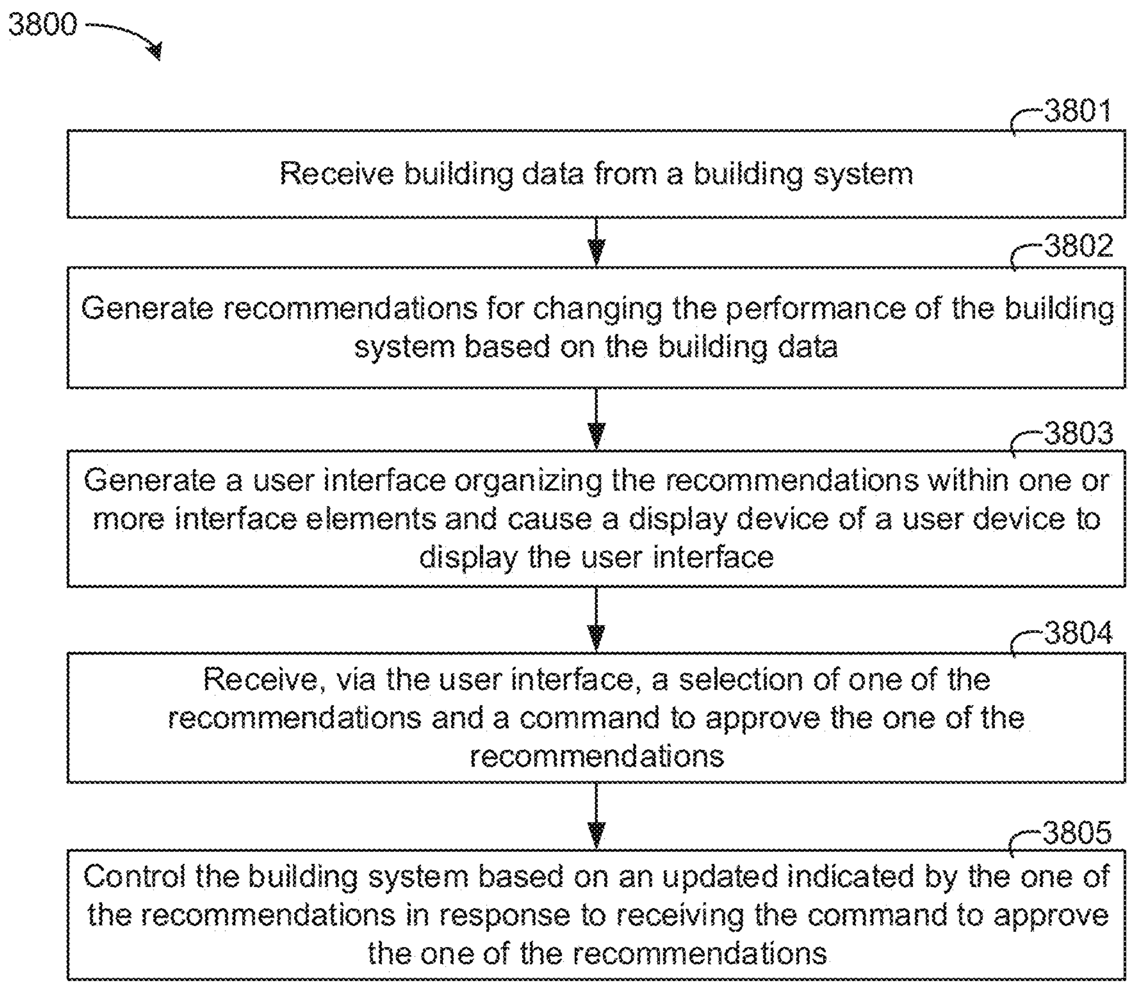
FIG. 38A is a flow diagram of a process of generating recommendations and a user interface for displaying the recommendations to a user via the user device of FIG. 37, according to an exemplary embodiment.

Referring now to FIG. 38A, a flow diagram of a process 3800 of generating recommendations and a user interface for displaying the recommendations to a user via the user device 3701 is shown, according to an exemplary embodiment. In some embodiments, the building manager 3702 can be configured to perform some and/or all of the process 3800. In some embodiments, any computing device described herein can be configured to perform the process 3800.

In step 3801, the building manager 3702 can receive building data from the building systems 3709. The building data can indicate energy usage, runtime information, zone temperatures, and/or any other measured characteristic or operating parameter of the building systems 3709.

In step 3802, the recommendation engine 3707 generates a recommendation to update control of the building systems 3709. The recommendation may be a recommendation to change a control setting of the building systems 3709. The recommendation may be to perform maintenance on the building systems 3709. Various recommendations are shown in FIGS. 5-14.

In step 406, the user interface manager 3706 generates a user interface that organizes the recommendations generated in the step 3802 and causes a display device of the user device 3701 to display the interfaces. The user interface can organize the recommendations according to categories. For example, the user interface can organize the recommendations based on whether the recommendations improve employee productivity (e.g., optimize a space, create comfortable temperature or humidity for the space, etc.), improve space utilization (e.g., optimizes a space), result in energy efficiency (e.g., e.g., optimize the performance of equipment), and/or relate to asset upkeep (e.g., maintenance of building equipment, implement control settings that improve equipment life, etc.). The categories can further be the planet health parameters 302, the space health parameters 304, the people health parameters 308, and/or any other sub parameter of the planet health parameters 302, the space health parameters 304, and/or the people health parameters 308. The user interface manager 3706 can generate the user interface with organized recommendations as shown in FIGS. 5-8.

In step 3804, the user interface manager 3706 can receive a selection of one of the recommendations of the interface generated in the step 3803 and a command to approve the one of the recommendations. The recommendation selected and approved by the user via the user device 3701 can include one or more recommended control settings for the building systems 3709. In step 3805, the operational service 3708 operates the building systems 3709 based on the updated control settings.

Figure 38B:
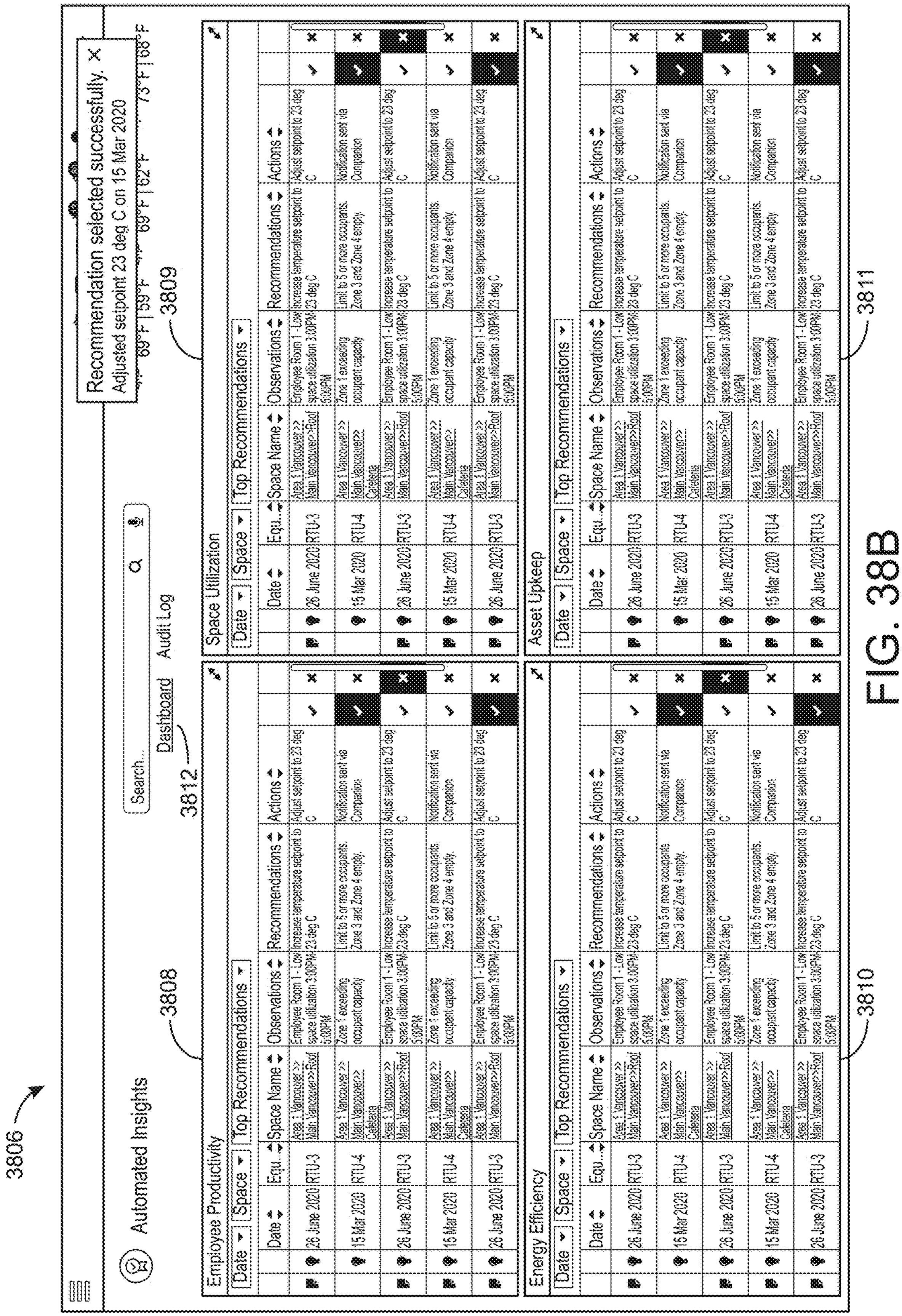
FIG. 38B is a user interface where the user interface sorts recommendations by employee productivity, space utilization, energy efficiency, and asset upkeep, according to an exemplary embodiment.

Referring now to FIG. 38B, a user interface 3806 where the user interface sorts recommendations by employee productivity, space utilization, energy efficiency, and asset upkeep is shown, according to an exemplary embodiment. The user interface 3806 includes an employee productivity element 3808, a space utilization element 3809, an energy efficiency element 3810, and an asset upkeep element 3811. The elements 3808-3811 form a multi-panel recommendation actionable dashboard. The panels may further categorize the recommendations in categories for the planet health parameters 302, the space health parameters 304, the people health parameters 308, and/or any other sub parameter of the planet health parameters 302, the space health parameters 304, and/or the people health parameters 308.

The elements 3808-3811 can each include different sets of recommendations. In some embodiments, each of the elements 3808-3811 include different recommendations or perform different sorting for recommendations. In some embodiments, one or multiple recommendations may appear in multiple of the elements 3808-3811.

The user interface manager 3706 can receive a set of recommendations and include the recommendations within the various elements 3808-3811 based on whether the recommendation relates to employee productivity, space utilization, energy efficiency, and/or asset upkeep. The recommendations can be included in a list view to be accepted or declined by a user.

The user interface 3806 can be one interface of a set of interfaces (e.g., the interfaces of FIGS. 5-14) that provide a consolidated user experience for artificial intelligence based recommendations to improve the performance of a building. Users can approve or decline the various recommendations of the elements 3808-3811 by providing the checkmark or the close marker. The recommendation engine 3707 can learn over time to automatically approve recommendations similar to recommendations accepted by the user. When a recommendation is approved for a first time, the user may further provide parameters for the recommendation that are propagated to future recommendations by the recommendation engine 3707.

The user interface 3806 can be a dashboard interface selected via the dashboard element 3812. The user interface 3806 provides a user with the ability to accept, reject, and/or comment on recommendations within a single user interface in addition to categorizing the various recommendations. Furthermore, the user interface 3806 includes sorting parameters for each of the elements 3808-3811. The sorting parameters can be date, space, impact, monetization (e.g., model predictive maintenance), potential financial impact from accepting a recommendation, and/or top recommendations. The elements 3808-3811 can include the most important recommendations for each category. The sorting parameters can provide the user the ability to provide specific filtering of the recommendations so that the user views only recommendations that they interested in.

In some embodiments, the interface manger 312 can score each of the recommendations for employee productivity, space utilization, energy efficiency, and asset upkeep. The interface manager 312 can include (or order) the recommendation within the elements 3808-3811 based on the score for each category (e.g., highest score on top to lowest score at bottom). In some embodiments, each category relates to an application run by the building manager. The interface manager 312 can include the recommendations within the elements 3808-3811 based on whether each recommendation pertains to one of the software applications. In some embodiments, the user interface manager 3706 color codes recommendations where actions have already been taken to implement a recommendation.

Figure 38C:
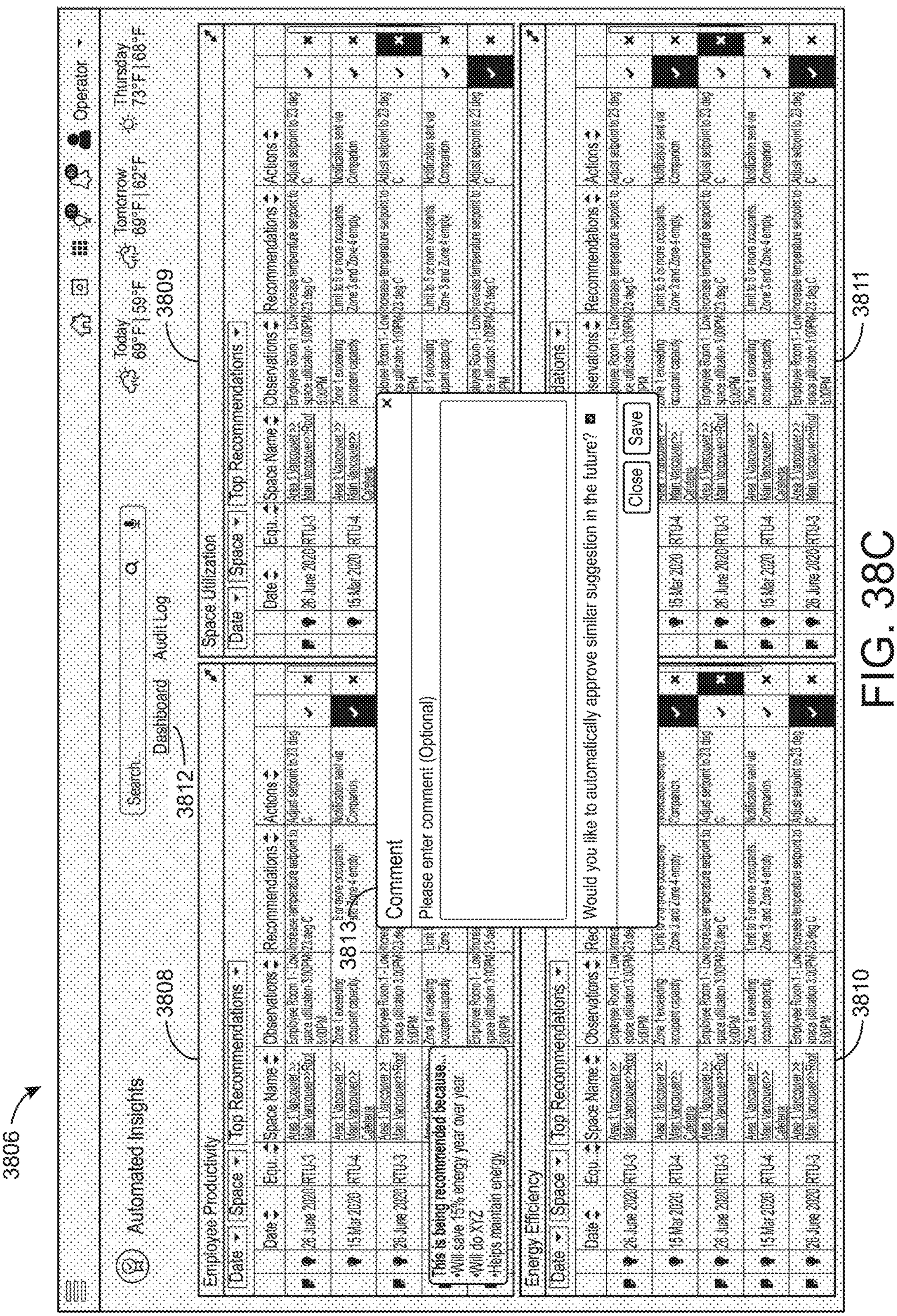
FIG. 38C is the user interface of FIG. 38B including a comment element where a user, via the user device of FIG. 37, enters a comment about one recommendation, according to an exemplary embodiment.

Referring now to FIG. 38C, the user interface 3806 including a comment element 3813 is shown where a user, via the user device 3701, enters a comment about one recommendation, according to an exemplary embodiment. When a user approves or declines one of the recommendations of the elements 3808-3811, the user interface manager 3706 may cause the interface 3806 to include the comment element 3813.

The user can enter a comment or description of why they approved a recommendation or why they declined a recommendation. In some embodiments, the user interface manager 3706 provides the option for providing a comment or requires the comment. By receiving the comments, a pattern of decision making can be built up for user review and/or learning by the recommendation engine 3707.

Furthermore, the comment element 3813 includes an element for causing a particular recommendation, or a particular type of recommendation, to be implemented automatically. In some embodiments, if a user indicates that a recommendation should be automatically approved, the recommendation can be automatically approved by the user interface manager 3706 in the future. This provide autonomous control of a building. In some embodiments, the comment element 3813 includes an indication of whether a recommendation being accepted would conflict with another recommendation that was previously implemented. In some embodiments, a user selects an operating mode for the building, e.g., eco mode, comfort mode, etc. Based on the operating mode, user interface manager 3706 can automatically accept certain recommendations.

Figure 38D:
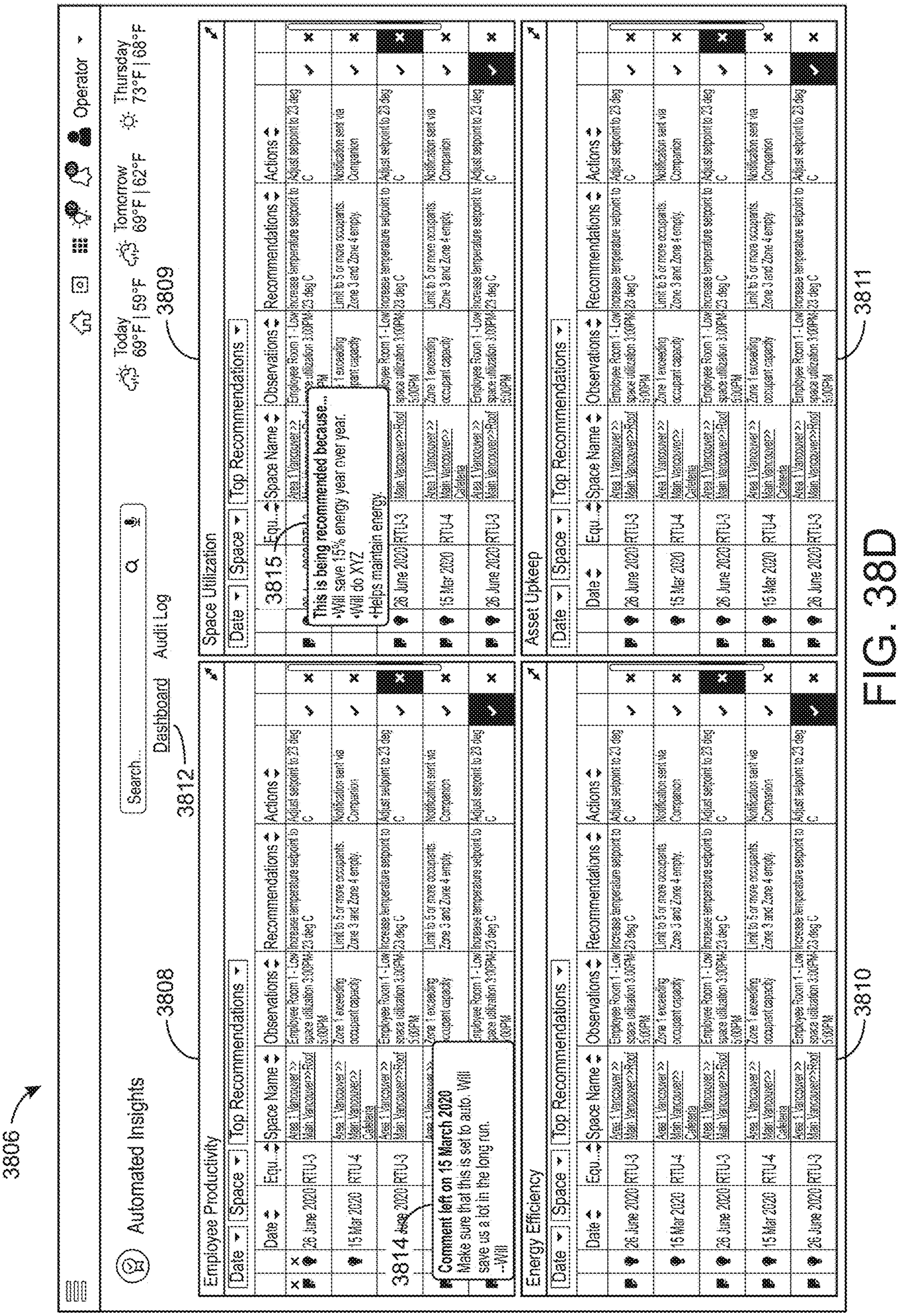
FIG. 38D is the user interface of FIG. 38B including a comment and a recommendation explanation for two different recommendations, according to an exemplary embodiment.

Referring now to FIG. 38D, the user interface 3806 is shown including a comment 3814 and a recommendation explanation 3815, according to an exemplary embodiment. If a user hovers over one of the light bulb icons in the elements 3808-3811, the comment 3814 and/or the explanation 3815 can be provided in the user interface 3806. The comment 3814 may be a comment entered by a user as shown in FIG. 38C. This can provide a user with an indication as to why the user, or another user, accepted or declined a recommendation. Furthermore, the explanation 3815 can provide an indication as to why the recommendation engine 3707 generated a recommendation. The explanation 3815 can include a static estimate and/or dynamic info (e.g., energy saving info) based on analysis of the building systems 3709. The explanation 3815 can provide an indication of a potential benefit of adopting a particular explanation.

Figure 38E:
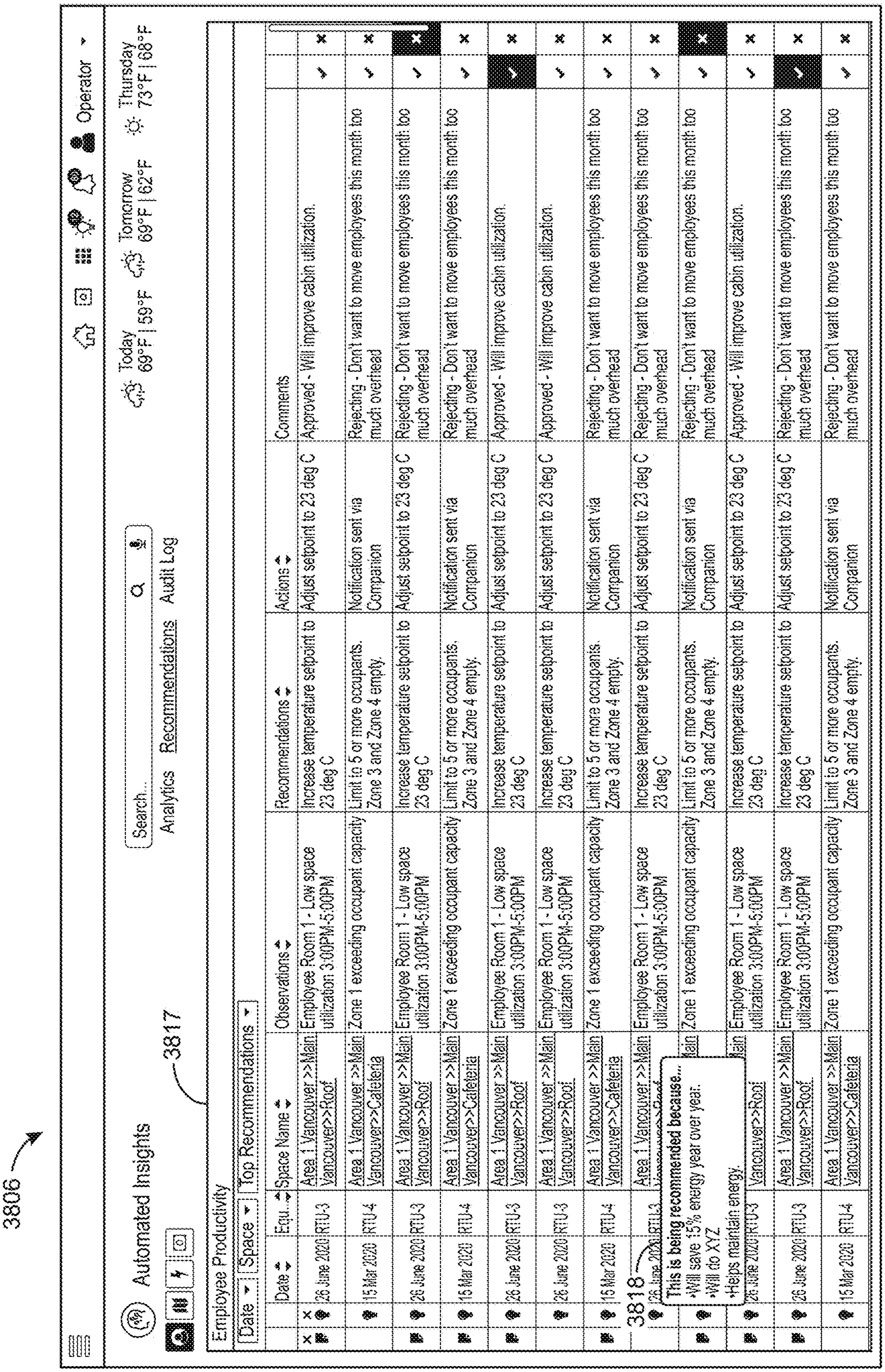
FIG. 38E is a user interface including recommendations that pertain to employee productivity, according to an exemplary embodiment.

Referring now to FIG. 38E, a user interface 3816 including recommendations that pertain to employee productivity, according to an exemplary embodiment. The user interface 3816 includes an element 3817 that includes recommendations that pertain to employee productivity. The user interface manager 3706 can cause the user device 3701 to display the user interface 3816 in response to a user interacting with the element 3808 as shown in FIGS. 5-7. The user interface 3816 can operate in an advisory mode where a user provides acceptance or rejection of various recommendations. The element 3817 includes an explanation 3818 indicating a reason why a particular recommendation is made within the element 3817.

Figure 38F:
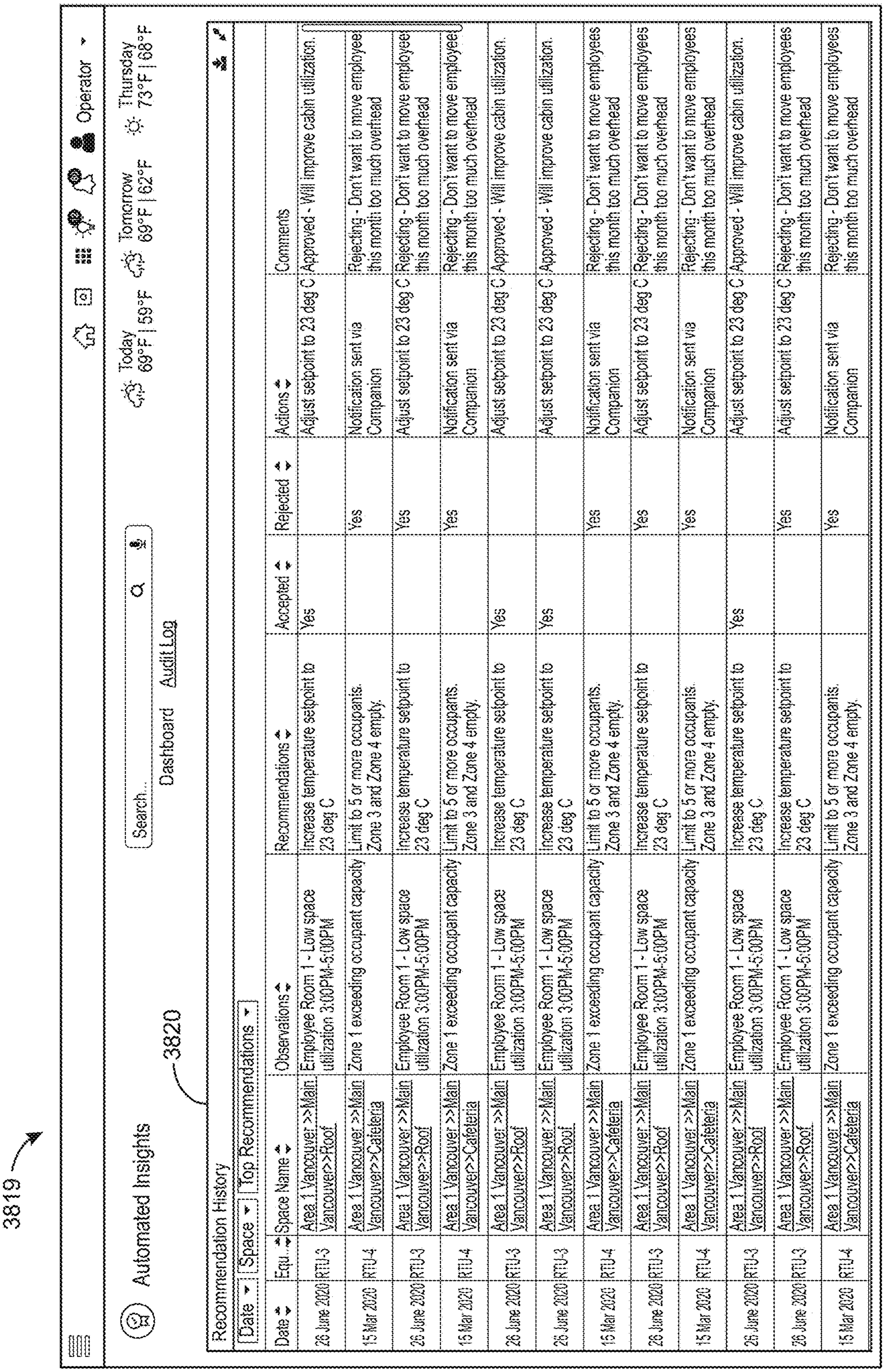
FIG. 38F is a user interface including an audit log providing a recommendation history, according to an exemplary embodiment.

Referring now to FIG. 38F, a user interface 3819 including an audit log providing a recommendation history for historical recommendations, according to an exemplary embodiment. The user interface 3819 includes an element 3820, the element 3820 provides an audit log of historical recommendations. This provides a user with a history of recommendations, comments, and actions that have already been taken (e.g., accepting or rejecting a recommendation). In some embodiments, the list of the element 3820 is sorted by time, impact (e.g., monetization), and/or category. In some embodiments, the element 3820 allows a user to filter recommendations by space and/or by attributes of spaces. This can allow a user to review an audit of recommendations and actions taken for a particular space. There may be one or more icons within the user interface 3819 that allow a user to select a particular space or spaces of a building.

Figure 38G:
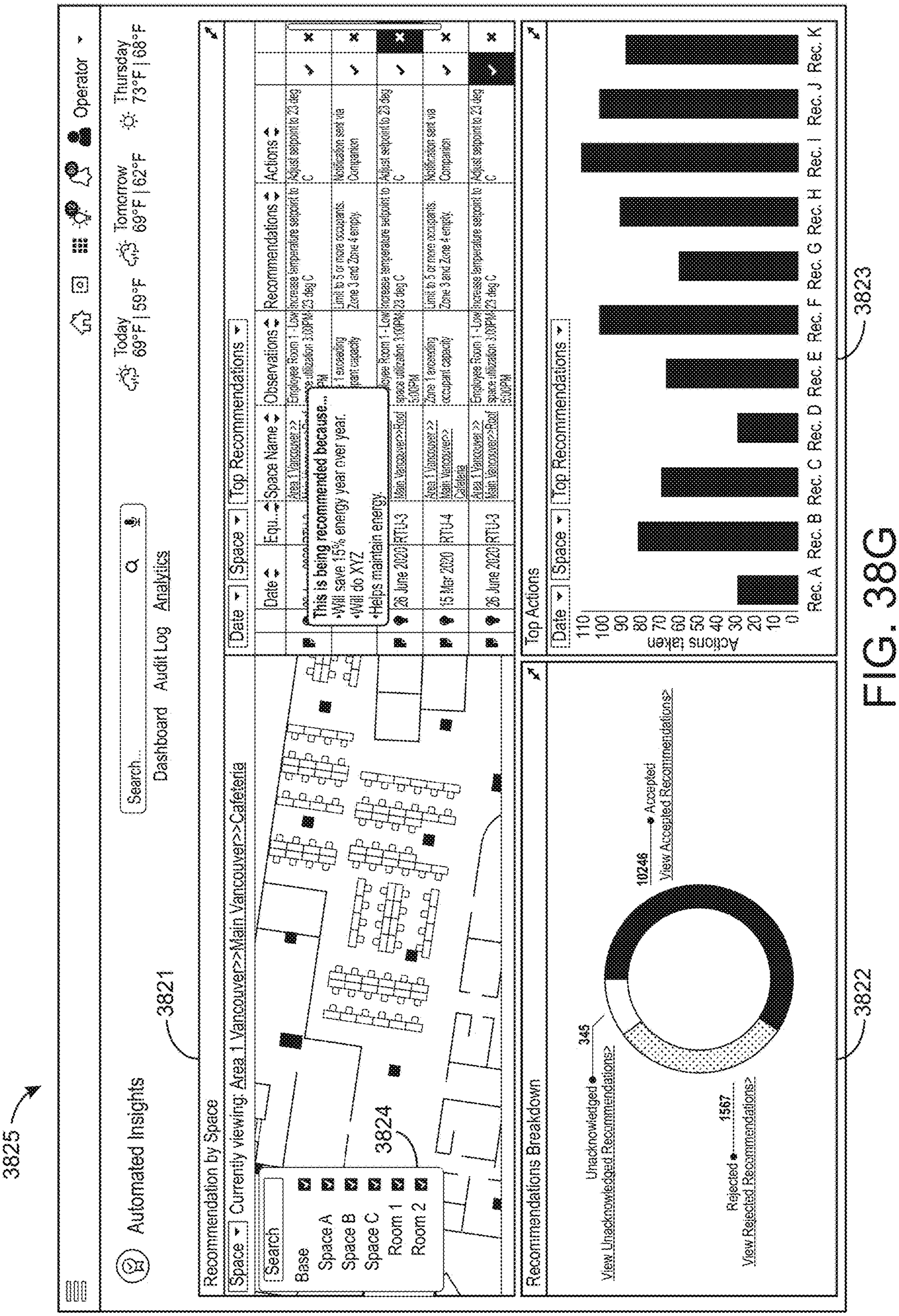
FIG. 38G is a user interface including recommendations for spaces shown in a three dimensional graphic representation of a building, a chart indicating the number of accepted, rejected, and unacknowledged recommendations, and a chart indicating total numbers of actions taken for various recommendations, according to an exemplary embodiment.

Referring now to FIG. 38G, a user interface 3825 including recommendations for spaces shown in a three dimensional graphic element 3821 providing a representation of a building, a chart 3822 indicating the number of accepted, rejected, and unacknowledged recommendations, and a chart 3823 indicating total numbers of actions taken for various recommendations is shown, according to an exemplary embodiment. The element 3821 shows a three dimensional overhead view, e.g., a building information model (BIM) view or floor plan of a building. The element 3821 further includes recommendations for the space viewed in the element 3821. As a user virtually navigates (e.g., by interacting with filter element 3824) throughout the building, the element 3821 can provide the recommendations according to the space being viewed, e.g., recommendations that affect the operation of the space.

In some embodiments, the element 3821 includes bubbles at various locations within the building. The bubble can include a number indicating the number of recommendations associated with the space. Interacting with the bubble can cause the recommendations for the space to be shown in the element 3821. The element 3821 can show alarms together with recommendations to resolve the alarms that can be accepted or rejected by a user.

The chart 3822 indicates the recommendations that have been rejected, accepted or unacknowledged. The chart 3822 can be a circle chart, a pie chart, and/or any other type of chart. The chart 3822 can give the user a view of their progress in responding to and addressing all recommendations. The chart 3822 can be shown for a particular space, e.g., a space selected via the element 3821, and/or for a building as a whole.

The chart 3822 indicates the performance of various recommendations. Different types of recommendations, recommendations A-K are included in the chart 3823. The chart 3823 indicates the number of actions take for each recommendation. In some embodiments, the chart 3823 indicates the number of actions taken for a particular space, e.g., the space selected via the element 3821. In some embodiments, the interface 3825 provides peer bench marking by industry for showing recommendations and/or actions. In some embodiments, the chart 3823 indicates the number of recommendations that have been accepted for various verticals or across various implementations of the building manager 3702 to provide peer benchmarking. The interface 3825 can provide a trend of the building indicating whether the building is increasing in productivity and/or spend. The interface 3825 can include recommendations to save money.

In some embodiments, indicating which recommendations are being accepted frequently can help a user understand whether their actions are helping meet a goal. The recommendation engine 3707 can perform actions to generate new recommendations if prior recommendations are not meeting a goal. The recommendation engine 3707, or a user, can identify patterns of most accepted or most rejected recommendations.

Figure 38H:
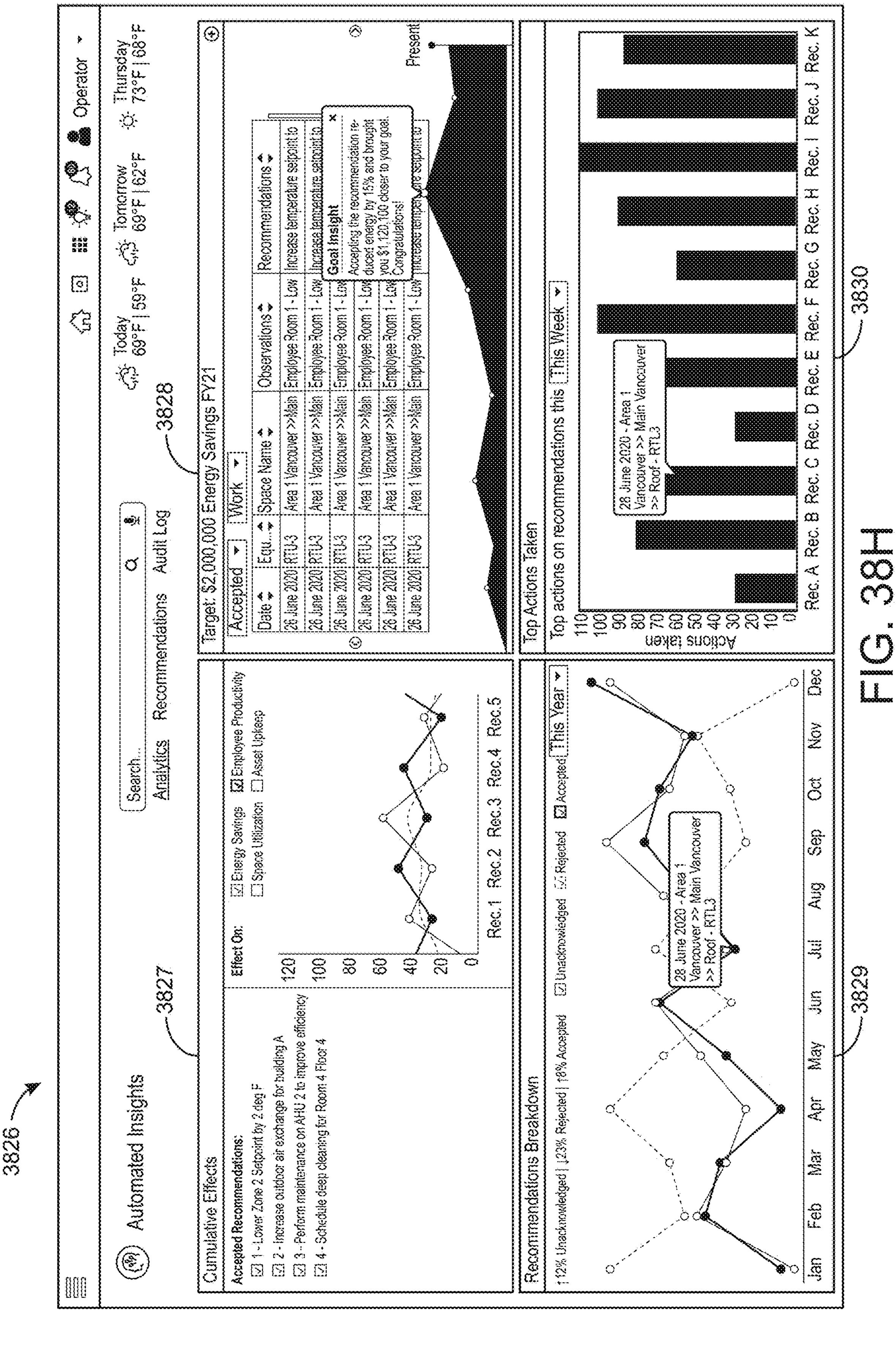
FIG. 38H is a user interface indicating analytics for recommendations, according to an exemplary embodiment.
Figure 38:
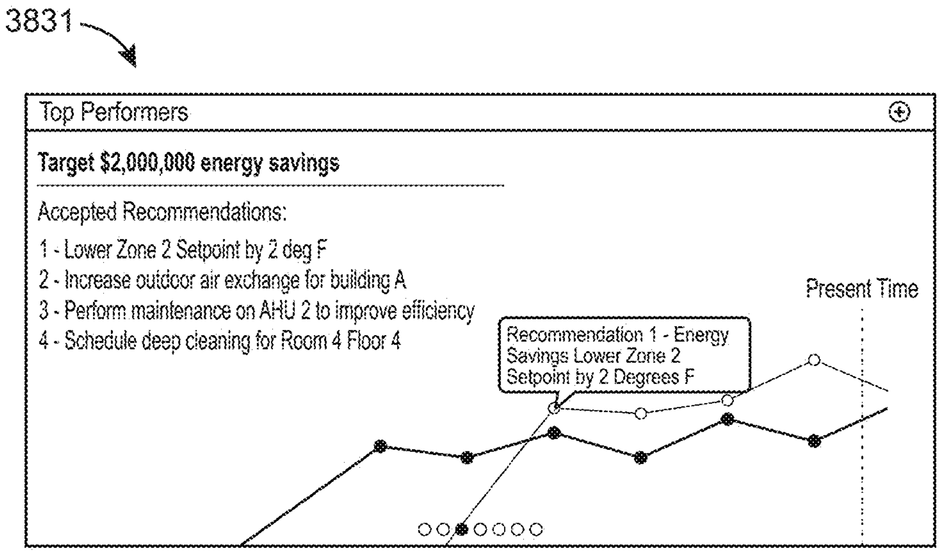
FIG. 38I is a user interface element indicating top performing recommendations with respect to a target goal, according to an exemplary embodiment.
FIG. 38J is a user interface element the cumulative effect of accepted or rejected recommendations, according to an exemplary embodiment.
FIG. 38K is an example of user interface elements, including the user interfaces of FIGS. 12-13, where a user adds a new target for a building, according to an exemplary embodiment.
Figure 38:
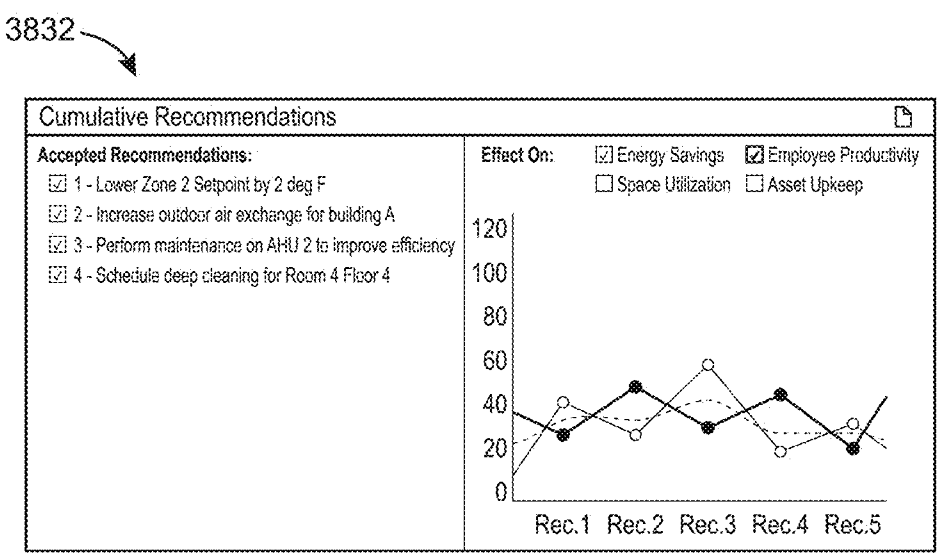

Referring now to FIG. 38H, a user interface 3826 indicating analytics for recommendations is shown, according to an exemplary embodiment. The user interface 3826 includes an element 3827 indicating the cumulative effects of various recommendations. The element 3827 can indicate which recommendations have been accepted and trends of the various recommendations that have been accepted, e.g., a trend of the number of accepted recommendations for different types of recommendations over time. The cumulative effects of the various recommendations can help illustrate how different recommendations drive energy savings or other operating goals.

The interface 3826 includes an element 3828. The element 3828 can indicate a target, e.g., a monetary and/or energy savings target. The various accepted recommendations can be included within the element 3828. The element can indicate how the recommendations are driving the performance of a building towards the target specified in the element 3828. The element 3828 can allow a user to cause the building manager 3702 to generate goal oriented recommendations by allowing a user to define a goal and/or define a savings targets. The user interface manager 3706 can generate alerts if a user makes an action that is in conflict with the goal.

In some embodiments, the interface 3826 includes recommendations that help an user meet a goal, e.g., a monetization goal. The interface 3826 can indicate an artificial intelligence socialization score (e.g., a score that indicates the breadth of recommendations and users accepting the recommendations) and/or an artificial intelligence adoption score (e.g., a score indicating the level of adoption of recommendations for a building). In some embodiments, the interface 3826 can indicate what accepted or rejected recommendations are in conflict with each other. Furthermore, the interface 3826 can indicate what profile or goal a user selects that may undo the progress towards another goal.

The user interface 3826 includes an element 3829. The element 3829 includes a chart indicating trends of unacknowledged, rejected, and/or accepted recommendations over a period of time. The user can filter the chart to include a trend line for the unacknowledged recommendations, the rejected recommendations, and the accepted recommendations. The trends can further be filtered by time, e.g., for a particular year, month, day, etc.

The user interface 3826 includes an element 3830. The element 3830 indicates the number of actions taken for various recommendations, e.g., recommendations A through K. The element 3830 provide an indication of the most frequently accepted recommendations. A user can cause the element 3830 to show the number of accepted recommendations for a particular period of time, e.g., for a week, a month, or a year, etc.

Referring now to FIG. 38I, a user interface element 3831 indicating top performing recommendations with respect to a target goal is shown, according to an exemplary embodiment. The element 3831 can indicate a target, accepted recommendations, and/or how the accepted recommendations are causing the performance of a building to move towards or meet a target. The element 3831 can be specific to a building or a particular user. For example, each user may have an element 3831 that they can view to track their progress in meeting a particular goal. In some embodiments, the element 3831 provides an indication of the top performing recommendations, e.g., the recommendations that have the most success in driving the performance of the building to meet the goal.

The trends of the element 3831 can be trends of energy consumption, health scores, employee productivity scores, etc. In response to a user interacting with a dot on the trends, the dot corresponding to an accepted recommendation, the element 3831 can display a pop up message describing what recommendation was accepted and implemented. This can help a user view how the recommendation impacted a particular score that they are tracking, e.g., after the recommendation was implemented, energy consumption of a building decreased or increased.

Referring now to FIG. 38J, a user interface element 3832 of the cumulative effect of accepted or rejected recommendations is shown, according to an exemplary embodiment. The element 3832 can be the same as or similar to the element 3827 as described with reference to FIG. 38H. In some embodiments, the element 3832 is an interface instead of, or in addition to, being an element within another interface.

In element 3832, a user can mark one or more different categories for display, e.g., employee productivity, space utilization, asset upkeep, etc. Responsive to marking a category for display, a trend chart tracking a score for the category can be shown in the element 3832. The trend can illustrate the score of a marked category over time. Furthermore, different recommendations, e.g., recommendations 1-5 can be displayed in the trend. A user can check or uncheck different recommendations to display or hide markers for the recommendations in the trend.

Figure 38K:
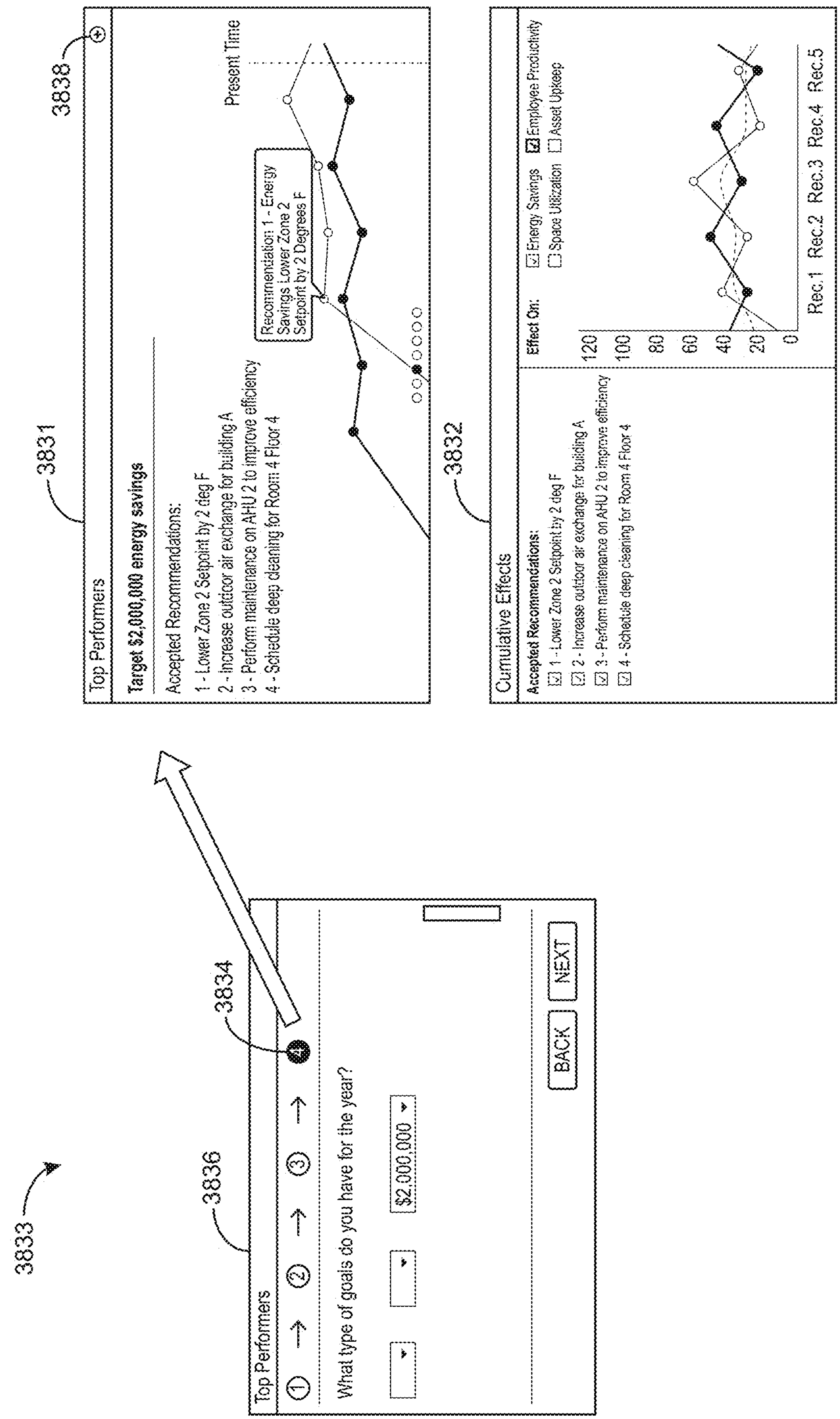

Referring now to FIG. 38K, an example 3833 of user interface elements 3833, 3831, and 3832, where a user adds a new target for a building is shown, according to an exemplary embodiment. The element 3831 indicates a particular target for a building and the status of progress towards the target. The element 3831 further indicates the recommendations that are driving the progress. The element 3831 includes an button 3838. In response to a user interacting with the button 3838, the user interface manager 3706 can cause the user interface 3834 to be displayed on the user device 3701.

The interface 3834 allows a user to define parameters defining a desired target. The interface 3834 includes a button 3836. Interacting with the button 3836 can cause performance pages for the goal defined in the interface 3834 to be generated. For example, a page including an element 3831 and/or an element 3832 pertaining to the parameters configured in the interface 3834 can be generated. This page can allow a user to review and track the performance of the building towards the goal.

Figure 39:
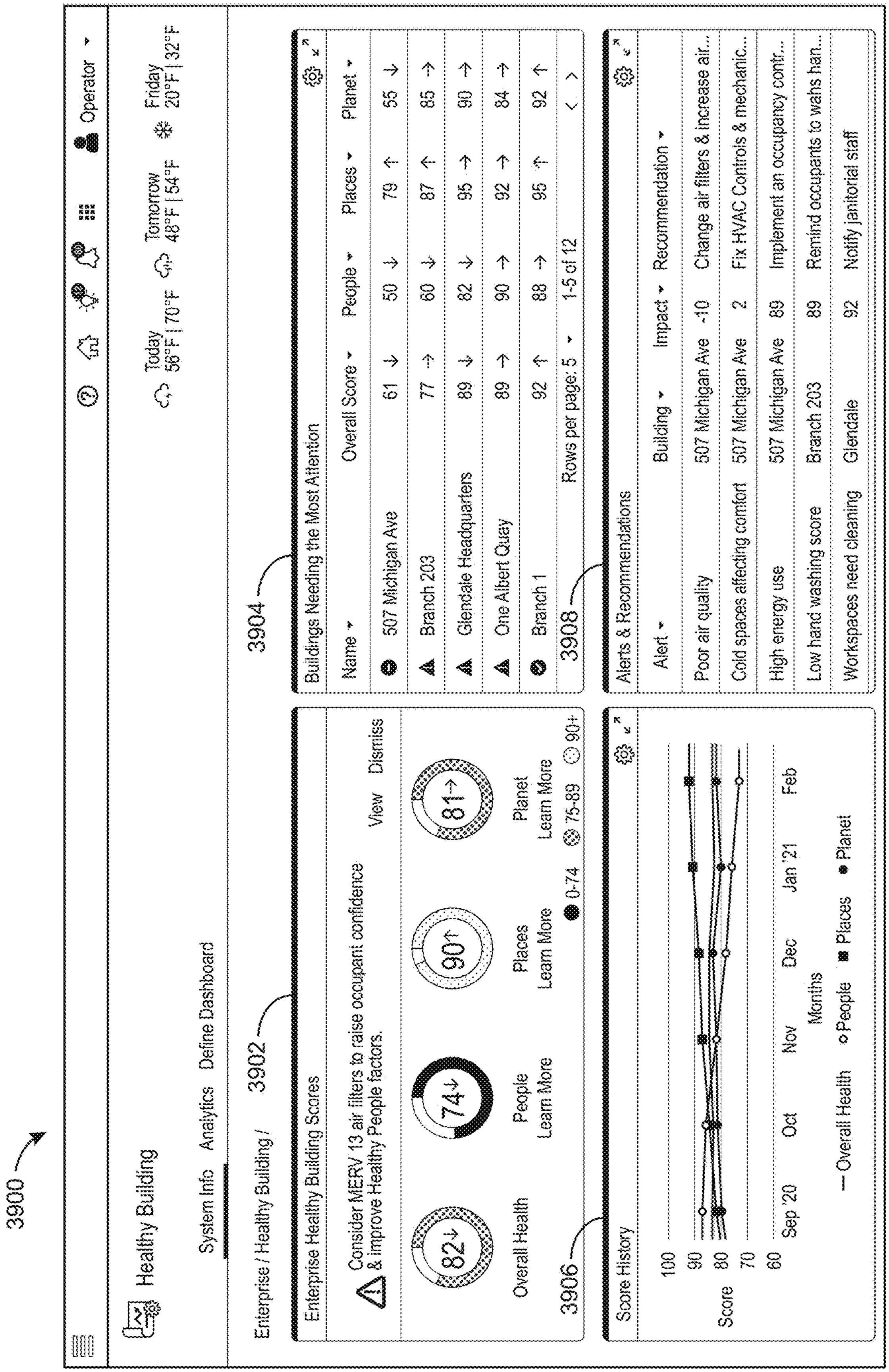
FIG. 39 is a schematic drawing of a building health interface for a group of buildings, according to an exemplary embodiment.

Referring now to FIG. 39, a building health interface 3900 for a group of buildings is shown, according to an exemplary embodiment. The interface 3900 includes an element 3902 for healthy building scores for an enterprise (e.g., a group of buildings). The element 3902 can include an overall health score, a people health score for the people health parameters 306, a places health score for the space health parameters 304, and a planet health score for the planet health parameters 302. Colors, e.g., red, yellow, or green can be used to represent poor, moderate, or good performance of the various cores. In some embodiments, the score ranges for each parameter can be customized by a user.

The interface 3900 includes a score history element 3906. The element 3906 includes trends for the scores of the element 3902. The element 3902 includes a month by month trend for an overall health score, a people health score of the people health parameters 306, a places health score for the space health parameters 304, and a planet health score for the planet health parameters 302.

The element 3904 indicates buildings that need the most attention. The element 3904 includes a list of buildings in a particular filtered order. The order may be lowest overall score to highest overall score or highest overall score to lowest overall score. The list can further indicate overall scores for each building, people scores for each building, places scores for each building, and/or planet health scores for each building. Responsive to interacting with buildings in the element 3904, another interface can be displayed for the building interacted with (e.g., the interface 4000 of FIG. 40).

The interface 3900 includes an element 3908. The element 3908 includes alerts for the buildings. The element 3908 includes alerts such as poor air quality, cold spaces affecting comfort, high energy use, low hand washing score, and/or workspaces that need cleaning. Furthermore, the element 3908 includes an impact for each alert, e.g., an indication of how many score points for the overall score. Furthermore, the element 3908 includes recommendations for addressing each alert.

Figure 40:
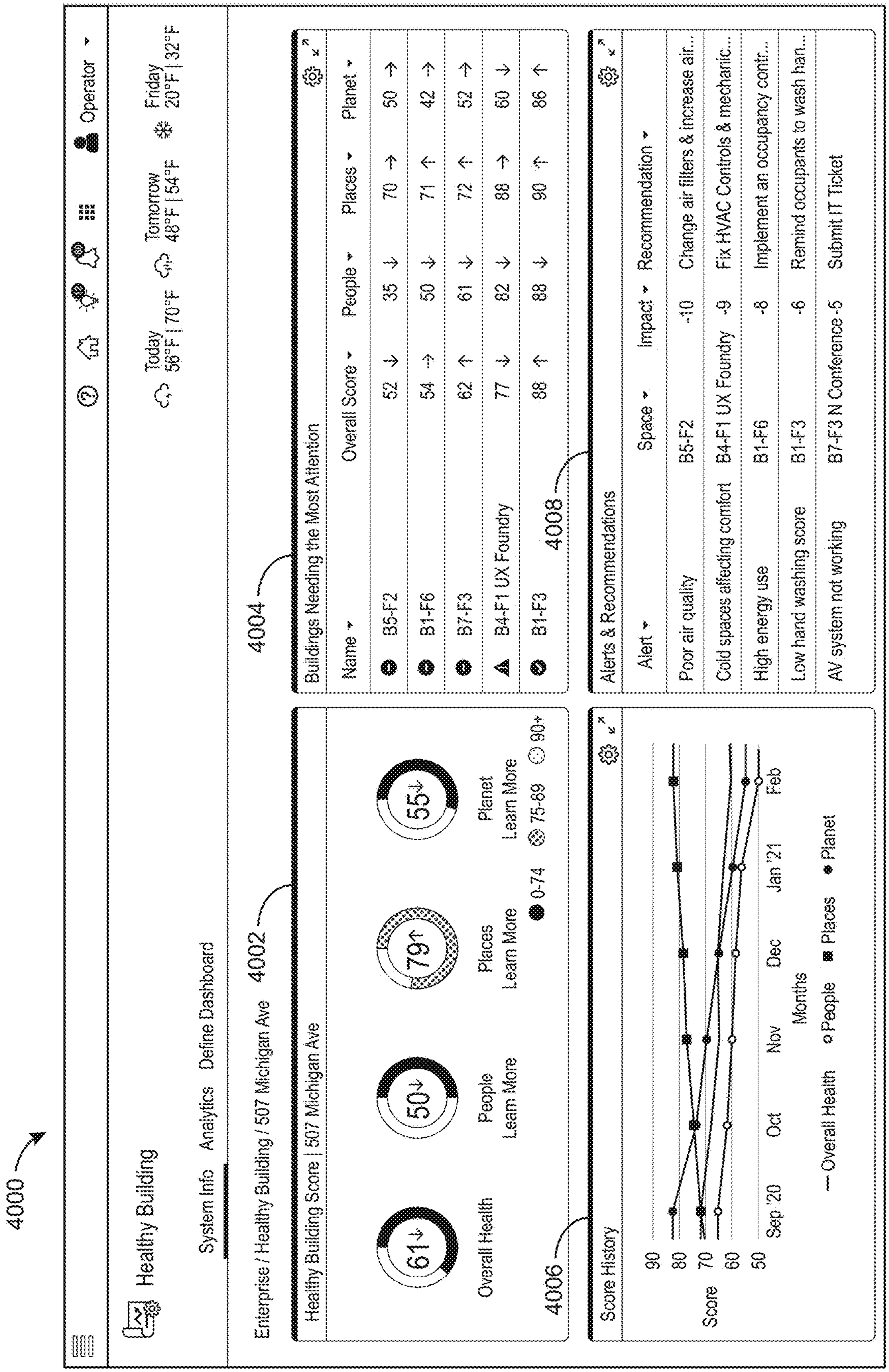
FIG. 40 is a schematic drawing of a building health interface for one building of the group of buildings of FIG. 39, according to an exemplary embodiment.

Referring now to FIG. 40, a building health interface 4000 for one building of the group of buildings discussed with reference to the interface 3900 of FIG. 39, according to an exemplary embodiment. The building health interface 4000 includes the same information described in FIG. 39 but instead of being for a group of buildings, the building health interface 4000 is for one selected building. The element 4002 includes an overall health score, a people health score, a places health score, and a planet health score for the one building. Similarly, the element 4006 includes trends of overall health, people health scores, place health scores, and/or planet health scores for one building.

The element 4004 includes various spaces of the one building ordered from lowest overall space score to highest overall space score. The element 4004 includes the spaces in a list with indications of overall score, people score, places score, and planet score for each space. Furthermore, the interface 4000 includes an element 4008 including alerts for various spaces of the one building, an impact of each alert, and a recommendation for addressing each alert.

Figure 41:
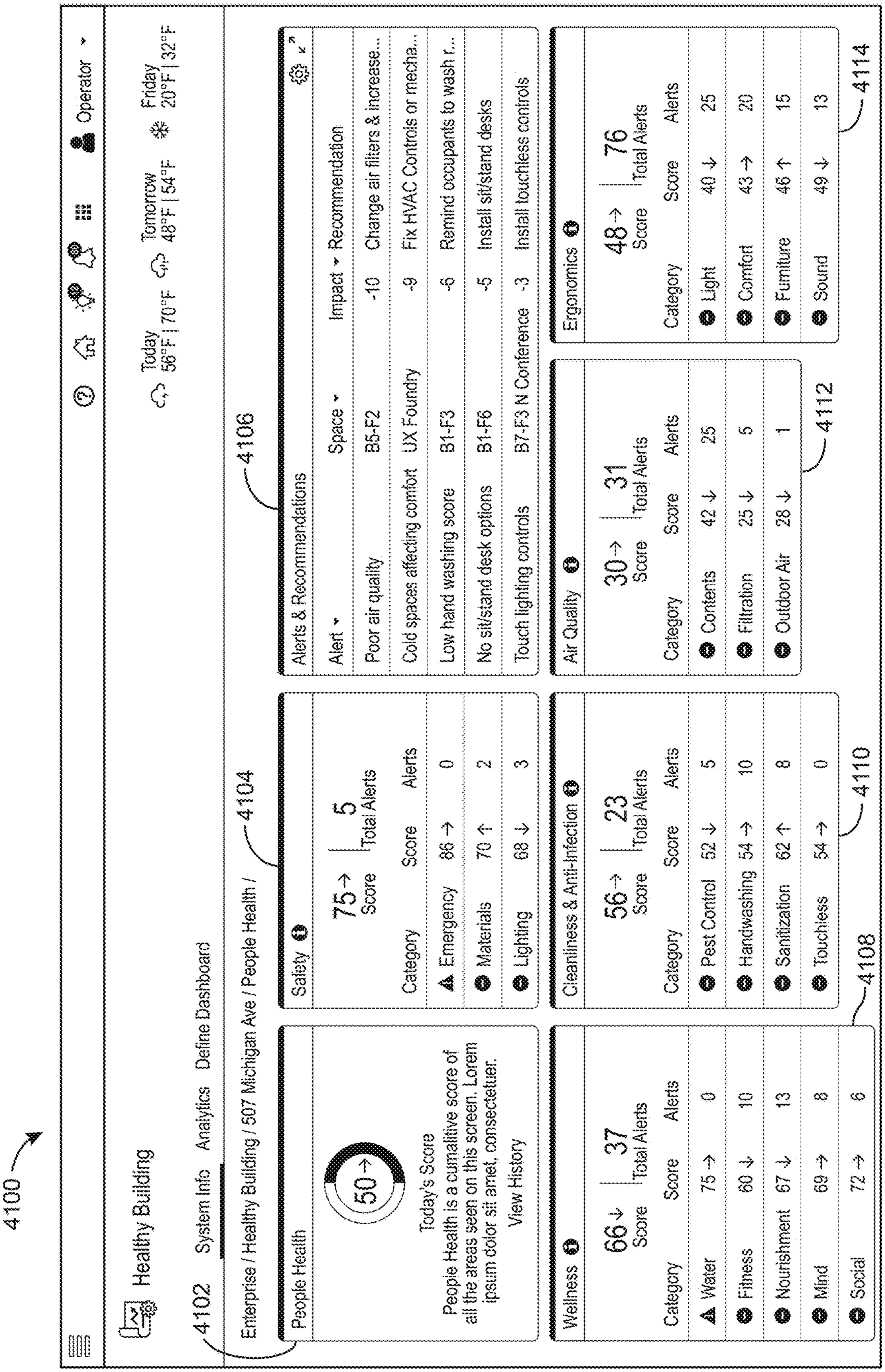
FIG. 41 is a schematic drawing of people health information interface of the one building of the group of buildings of FIG. 40, according to an exemplary embodiment.

Referring now to FIG. 41, is a schematic drawing of a people health information interface 4100 of the one building of the group of buildings of FIG. 40, according to an exemplary embodiment. The building health manager 128 can generate similar interfaces for the planet health parameters 302 and/or the space health parameters 304. The interface 4100 includes an element 4102 indicating a people health score for the building for the people health parameters 306. The element 4104 includes an element 4104 for the security parameter 606 indicating a score for the security parameter 606, total alerts for the parameter 606, and indications of each alert category, score, and number of alerts in each category.

The interface 4100 includes an element 4106 indicating alerts that impact the people health parameters 306. The interface 4100 includes an element 4108 indicating scores and alerts for the wellness parameters 608. The interface 4100 includes an element 4110 indicating scores and alerts for the cleanliness and anti-infection parameters 610. The interface 4100 includes an element 4112 indicating scores and alerts for the air quality parameters 602. The interface 4100 includes an element 4114 indicating scores and alerts for the ergonomics parameters 604.

Figure 42:
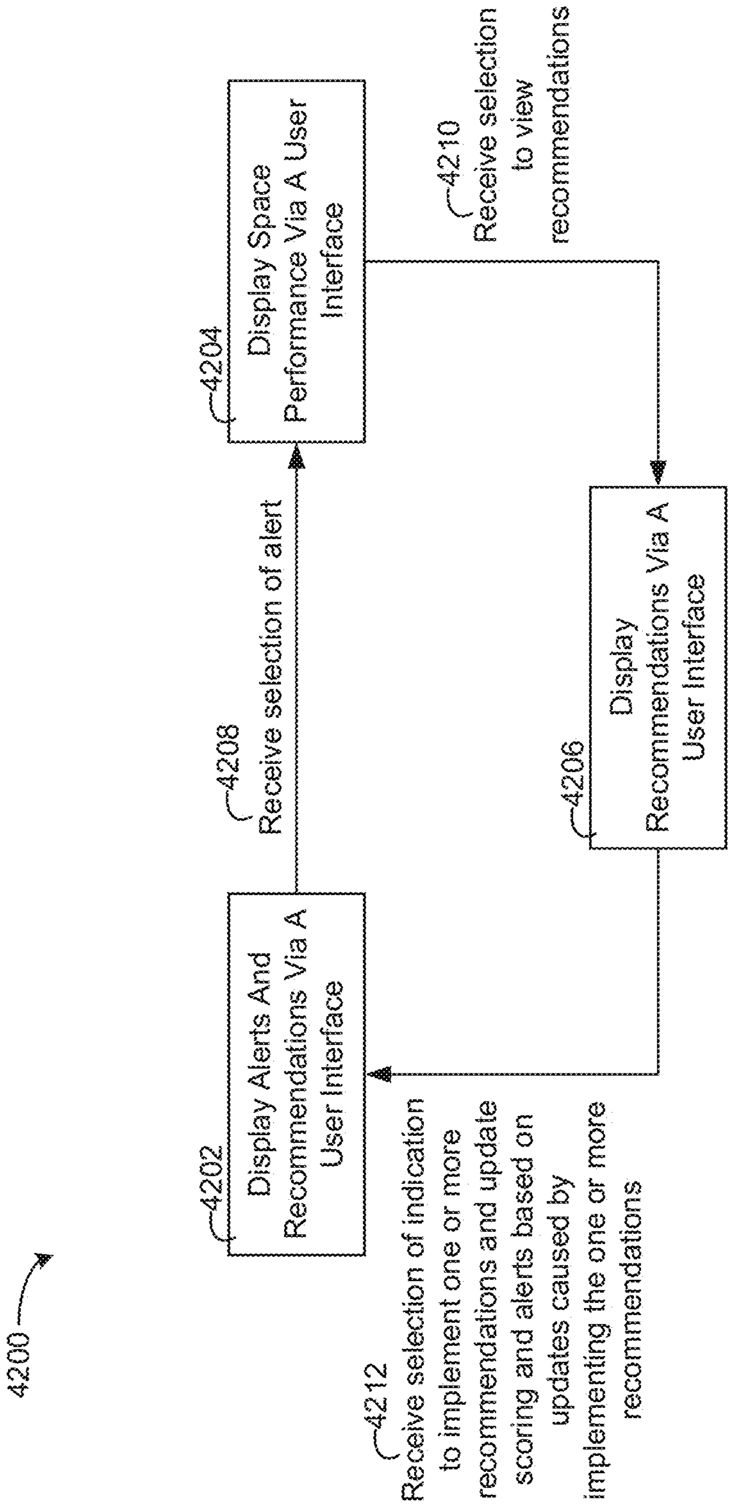
FIG. 42 is a process of closed-loop operation for implementing recommendations based on health scores of the user interfaces of FIGS. 43-46, according to an exemplary embodiment.

Referring now to FIG. 42, a process 4200 of closed-loop operation for implementing recommendations based on health scores of the user interfaces of FIGS. 43-46 is shown, according to an exemplary embodiment. The process 4200 shows the effects a recommendation would have on multiple factors. These factors relate to planet health parameters 302, the people health parameters 306, and/or the space health parameters 304 but also to the monetary costs and/or savings that result from implementing a recommendation. The process 4200 provides a feedback loop for continuous improvement of a space, building, and/or group of buildings, i.e., a user reviews scores and implements recommendations to improve said scores which are again reviewed by the user and further recommendations may be implemented.

Figure 43:
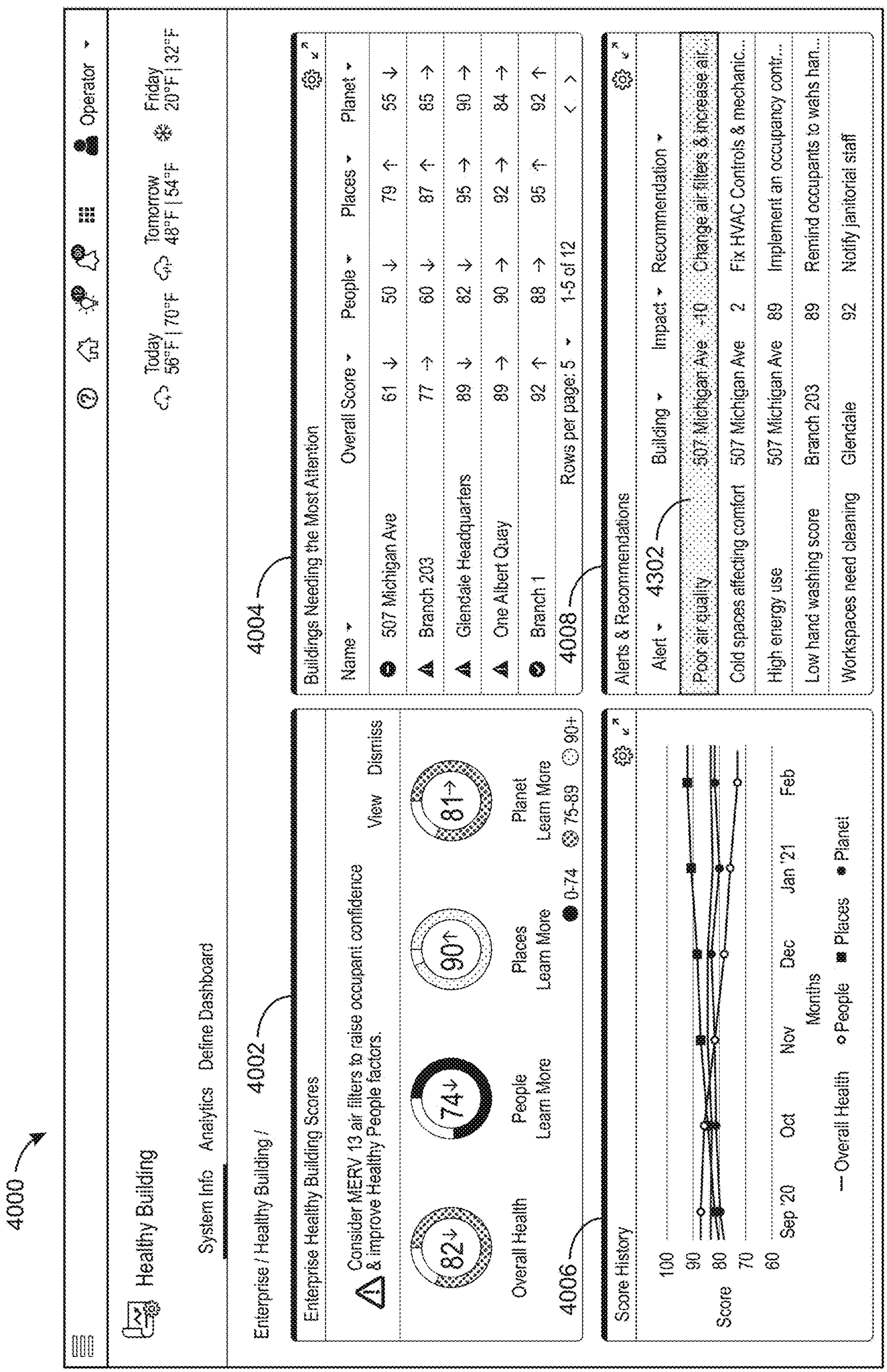
FIG. 43 is a schematic drawing of the building health interface of FIG. 40 where a user selects an air quality alert with an associated recommendation, according to an exemplary embodiment.

The process 4200 includes a step 4202 where the building health manager 128 displays an interface including alerts and recommendations, e.g., the interface 4000 shown in FIG. 43. The recommendations can be selectable by a user, i.e., in step 4208 a user can select one alert of the alerts. For example, in the interface 4000 in FIG. 43, a poor air quality alert is selected.

Figure 44:
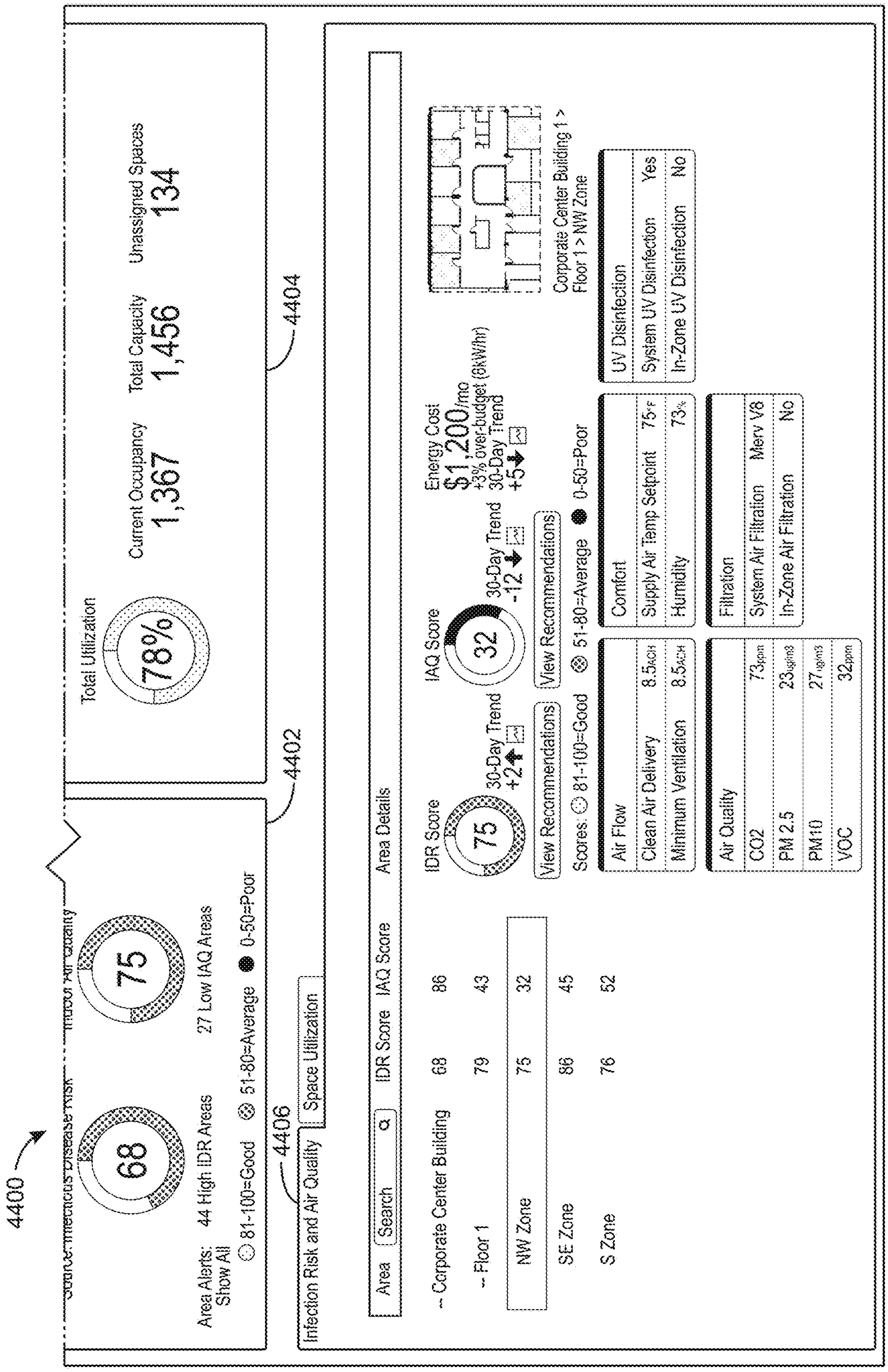
FIG. 44 is a schematic drawing of an interface showing air quality information displayed responsive to selecting the air quality alert of FIG. 43, according to an exemplary embodiment.

In step 4204, the building health manager 128 can display a space performance interface, e.g., the interface 4400 shown in FIG. 44. The interface 4400 can provide information on infection risk and air quality for the space that the selected alert is occurring in. In step 4210, the building health manager 128 receives a selection to view recommendations of the space. In step 4206, the building health manager 128 displays recommendations for the space via a user interface, e.g., the interface 4600 of FIGS. 46A-B.

A user can provide input to the user interface 4600 selecting one recommendation of the recommendations of the interface 4600 (step 4212). The selection can cause the building health manager 128 to implement operating commands for the recommendation and operate the building systems 142 based on the operating commands. The resulting operation updates cause changes to the operation of the building which in turn can reflect changes to the overall building score, the score of the planet health parameters 302, the scores of the people health parameters 306, and/or the scores of the space health parameters 304. This can result additional changes made by the user to implement other recommendations or control updates, this can form a closed-loop operation of the building with the health scores.

Referring now to FIG. 43, a schematic drawing of the building health interface 4000 of FIG. 40 where a user selects an air quality alert with an associated recommendation is shown, according to an exemplary embodiment. In FIG. 43, a user selects one alert of the alerts of the element 4008 with selection 4302. In selection 4302, a poor air quality alert is selected.

Referring now to FIG. 44, an interface 4400 showing air quality information displayed responsive to selecting the air quality alert of FIG. 43 is shown, according to an exemplary embodiment. The interface 4400 includes an element 4402 providing scores for infectious disease risk and indoor air quality for a particular building. The interface 4400 further includes an element 4404 providing a space utilization of the particular building. The element 4404 indicates a total percentage utilization of the building, a current occupancy of the building, a total occupant capacity of the building, and an indication of a number of unassigned spaces.

The element 4406 indicates infection risk and air quality for a particular space of a particular floor of the building. The element 4406 includes an infectious disease risk score and an indoor air quality risk score for the space. Current operating parameters for the space are further shown in the element 4406, airflow parameters (e.g., clean air deliver, minimum ventilation), comfort parameters (e.g., supply air temperature setpoint, humidity), ultraviolet (UV) disinfection parameters (e.g., a binary indication o perform system UV disinfection and/or in-zone UV disinfection), an air quality parameter (e.g., CO2, PM2.5, PM10, VOC, etc.), and/or filtration parameters (e.g., system air filtration, in-zone air filtration, etc.).

The element 4406 further shows an energy cost for the space and a floor plan indicating where the space is located on a particular floor. The element 4406 includes a view recommendations element to view recommendations for improving the infectious disease risk score and/or the indoor air quality score.

Figure 45A:
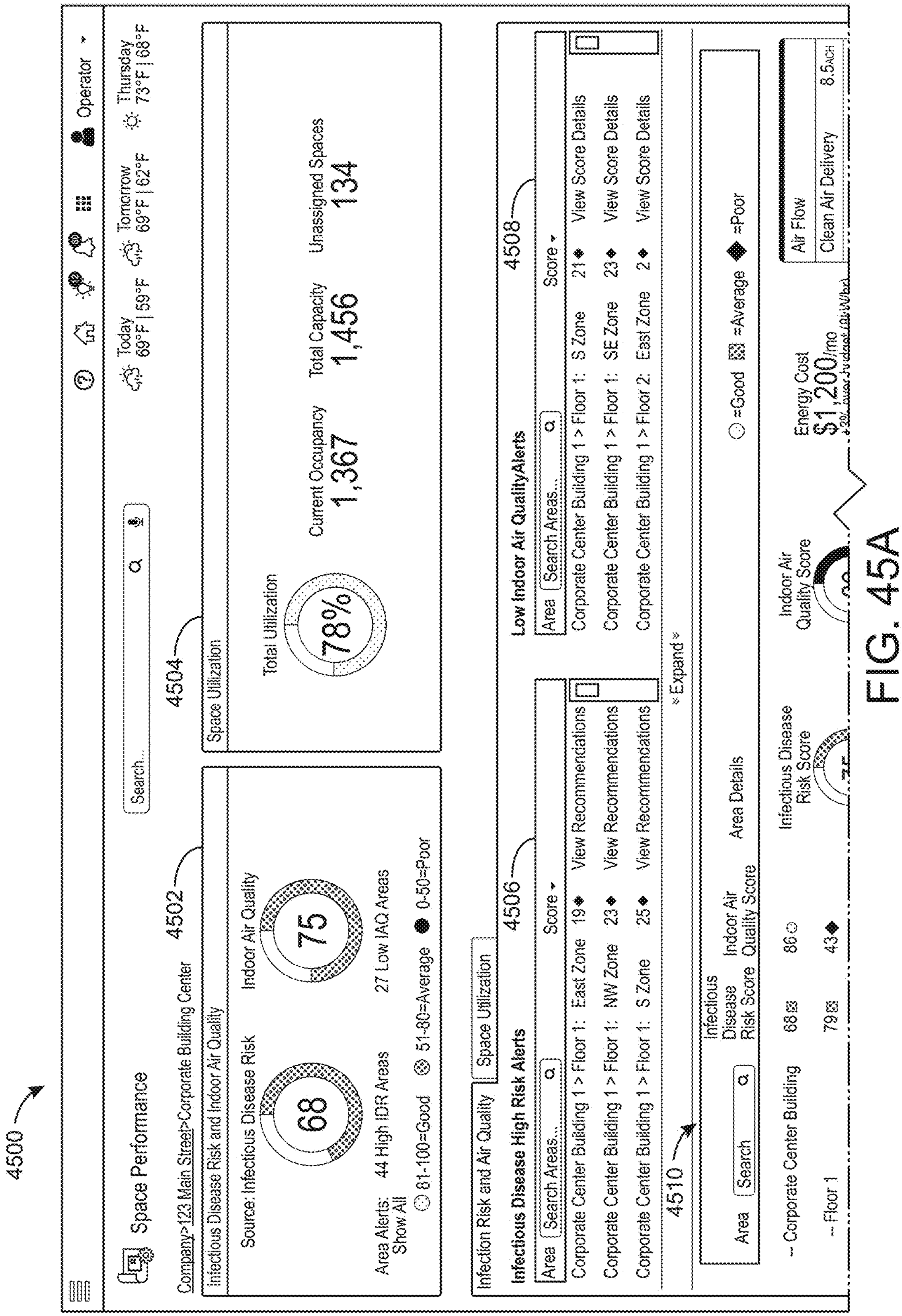
FIGS. 45A-B is a schematic drawing of an interface showing infectious disease related risk information and recommendations, according to an exemplary embodiment.
Figure 45B:
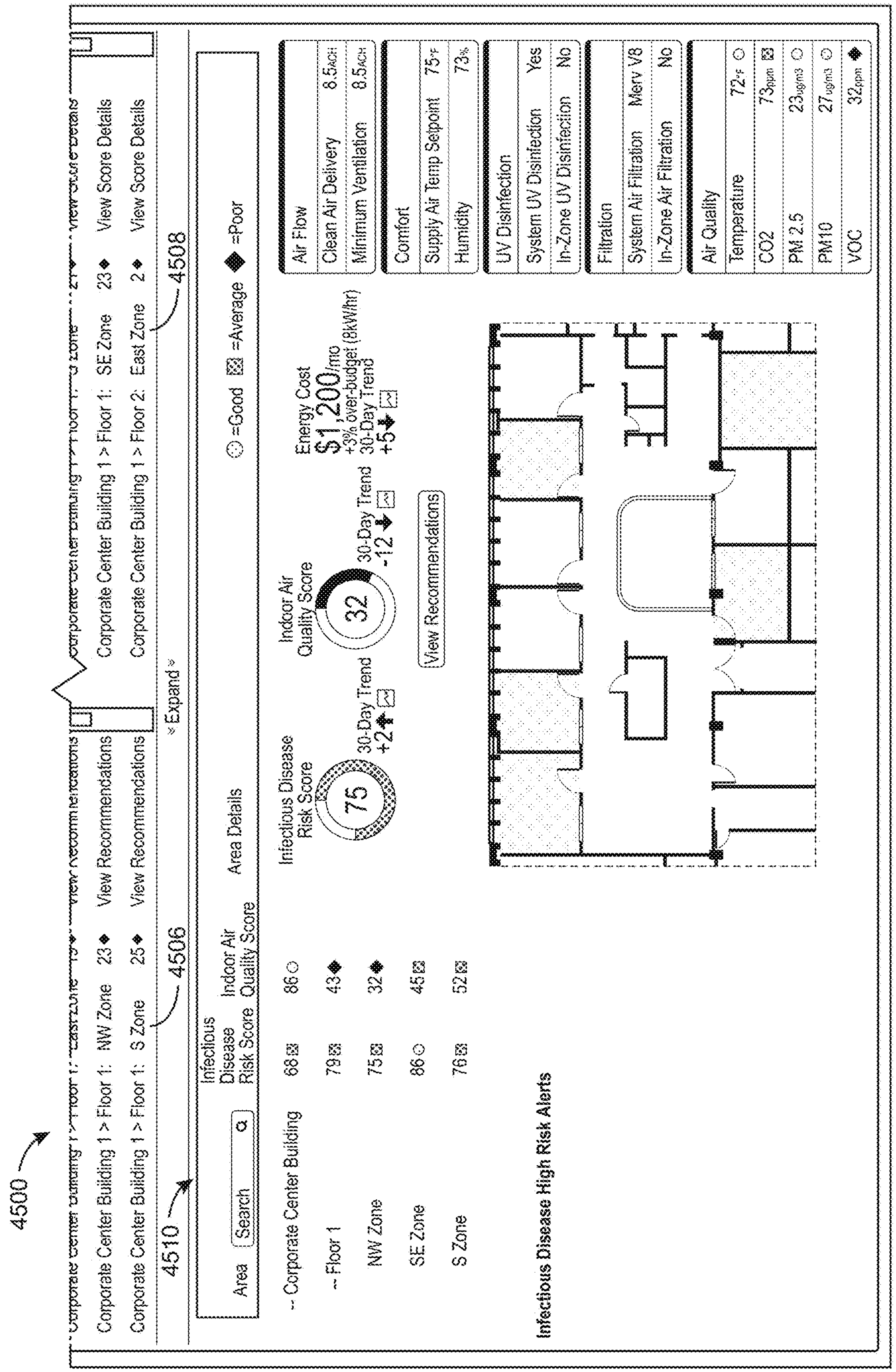

Referring now to FIGS. 45A-B, an interface 4500 showing infectious disease related risk information and recommendations is shown, according to an exemplary embodiment. The interface 4500 can be another version of the interface 4400. The interface 4500 includes an element 4502 indicating an infectious disease risk score and an indoor air quality score for a building. Furthermore, the element 4504 of the interface 4500 indicates a total occupant utilization of the space. The interface 4500 further includes an element 4506 providing alerts for various areas of the building pertaining to an infectious disease risk. The interface 4500 further includes an element 4508 providing alerts for various areas of the building pertaining to low indoor air quality.

The element 4510 of the interface 4500 includes indications of information for one of multiple selected areas of the building. The element 4510 includes a floor map indicating a floor and an indication of the selected space on the floor map. The element 4510 further includes an infectious disease risk score for the selected space, an indoor air quality score for the selected space, and an energy cost for the selected space. Furthermore, the element 4510 further includes indications of operating parameters for the selected space. The operating parameters can be airflow parameters (e.g., clean air delivery level, minimum ventilation level), comfort parameters (e.g., supply air temperature setpoint, humidity), UV disinfection parameters (e.g., system UV disinfection, in-zone UV disinfection), filtration parameters (e.g., system air filtration, in-zone air filtration), and/or air quality parameters (e.g., temperature, CO2, PM2.5, PM10, VOC).

Figure 46A:
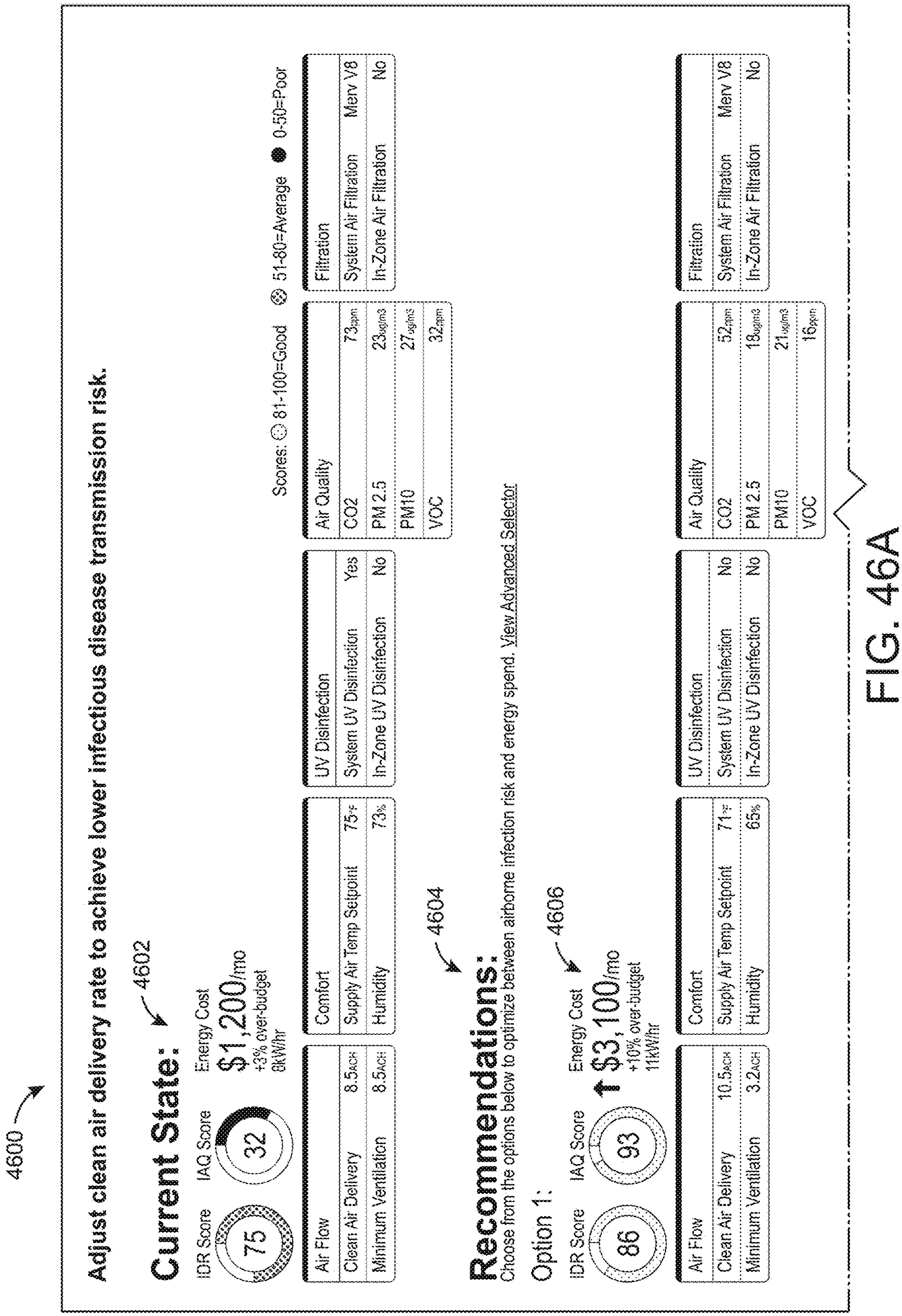
FIGS. 46A-B is a schematic drawing of an interface including recommendations addressing infectious disease transmission risk, according to an exemplary embodiment.
Figure 46B:
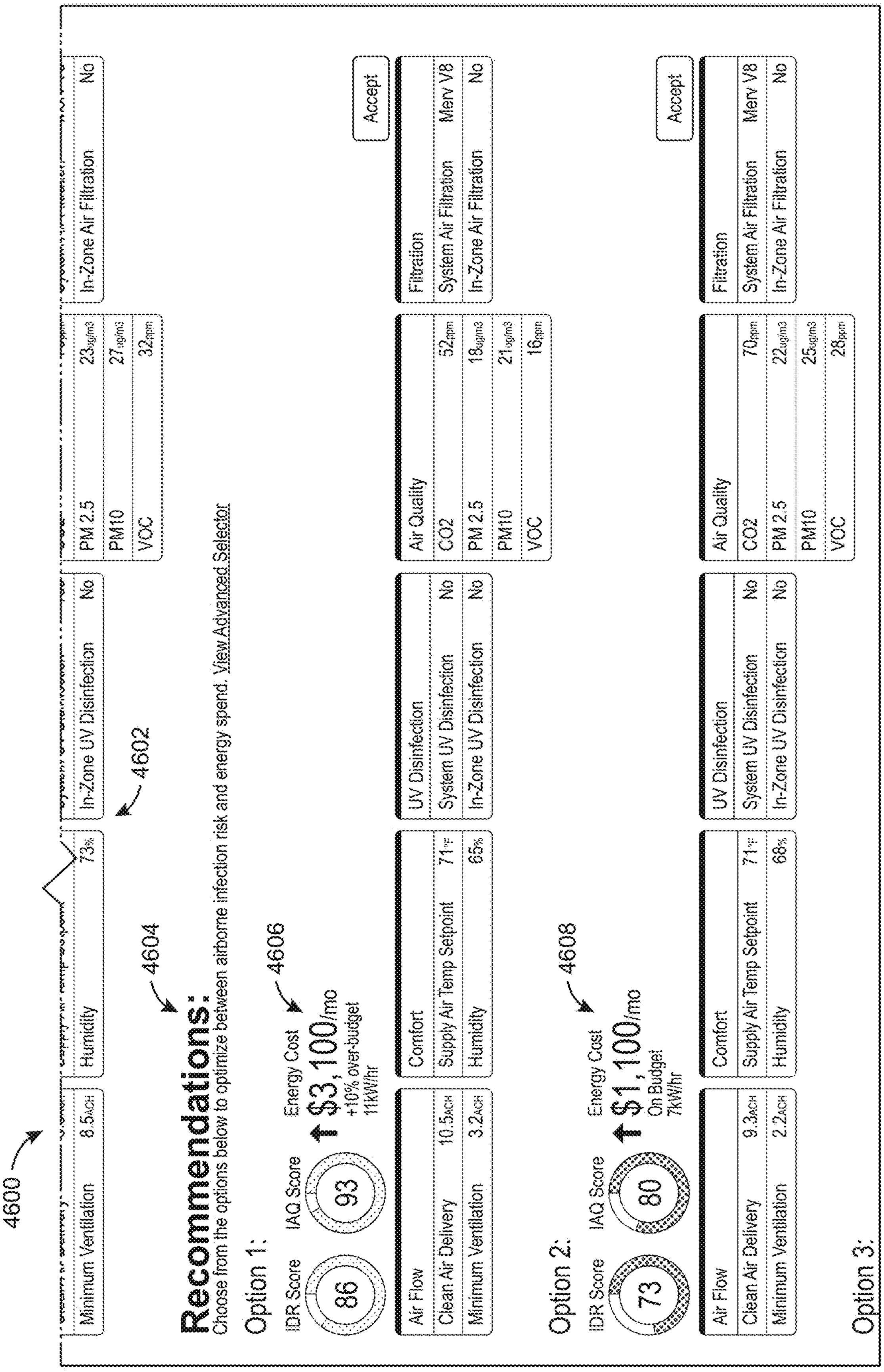

Referring now to FIGS. 46A-B, an interface 4600 including recommendations addressing infectious disease transmission risk is shown, according to an exemplary embodiment. The interface 4600 incudes a current state element 4602. The element 4602 indicates current conditions of a building and/or space. The element 4602 indicates a current infectious disease risk score and a current indoor air quality score. Furthermore, the element 4602 indicates a current monthly energy cost for the building or space. The current values for the operating parameters for air flow, comfort, UV disinfection, air quality, and/or filtration are shown in the element 4602.

The interface 4600 indicates recommendations 4602 generated by the building health manager 128. The recommendations 4604 includes a recommendation 4606. The recommendation 4606 indicates one option for improving the infectious disease score and/or the indoor air quality score. The recommendation 4606 indicates a prediction of an infectious disease risk score and an indoor air quality score that will result from improved values for the air flow parameters, comfort parameters, UV disinfection parameters, air quality parameters, and/or filtration parameters. The recommendation 4606 includes an accept element that a user can interact with to accept the recommendation 4606 and implement operation of building systems based on the values of the parameters shown in the recommendation 4606. A predicted energy cost is further shown in the recommendation 4606. The predicted energy cast can be a predicted cost of operating at the new parameter values.

The interface 4600 includes a recommendation 4608. The recommendation 4608 recommends new parameter values for the air flow, comfort, UV disinfection, air quality, and filtration parameters that results in increased infectious disease risk score and the indoor air quality score. The increase in scores for the recommendation 4608 is less than the increase resulting from the recommendation 4606. However, the predicted energy cost of the recommendation 4608 is on budget and is less than the over budget energy cost resulting from the recommendation 4606. The recommendation 4608 includes an element to accept the recommendation 4608 and implement the parameter values of the recommendation 4608.

In some embodiments, the recommendations 4606 and 4608 are generated based on the recommendation engine 3707 as shown in FIG. 37. The recommendations 4606 and 4608 can be generated by an artificial intelligence and can be generated based on historical user input in order to generate recommendations that meet the goals of a user and/or organization.

Figure 47:
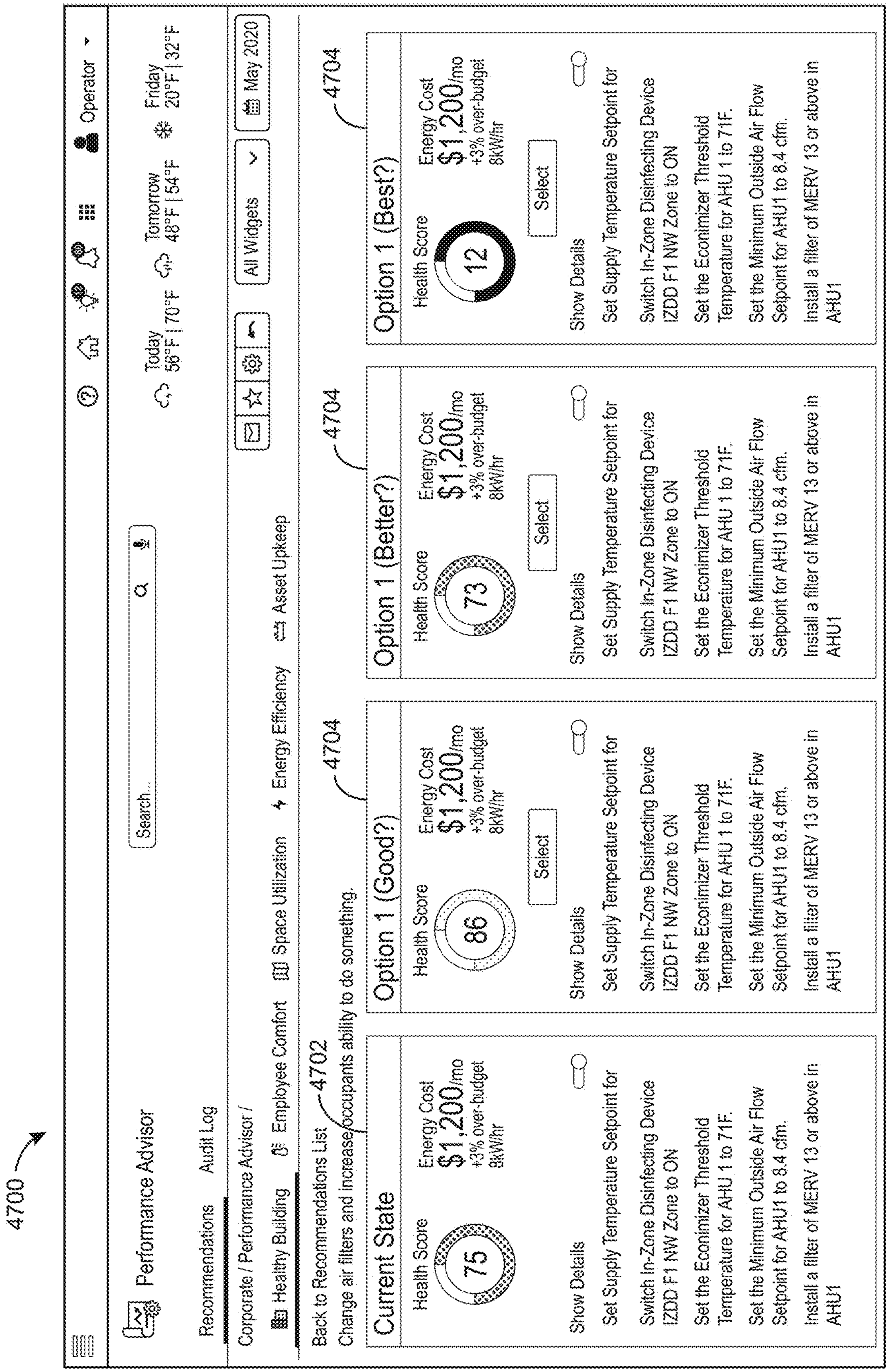
FIG. 47 is a schematic drawing of an interface including recommendations for improving user health scores, according to an exemplary embodiment.

Referring now to FIG. 47, an interface 4700 including recommendations for improving user health scores for a building space is shown, according to an exemplary embodiment. The interface 4700 includes a current state 4702 indicating a current health score, operating settings, and energy cost of the operating settings. The interface 4700 further includes recommendations 4704-4708 which can each include different recommended operating settings, each set of operating settings resulting in a different health score and/or energy cost. Each of the recommendations 4704-4708 include a select element to select and implement said recommendation. The recommendations 4704-4708 can be generated by the recommendation engine 3707 of FIG. 37.

Figure 48:
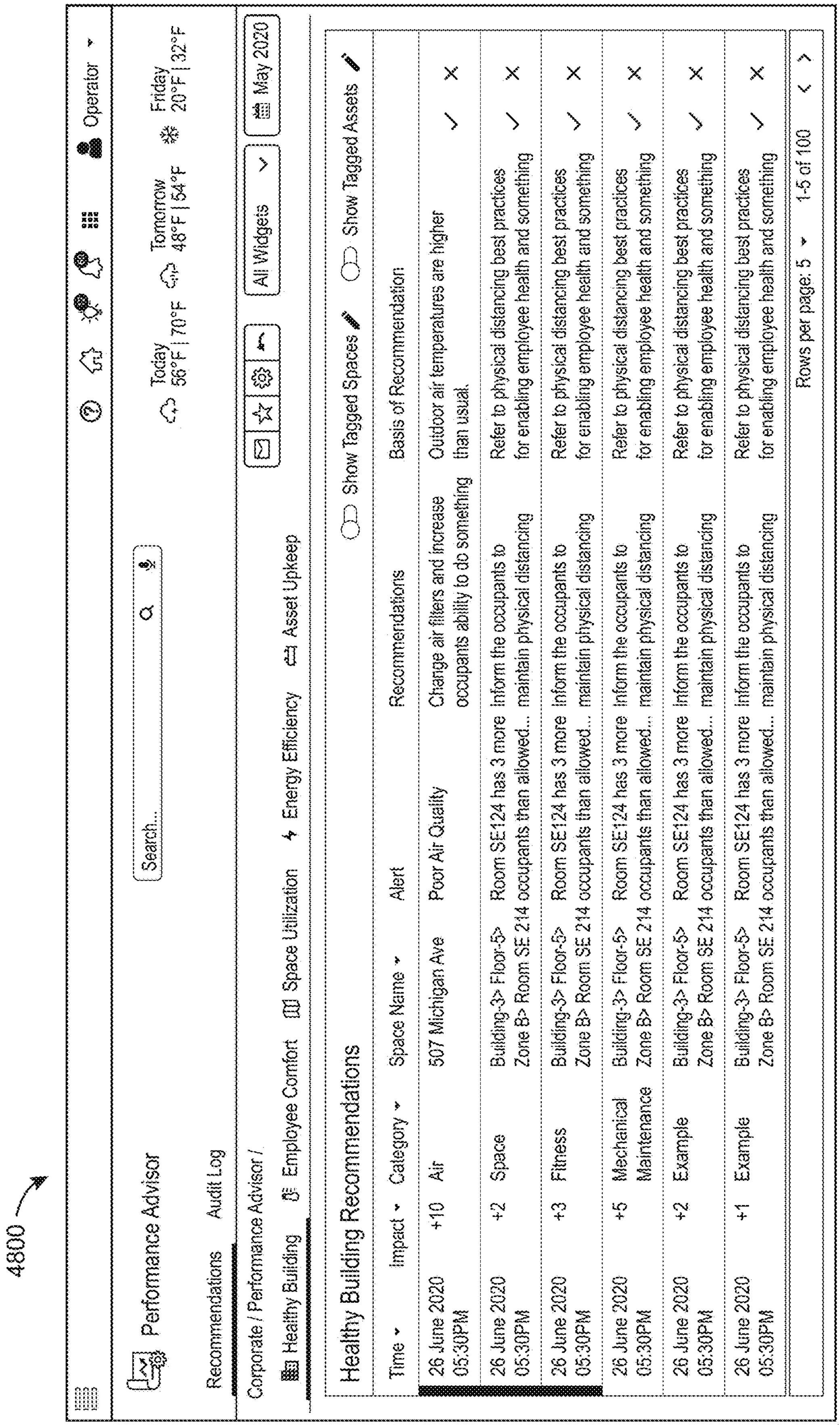
FIG. 48 is a schematic drawing of an interface including a list of building health recommendations, according to an exemplary embodiment.

Referring now to FIG. 48, a schematic drawing of an interface 4800 including a list of health building recommendations is shown, according to an exemplary embodiment. The interface 4800 can include a list of recommendations generated by the recommendation engine 3707. The recommendation engine 3707 can generate each recommendation to address an alert that has occurred. The alert can be an indication of an event that decreases a health score of the building. For example, alerts can be that an outdoor air temperature is higher than a set amount, physical distancing practices are not being followed, etc.

The list of the interface 4800 indicates a time that each recommendation was generated, a numerical increase to an overall health score that will result from the recommendation, a category of the recommendation (e.g., air, space, fitness, mechanical maintenance, etc.), a space that the recommendation impacts, etc. The list of the interface 4800 includes a check mark to accept each of the alerts and an "x" mark to reject each of the alerts.

Figure 49:
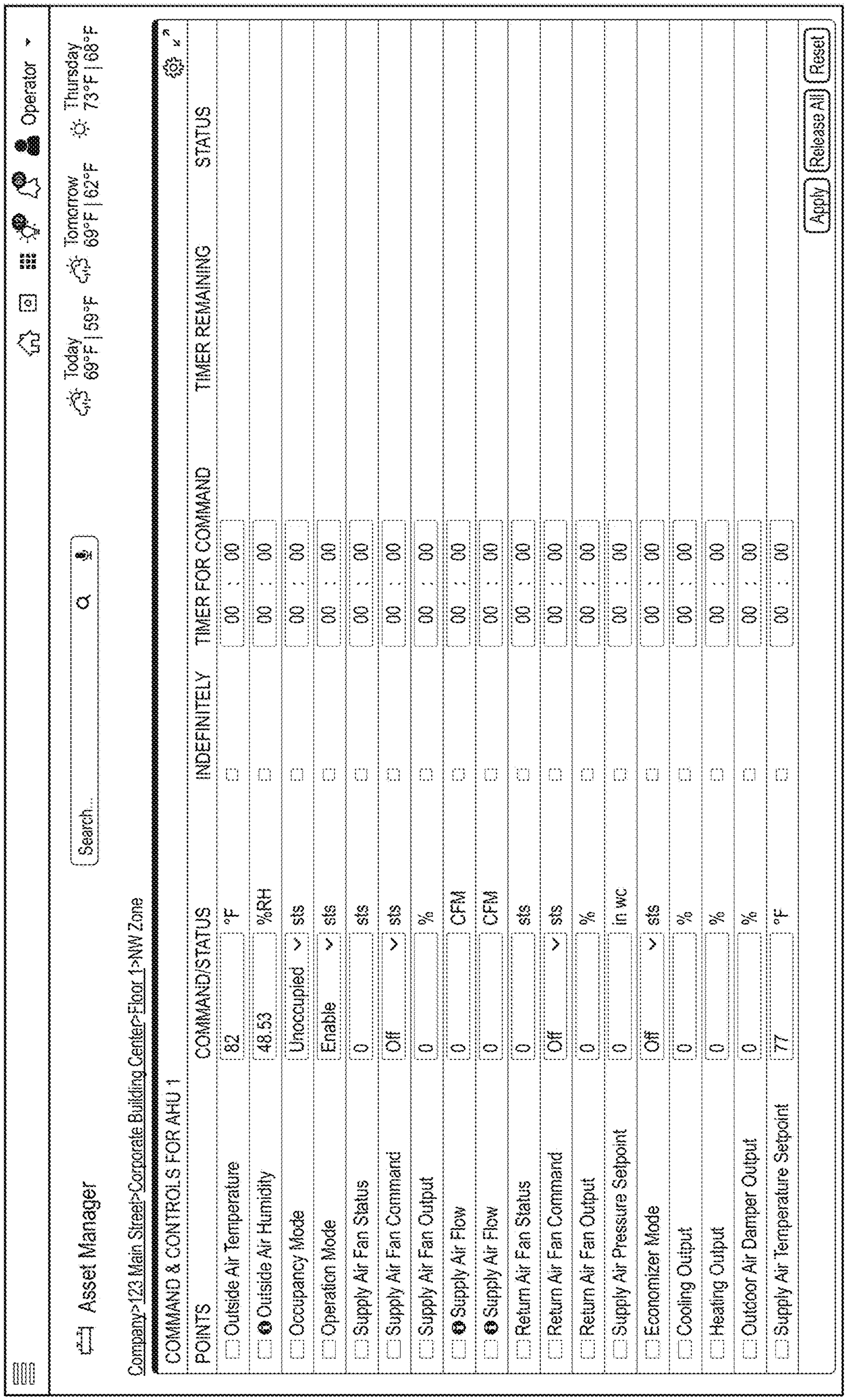
FIG. 49 is a command and control interface where a user can input operating settings for building equipment, according to an exemplary embodiment.

Referring now to FIG. 49, a command and control interface 4900 where a user can input operating settings for building equipment is shown, according to an exemplary embodiment. The interface 4900 includes command and control for a particular AHU, AHU 1 of a specific zone, floor, building, and campus of an entity. The interface 4900 can provide an input for a user to review and set command and status settings. Furthermore, the interface 4900 allows a user to make a command or set a status indefinitely and/or for a user specified time. The control manger 214 can receive the settings and commands via the interface 4900 and operate the building systems 142 based on the settings and commands.

Figure 50:
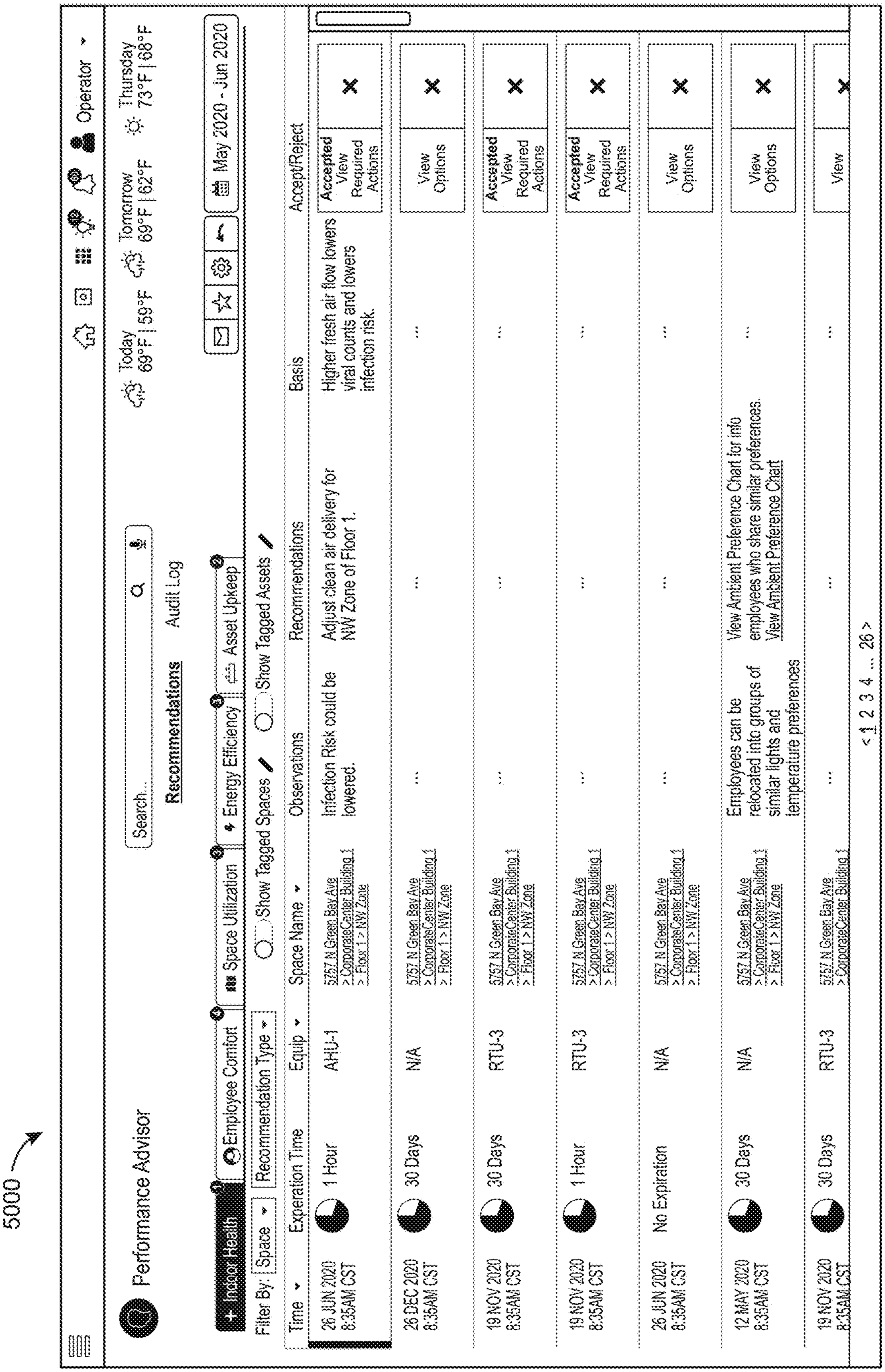
FIG. 50 is a user interface including recommendations relating to indoor health, according to an exemplary embodiment.

Referring now to FIG. 50, a user interface 5000 including recommendations relating to indoor health is shown, according to an exemplary embodiment. The interface 5000 can provide recommendations generated by the recommendation generator 1116. The recommendations of the interface 5000 can be specific to indoor health, e.g., space health scores of the space health parameters 304. The user interface 5000 can present the recommendations in an ordered list with time, expiration time, equipment, space name, observations, recommendations, and a basis for each entry. The user can accept and/or reject each recommendation of the user interface 5000. Responsive to accepting one of the recommendations, the control manager 214 can update operation of the building systems 142 appropriately.

Figure 51:
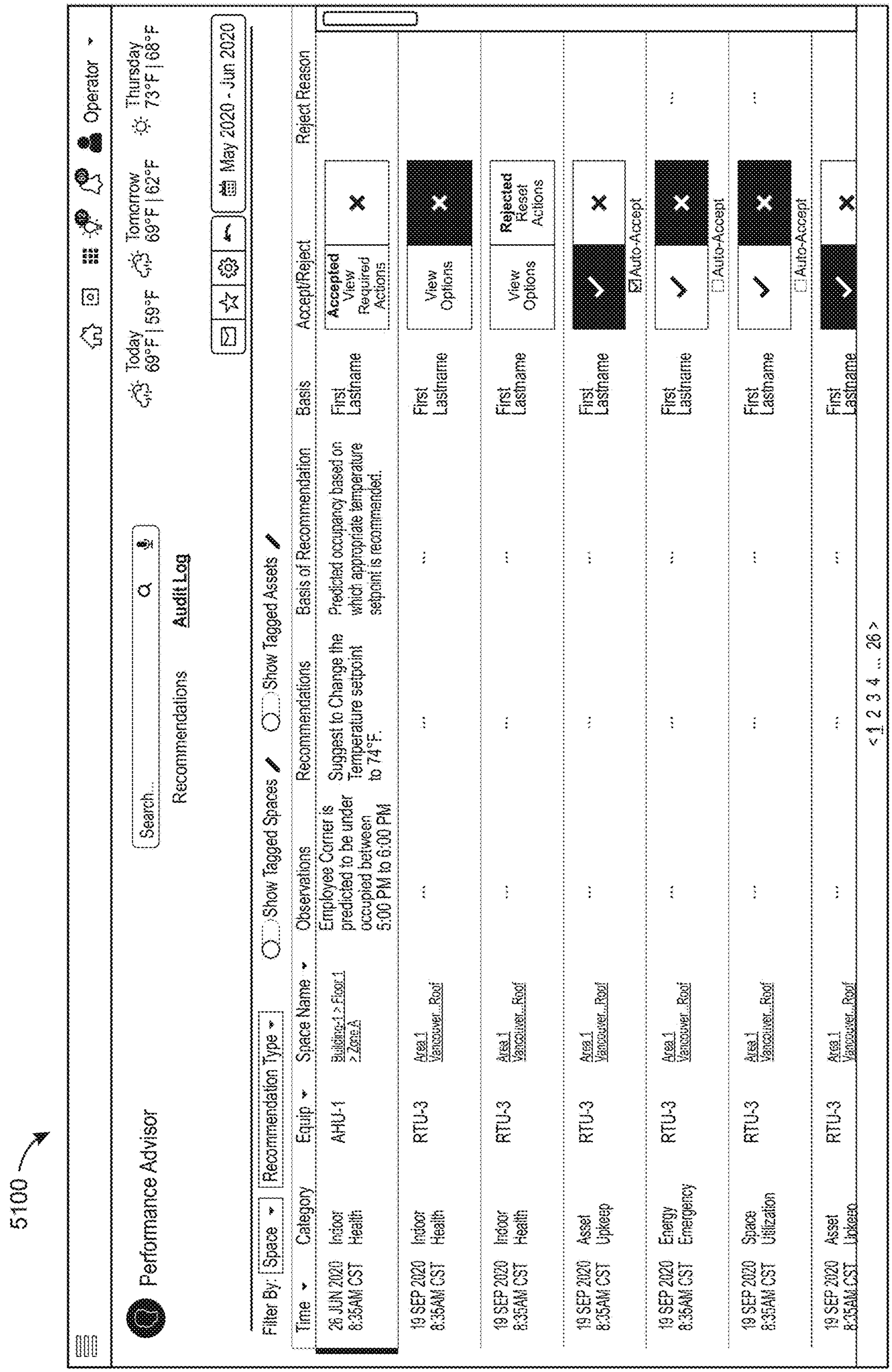
FIG. 51 is a user interface of an audit log of recommendations of the user interface of FIG. 50, according to an exemplary embodiment.

Referring now to FIG. 51, a user interface 5100 of an audit log of recommendations of the user interface of FIG. 50 is shown, according to an exemplary embodiment. The user interface 5100 can provide a log of accepted and rejected recommendations to enable to review a history of their decisions. For each recommendation, the user interface 5100 can indicate rejected recommendations, accepted recommendations, and whether a user enabled auto-accept features.

Figure 52:
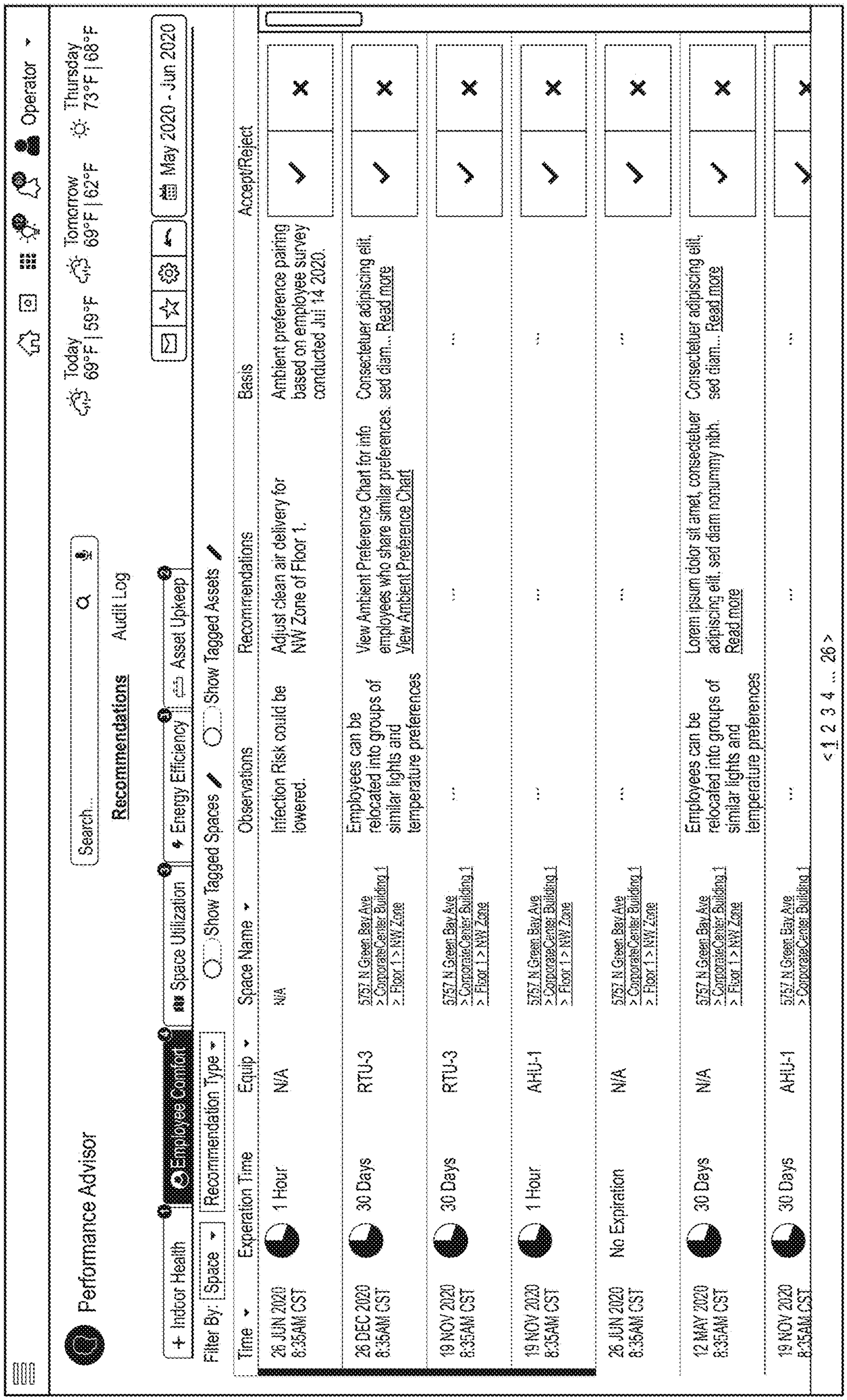
FIG. 52 is a user interface including recommendations relating to occupant comfort, according to an exemplary embodiment.

Referring now to FIG. 52, a user interface 5200 including recommendations relating to occupant comfort is shown, according to an exemplary embodiment. The interface 5200 can provide recommendations generated by the recommendation generator 1116. The recommendations of the interface 5200 can be specific to employee comfort, e.g., the occupant health and wellness parameters 404, the ergonomics parameters 604, and/or the thermal comfort parameter 616. The user interface 50002 can present the recommendations in an ordered list with time, expiration time, equipment, space name, observations, recommendations, and a basis for each entry. The user can accept and/or reject each recommendation of the user interface 5200. Responsive to accepting one of the recommendations, the control manager 214 can update operation of the building systems 142 appropriately.

Figure 53:
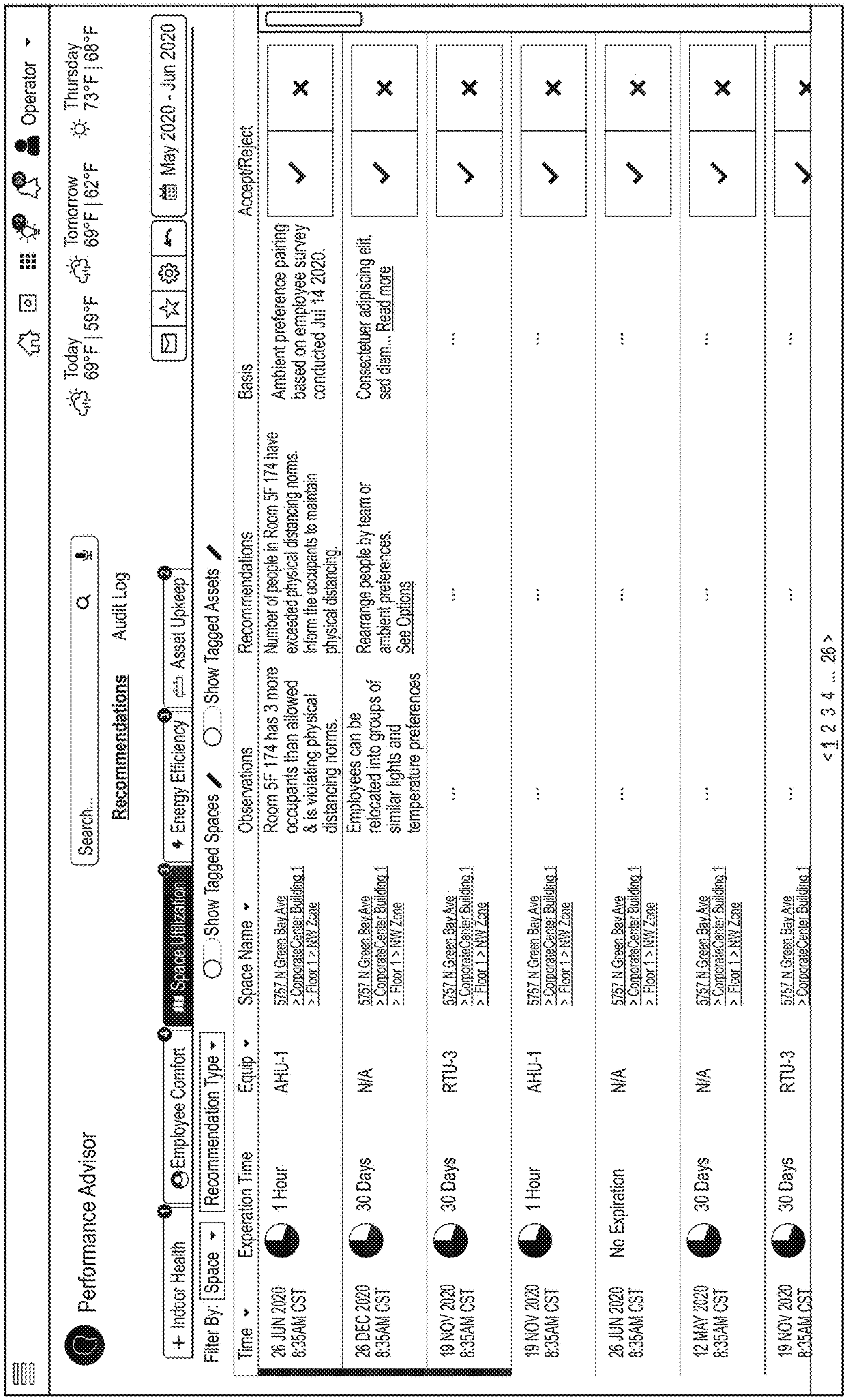
FIG. 53 is a user interface including recommendations relating to space utilization, according to an exemplary embodiment.

Referring now to FIG. 53, a user interface 5300 including recommendations relating to space utilization is shown, according to an exemplary embodiment. The interface 5300 can provide recommendations generated by the recommendation generator 1116. The recommendations of the interface 5300 can be specific to space utilization, e.g., the resource health and sustainability parameters 402, the reduce carbon footprint parameters 1004, and/or the space utilization parameter 1022, the ergonomics parameters 604, and/or the thermal comfort parameter 616. The user interface 5300 can present the recommendations in an ordered list with time, expiration time, equipment, space name, observations, recommendations, and a basis for each entry. The user can accept and/or reject each recommendation of the user interface 5300. Responsive to accepting one of the recommendations, the control manager 214 can update operation of the building systems 142 appropriately.

Figure 54:
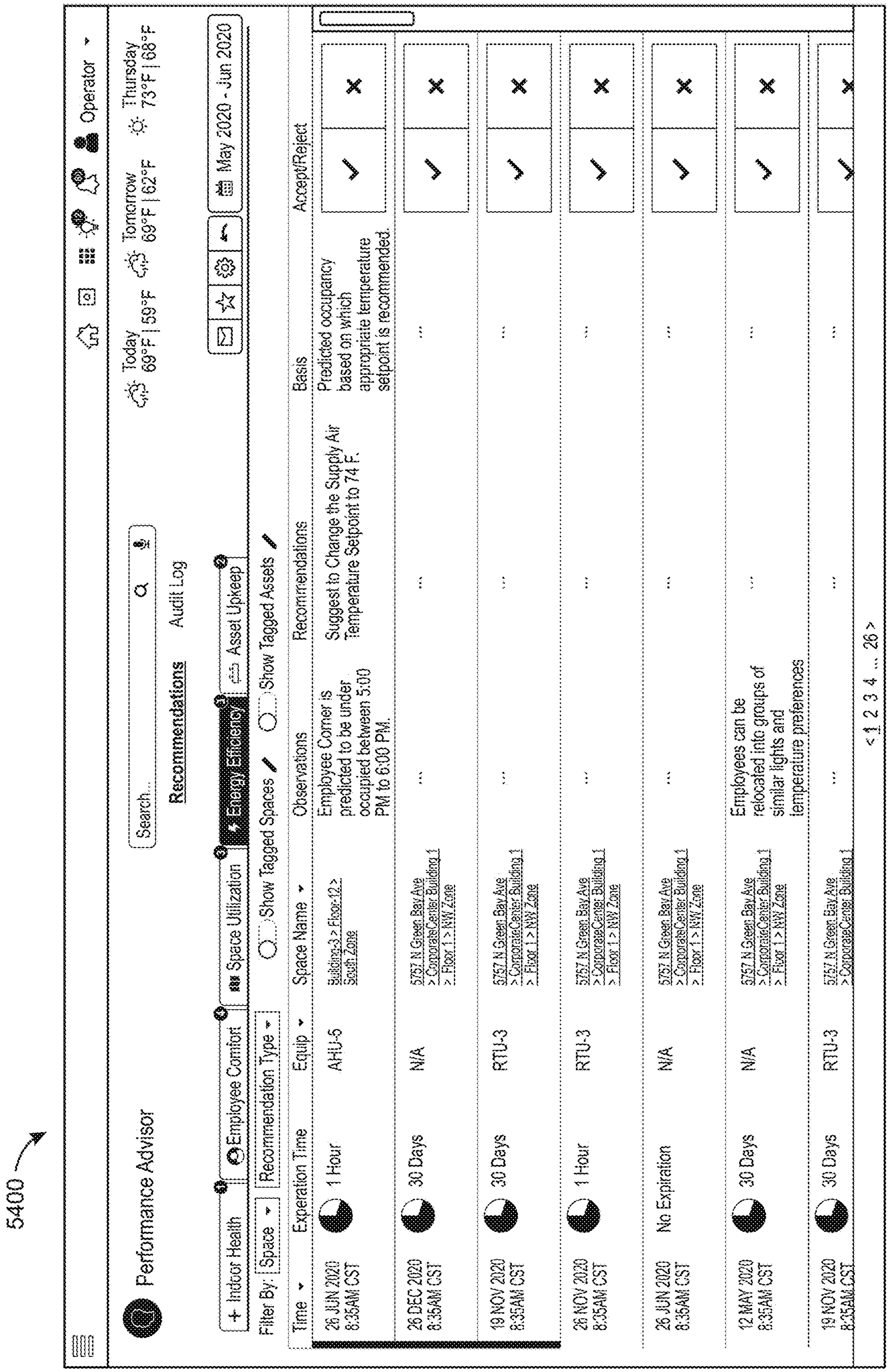
FIG. 54 is a user interface including recommendations relating to energy efficiency, according to an exemplary embodiment.

Referring now to FIG. 54, a user interface 5400 including recommendations relating to energy efficiency is shown, according to an exemplary embodiment. The interface 5400 can provide recommendations generated by the recommendation generator 1116. The recommendations of the interface 5400 can be specific to space utilization, e.g., the resource health and sustainability parameters 402, the reduce carbon footprint parameters 1004, and/or the space utilization parameter 1022, the ergonomics parameters 604, and/or the thermal comfort parameter 616. The user interface 5400 can present the recommendations in an ordered list with time, expiration time, equipment, space name, observations, recommendations, and a basis for each entry. The user can accept and/or reject each recommendation of the user interface 5400. Responsive to accepting one of the recommendations, the control manager 214 can update operation of the building systems 142 appropriately.

Figure 55:
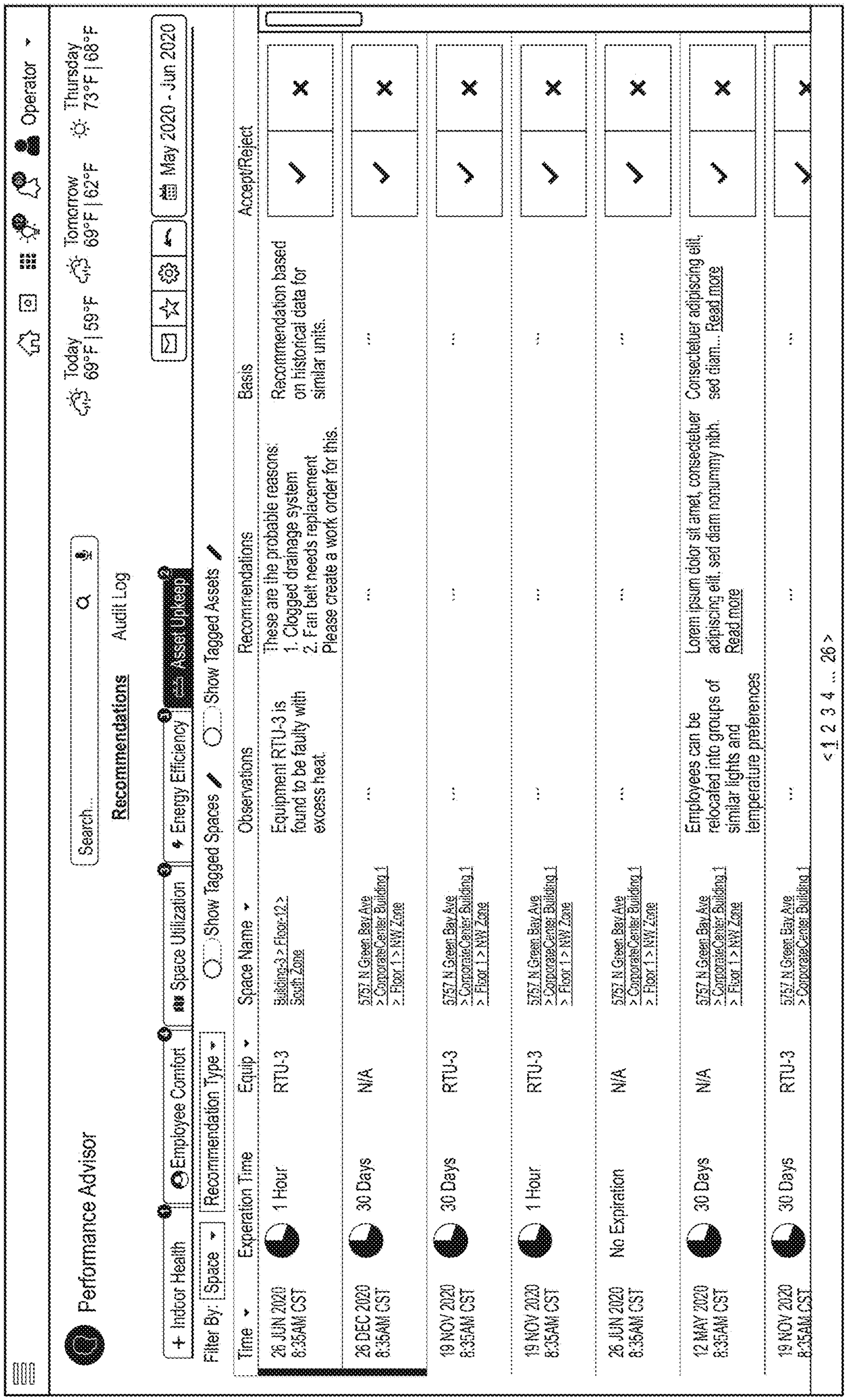
FIG. 55 is a user interface including recommendations relating to asset upkeep, according to an exemplary embodiment.

Referring now to FIG. 55, a user interface 5500 including recommendations relating to asset upkeep is shown, according to an exemplary embodiment. The interface 5500 can provide recommendations generated by the recommendation generator 1116. The recommendations of the interface 5500 can be specific to asset upkeep, e.g., the safety and security health parameters 405. The user interface 5500 can present the recommendations in an ordered list with time, expiration time, equipment, space name, observations, recommendations, and a basis for each entry. The user can accept and/or reject each recommendation of the user interface 5500. Responsive to accepting one of the recommendations, the control manager 214 can update operation of the building systems 142 appropriately.

Figure 56A:
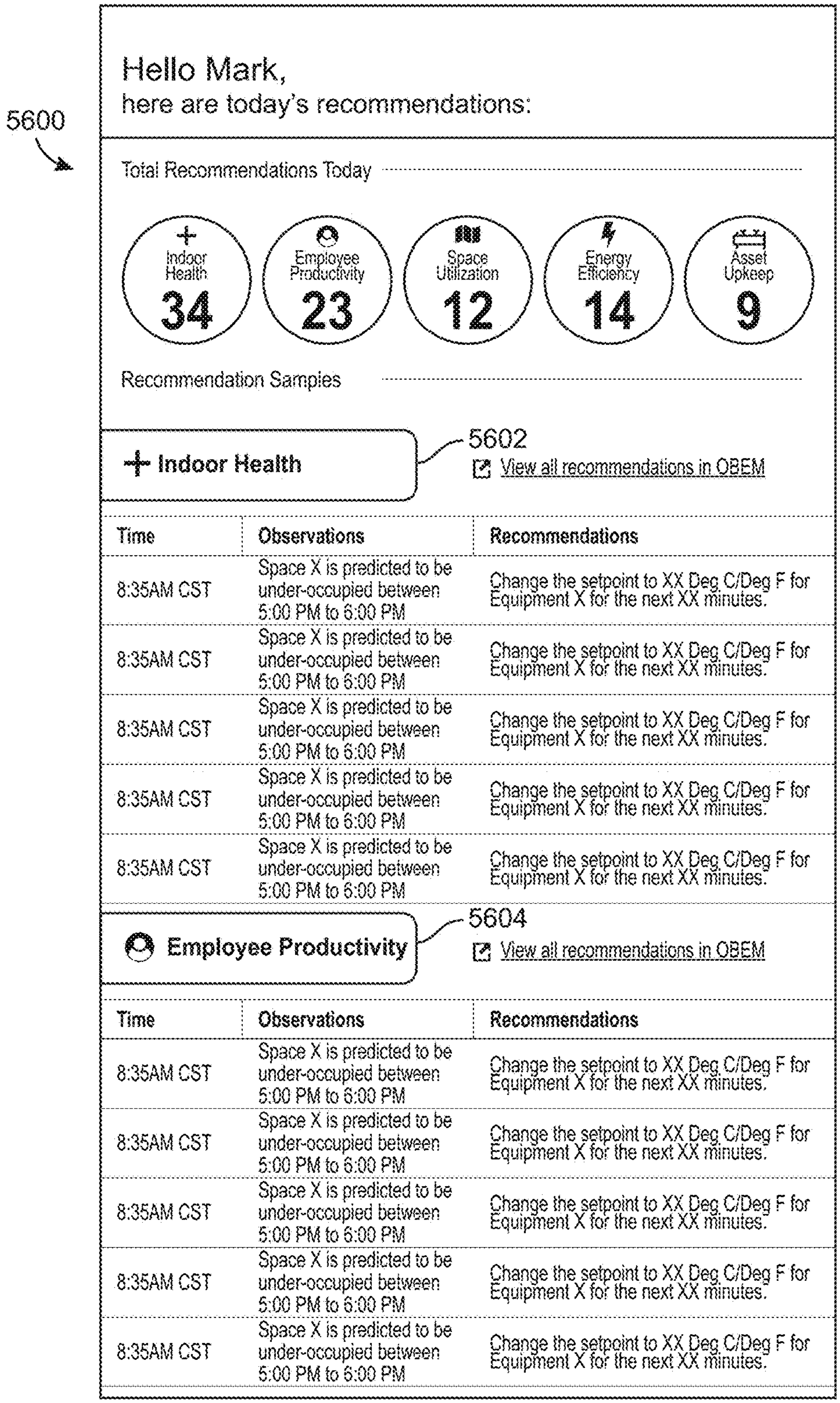

Referring now to FIGS. 56A-B, a user interface 5600 including indoor health recommendations, employee productivity recommendations, space utilization recommendations, energy efficiency recommendations, and asset upkeep recommendations, according to an exemplary embodiment. The user interface 5600 can be a composite user interface that incorporates all of the information of the user interfaces FIG. 50-FIG. 55. The user interface 5600 can be provided via an email or via a smartphone.

The user interface 5600 includes various recommendations for indoor health in indoor health element 5602, e.g., recommendations for improving scores pertaining to the space health parameters 304. The user interface 5600 includes various recommendations for employee productivity in employee productivity element 5604, e.g., recommendations for improving scores pertaining to the occupant health and wellness parameters 404, the ergonomics parameters 604, and/or the thermal comfort parameter 616. The user interface 5600 includes various recommendations for space utilization in space utilization element 5606, e.g., recommendations for improving scores pertaining to the resource health and sustainability parameters 402, the reduce carbon footprint parameters 1004, and/or the space utilization parameter 1022, the ergonomics parameters 604, and/or the thermal comfort parameter 616.

The user interface 5600 includes various recommendations for energy efficiency in energy efficiency element 5608, e.g., recommendations for improving scores pertaining to the resource health and sustainability parameters 402, the reduce carbon footprint parameters 1004, and/or the space utilization parameter 1022, the ergonomics parameters 604, and/or the thermal comfort parameter 616. The user interface 5600 includes various recommendations for asset upkeep in asset upkeep element 5610, e.g., recommendations for improving scores pertaining to the safety and security health parameters 405.

Figure 57:
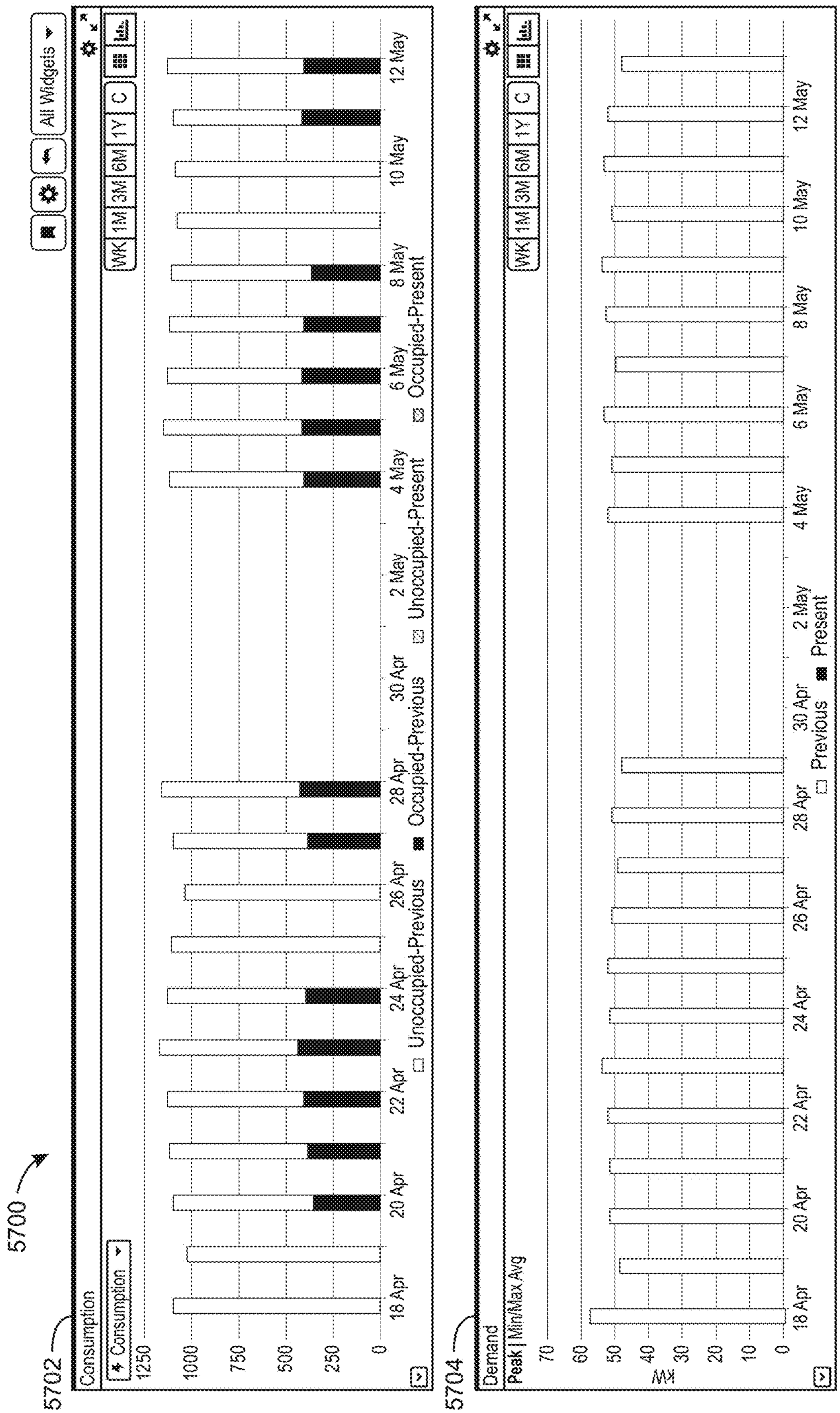
FIG. 57 is a user interface with a plot of consumption and demand of a building, according to an exemplary embodiment.

Referring now to FIG. 57, a user interface 5700 with a plot of consumption and demand of a building is shown, according to an exemplary embodiment. The user interface 5700 includes an element 5702 providing a plot of energy consumption in kilowatt hours (kWH) for various days. The plot of the element 5702 further provides an occupancy status. The energy consumption of the plot of the element 5702 can be the electrical energy consumption of the building systems 142. The user interface 5700 includes an element 5704 that provides a plot of a peak (or alternatively minimum, maximum, or average) energy demand in kilowatts (kW) for various days. The plot of the element 5704 can indicate demand of the building systems 142.

Figure 58:
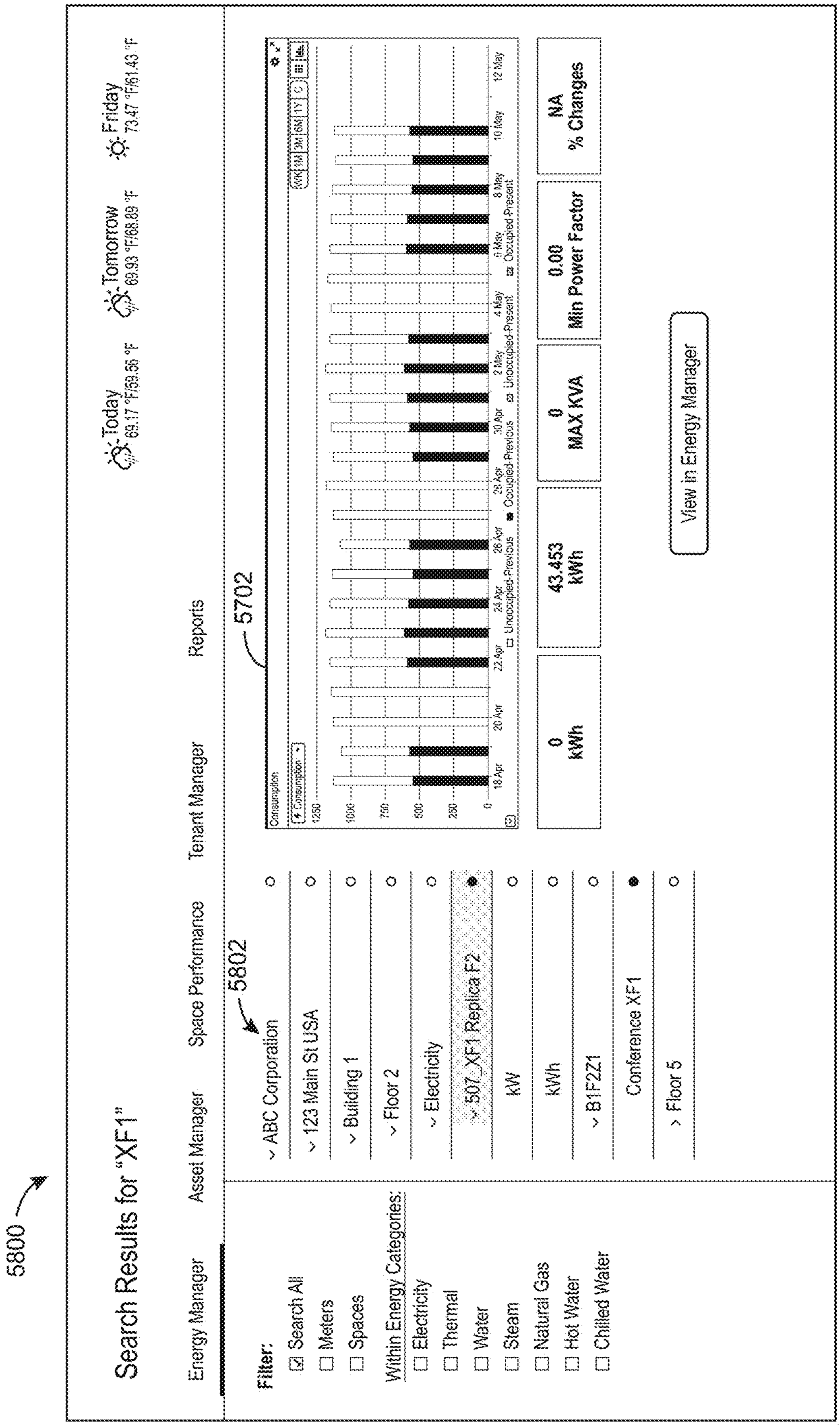
FIG. 58 is a user interface indicating energy consumption for a space that a user searches for, according to an exemplary embodiment.

Referring now to FIG. 58, a user interface 5800 indicating energy consumption for a space that a user searches for is shown, according to an exemplary embodiment. The user interface 5800 includes a navigation element 5802. The navigation element 5802 can allow a user to search/navigate to a specific campus, building, and/or space of an entity. Responsive to a user selecting a specific building or space, the user interface 5800 can display the element 5702 specific to the selected building or space, e.g., displaying consumption or demand for the selected building or space.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system including one or more memory devices that store instructions thereon, that, when executed by one or more processors, cause the one or more processors to:

receive a plurality of recommendations from a recommendation engine, the plurality of recommendations generated based on building data of building equipment of a building and indicating one or more control updates to change performance of the building equipment;

generate a user interface including a plurality of user interface elements, wherein:

a first user interface element of the plurality of user interface elements is associated with a first category and includes one or more first recommendations of the plurality of recommendations that are associated with the first category and one or more first selection fields allowing a user to select recommendations for implementation from among the one or more first recommendations, wherein the one or more first recommendations include a predicted impact on a score associated with the first category; and a second user interface element of the plurality of user interface elements is associated with a second category and includes one or more second recommendations of the plurality of recommendations that are associated with the second category and one or more second selection fields allowing the user to select recommendations for implementation from among the one or more second recommendations, wherein the one or more second recommendations include a predicted impact on a score associated with the second category;

receive an indication to accept one recommendation via at least one of the plurality of user interface elements;

responsive to receiving the indication to accept the one recommendation, automatically take an action to implement the one recommendation;

cause the user interface to include a trend element including a first trend of a first component of the score associated with the first category and a second trend of a second component of the score associated with the second category, an axis of the trend element identifying a plurality of times that indicate when one or more recommendations including the one recommendation were implemented, wherein the first trend and the second trend indicate impacts on the score of the first category and the score of the second category that resulted from implementation of one or more particular recommendations of the one or more recommendations, wherein the score of the first category and the score of the second category are determined based on one or more measured characteristics of the building;

receive a second indication declining a second recommendation of the plurality of recommendations;

train one or more machine learning models based on the indication to accept the one recommendation and the indication declining the second recommendation; and generate one or more additional recommendations based on the one or more machine learning models.

2. The building system of claim 1, wherein the one or more first recommendations include a first plurality of recommendations;

wherein the first user interface element includes a list comprising:

indications of the first plurality of recommendations; and the one or more first selection fields allowing the user to accept or decline each of the first plurality of recommendations.

3. The building system of claim 2, wherein the list further includes:

a plurality of observations based on the building data that indicates a situation or event triggering a recommendation of the first plurality of recommendations to be generated; and indications of the one or more control updates to change the performance of the building equipment.

4. The building system of claim 1, wherein the first category and the second category are at least one of:

one or more space categories indicating health levels of spaces of the building;

one or more planet health categories relating to an effect of the building on environmental pollution; or one or more people categories relating to at least one of physical or mental health of occupants of the building.

5. The building system of claim 1, wherein the instructions cause the one or more processors to:

generate a graphical building interface including a three dimensional graphical representation of the building and display the graphical building interface on a display device of a user device;

display a first space of the building in the three dimensional graphical representation of the building;

display a first set of recommendations in the graphical building interface associated with the first space in response to the first space of the building being displayed in the three dimensional graphical representation of the building;

receive a user input from the user device navigating in the three dimensional graphical representation of the building from the first space to a second space of the building; and display a second set of recommendations in the user interface associated with the second space in response to navigating in the three dimensional graphical representation of the building from the first space to the second space.

6. The building system of claim 1, wherein the instructions cause the one or more processors to:

update the user interface to include a plurality of trend elements indicating one or more trends of the score of the first category and the score of the second category over time;

wherein the plurality of trend elements indicate impacts that the one or more particular recommendations of the one or more recommendations had on the score of the first category and the score of the second category.

7. The building system of claim 1, wherein the instructions cause the one or more processors to:

receive a target energy bill amount from the user via a user device; and generate the plurality of recommendations that, when implemented, cause the building equipment to consume an amount of energy that meets the target energy bill amount.

8. The building system of claim 1, wherein the instructions cause the one or more processors to:

receive a selection of the one recommendation;

receive a comment from the user via a user device; and display the comment in the user interface in association with the one recommendation.

9. The building system of claim 1, wherein the instructions cause the one or more processors to:

receive a selection of the one recommendation, wherein the one recommendation is of a particular type;

receive approval to automatically implement the one or more particular recommendations of the particular type from the user via a user device; and responsive to receiving the approval to automatically implement the one or more particular recommendations of the particular type, automatically take actions to implement the one or more particular recommendations of the particular type.

10. A method comprising:

receiving, by a processing circuit, a plurality of recommendations from a recommendation engine, the plurality of recommendations generated based on building data of building equipment of a building and indicating one or more control updates to change performance of the building equipment;

generating, by the processing circuit, a user interface including a plurality of user interface elements, wherein:

a first user interface element of the plurality of user interface elements is associated with a first category and includes one or more first recommendations of the plurality of recommendations that are associated with the first category and one or more first selection fields allowing a user to select recommendations for implementation from among the one or more first recommendations, wherein the one or more first recommendations include a predicted impact on a score associated with the first category; and a second user interface element of the plurality of user interface elements is associated with a second category and includes one or more second recommendations of the plurality of recommendations that are associated with the second category and one or more second selection fields allowing the user to select recommendations for implementation from among the one or more second recommendations, wherein the one or more second recommendations include a predicted impact on a score associated with the second category;

receiving, by the processing circuit, an indication to accept one recommendation via at least one of the plurality of user interface elements;

responsive to receiving the indication to accept the one recommendation, automatically taking an action, by the processing circuit, to implement the one recommendation;

causing, by the processing circuit, the user interface to include a trend element including a first trend of a first component of the score associated with the first category and a second trend of a second component of the score associated with the second category, an axis of the trend element identifying a plurality of times that indicate when one or more recommendations including the one recommendation were implemented, wherein the first trend and the second trend indicate impacts on the score of the first category and the score of the second category that resulted from implementation of one or more particular recommendations of the one or more recommendations, wherein the score of the first category and the score of the second category are determined based on one or more measured characteristics of the building;

receiving, by the processing circuit, a second indication declining a second recommendation of the plurality of recommendations;

training, by the processing circuit, one or more machine learning models based on the indication to accept the one recommendation and the indication declining the second recommendation; and generating, by the processing circuit, one or more additional recommendations based on the one or more machine learning models.

11. The method of claim 10, wherein the first category and the second category are at least one of:

one or more space categories indicating health levels of spaces of the building;

one or more planet health categories relating to an effect of the building on environmental pollution; or one or more people categories relating to at least one of physical or mental health of occupants of the building.

12. The method of claim 10, further comprising:

generating, by the processing circuit, a graphical building interface including a three dimensional graphical representation of the building and display the graphical building interface on a display device of a user device;

displaying, by the processing circuit, a first space of the building in the three dimensional graphical representation of the building;

displaying, by the processing circuit, a first set of recommendations in the graphical building interface associated with the first space in response to the first space of the building being displayed in the three dimensional graphical representation of the building;

receiving, by the processing circuit, a user input from the user device navigating in the three dimensional graphical representation of the building from the first space to a second space of the building; and displaying, by the processing circuit, a second set of recommendations in the user interface associated with the second space in response to navigating in the three dimensional graphical representation of the building from the first space to the second space.

13. The method of claim 10, further comprising:

updating, by the processing circuit, the user interface to include a plurality of trend elements indicating one or more trends of the score of the first category and the score of the second category over time;

wherein the plurality of trend elements indicate impacts that the one or more particular recommendations of the one or more recommendations had on the score of the first category and the score of the second category.

14. The method of claim 10, further comprising:

receiving, by the processing circuit, a target energy bill amount from the user via a user device; and generating, by the processing circuit, the plurality of recommendations that, when implemented, cause the building equipment to consume an amount of energy that meets the target energy bill amount.

15. The method of claim 10, further comprising:

receiving, by the processing circuit, a selection of the one recommendation;

receiving, by the processing circuit, a comment from the user via a user device; and displaying, by the processing circuit, the comment in the user interface in association with the one recommendation.

16. The method of claim 10, further comprising:

receiving, by the processing circuit, a selection of the one recommendation, wherein the one recommendation is of a particular type;

receiving, by the processing circuit, approval to automatically implement the one or more particular recommendations of the particular type from the user via a user device; and responsive to receiving the approval to automatically implement the one or more particular recommendations of the particular type, automatically take actions to implement the one or more particular recommendations of the particular type.

17. A building system including:

one or more memory devices that store instructions; and one or more processors, wherein the one or more processors execute the instructions, causing the one or more processors to:

receive a plurality of recommendations from a recommendation engine, the plurality of recommendations generated based on building data of building equipment of a building and indicating one or more control updates to change performance of the building equipment;

generate a user interface including a plurality of user interface elements, wherein:

a first user interface element of the plurality of user interface elements is associated with a first category and includes one or more first recommendations of the plurality of recommendations that are associated with the first category and one or more first selection fields allowing a user to select recommendations for implementation from among the one or more first recommendations, wherein the one or more first recommendations include a predicted impact on a score associated with the first category; and a second user interface element of the plurality of user interface elements is associated with a second category and includes one or more second recommendations of the plurality of recommendations that are associated with the second category and one or more second selection fields allowing the user to select recommendations for implementation from among the one or more second recommendations, wherein the one or more second recommendations include a predicted impact on a score associated with the second category;

receive an indication to accept one recommendation via at least one of the plurality of user interface elements;

responsive to receiving the indication to accept the one recommendation, automatically take an action to implement the one recommendation;

cause the user interface to include a trend element including a first trend of a first component of the score associated with the first category and a second trend of a second component of the score associated with the second category, an axis of the trend element identifying a plurality of times that indicate when one or more recommendations including the one recommendation were implemented, wherein the first trend and the second trend indicate impacts on the score of the first category and the score of the second category that resulted from implementation of one or more particular recommendations of the one or more recommendations, wherein the score of the first category and the score of the second category are determined based on one or more measured characteristics of the building;

generate a graphical building interface including a three dimensional graphical representation of the building and display the graphical building interface on a display device of a user device;

display a first space of the building in the three dimensional graphical representation of the building;

display a first set of recommendations in the graphical building interface associated with the first space in response to the first space of the building being displayed in the three dimensional graphical representation of the building;

receive a user input from the user device navigating in the three dimensional graphical representation of the building from the first space to a second space of the building; and display a second set of recommendations in the user interface associated with the second space in response to navigating in the three dimensional graphical representation of the building from the first space to the second space.

18. The building system of claim 17, wherein the first category and the second category are at least one of:

one or more space categories indicating health levels of spaces of the building;

one or more planet health categories relating to an effect of the building on environmental pollution; or one or more people categories relating to at least one of physical or mental health of occupants of the building.

* * * * *